(12) United States Patent
Dewald, Jr. et al.

(10) Patent No.: US 6,227,607 B1
(45) Date of Patent: May 8, 2001

(54) LATCHING MECHANISM FOR LATCHING A SLIDE OUT ROOM TO MAIN LIVING AREA

(76) Inventors: James E. Dewald, Jr.; Patrick W. McManus; Martin P. McManus, all of 1023 W. Eighth St., P.O. Box 703, Mishawaka, IN (US) 46544

( * ) Notice: Subject to any disclaimer, the term of this patent is extended or adjusted under 35 U.S.C. 154(b) by 0 days.

(21) Appl. No.: 09/172,703

(22) Filed: Oct. 14, 1998

Related U.S. Application Data

(60) Provisional application No. 60/074,325, filed on Feb. 11, 1998, provisional application No. 60/068,783, filed on Dec. 24, 1997, and provisional application No. 60/062,137, filed on Oct. 15, 1997.

(51) Int. Cl.$^7$ ............................................. B60P 3/39
(52) U.S. Cl. ..................... 296/165; 296/171; 296/175; 296/26.08; 296/26.13
(58) Field of Search ..................... 296/165, 171, 296/175, 26.09, 26.08, 26.03, 26.13, 26.12; 52/67

(56) References Cited

U.S. PATENT DOCUMENTS

| | | |
|---|---|---|
| 2,831,722 | 4/1958 | Hanson et al. . |
| 2,913,775 | 11/1959 | Sailor . |
| 4,049,310 | 9/1977 | Yoder . |
| 5,050,927 | * 9/1991 | Montanari .............................. 296/165 |
| 5,560,444 | 10/1996 | Tiedge . |
| 5,628,541 | * 5/1997 | Gardner ............................ 296/165 X |
| 5,785,373 | * 7/1998 | Futrell et al. .................. 296/26.13 X |
| 6,094,870 | * 8/2000 | Stacy ................................... 296/175 X |

* cited by examiner

*Primary Examiner*—D. Glenn Dayoan
*Assistant Examiner*—Jason Morrow
(74) *Attorney, Agent, or Firm*—Baker & Daniels

(57) ABSTRACT

Mobile living quarter incorporates a slide out room which is moveable between an extended position providing auxiliary living quarters when the unit is parked and a retracted position retracted into the main living area when the unit moved. A latching mechanism automatically latches the slide out room to the main living quarters as the slide out room is moved into the fully retracted position, and releases the latch to permit outward movement of the room when the unit is parked and the slide out room is extended.

66 Claims, 39 Drawing Sheets

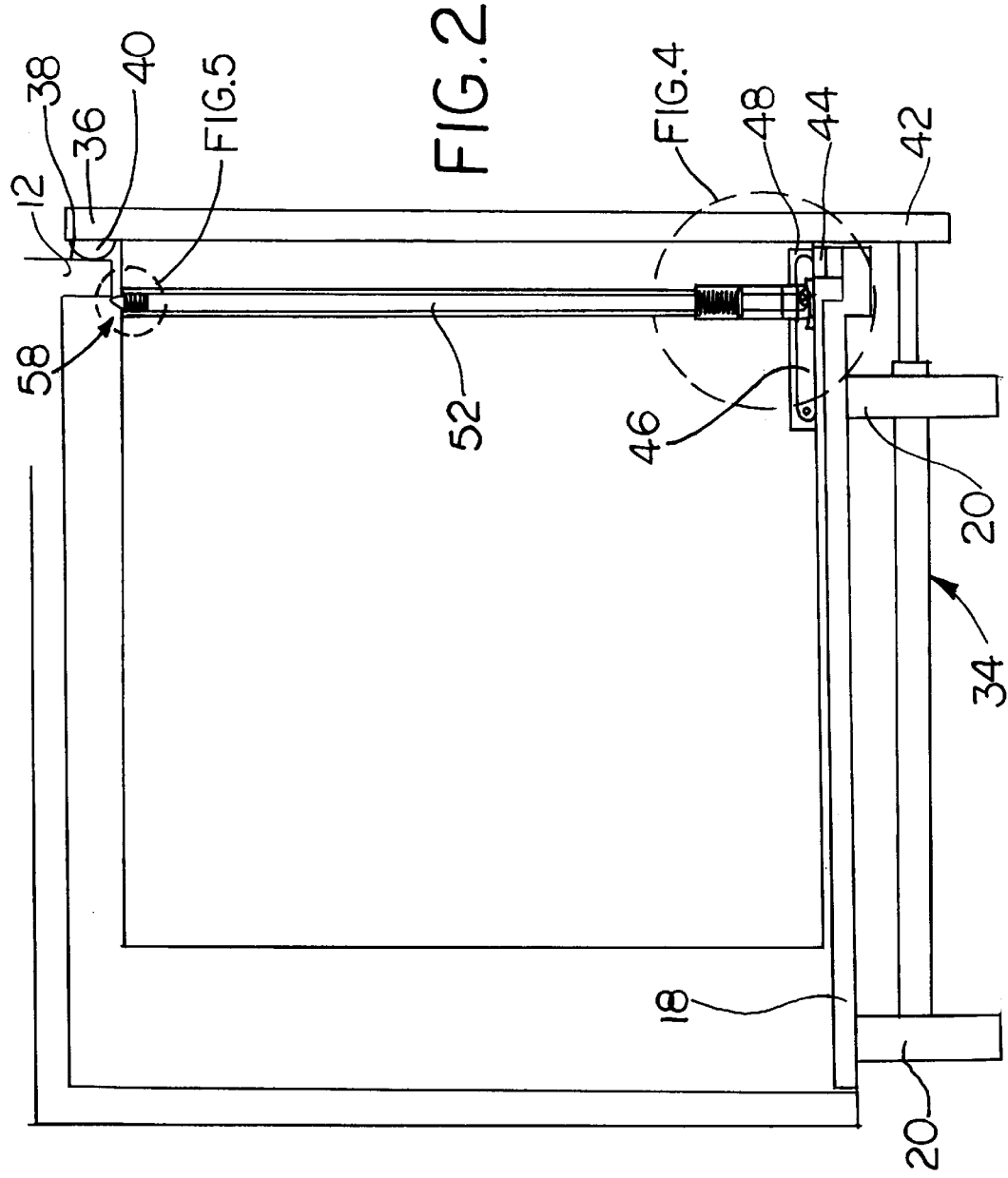

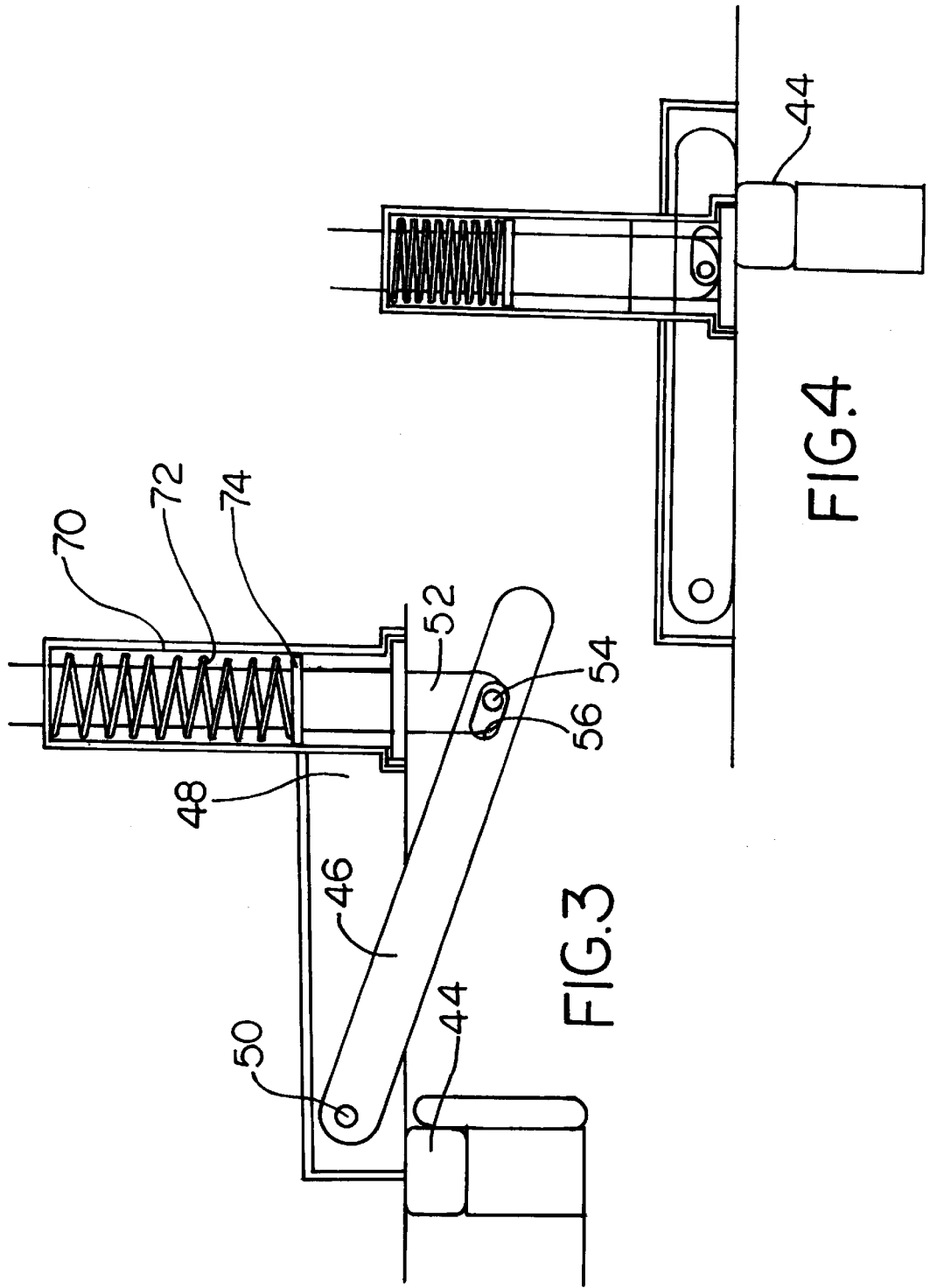

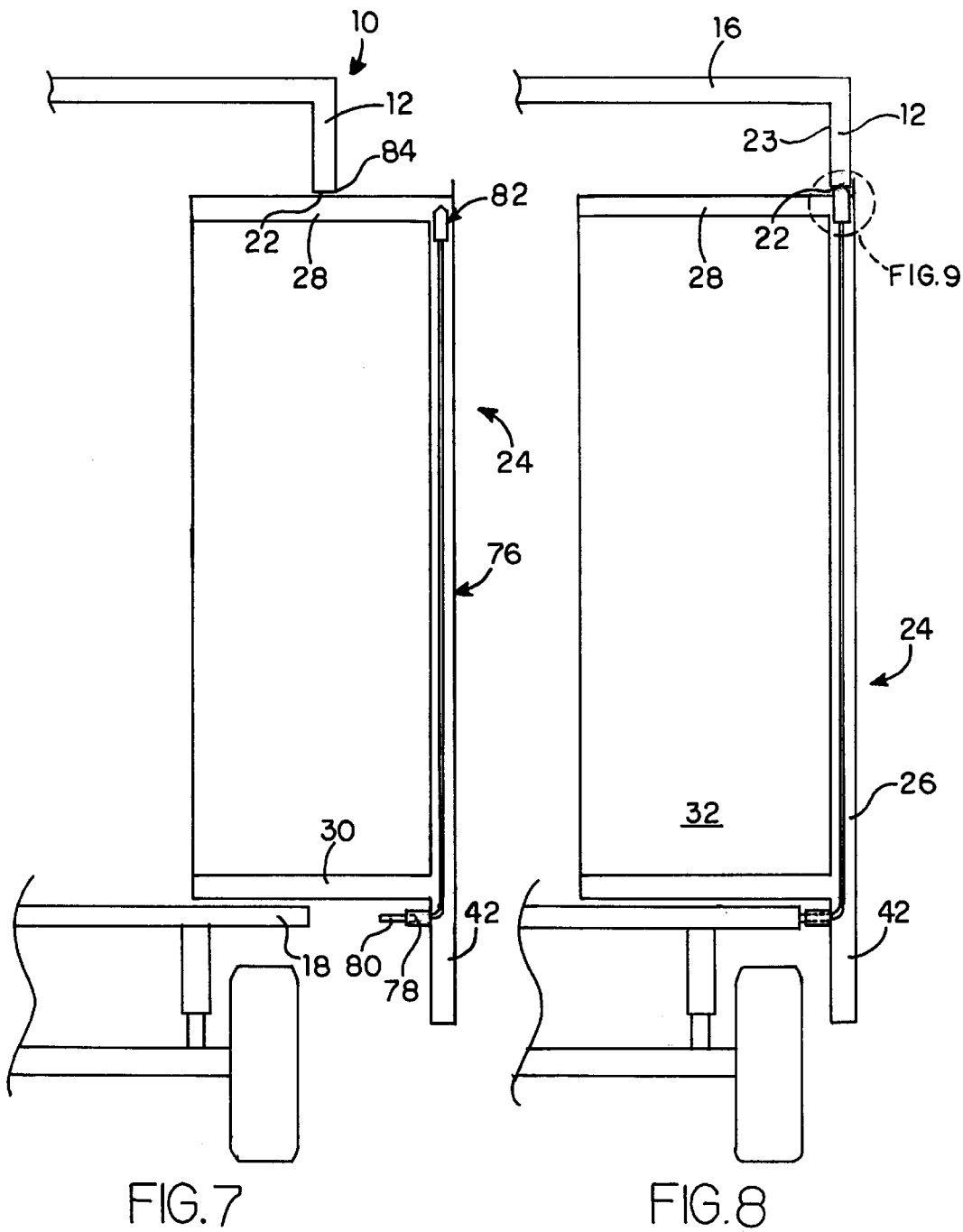

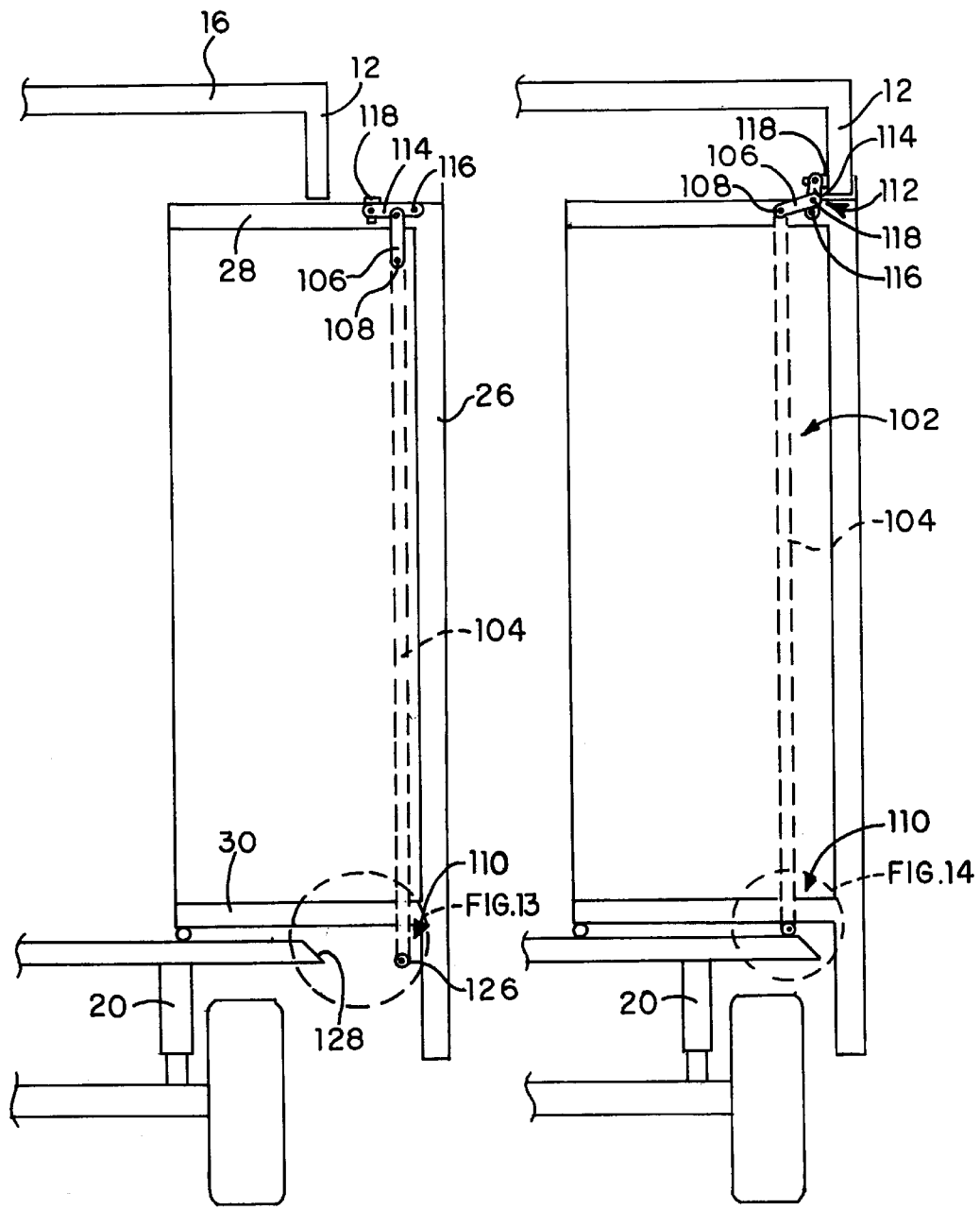

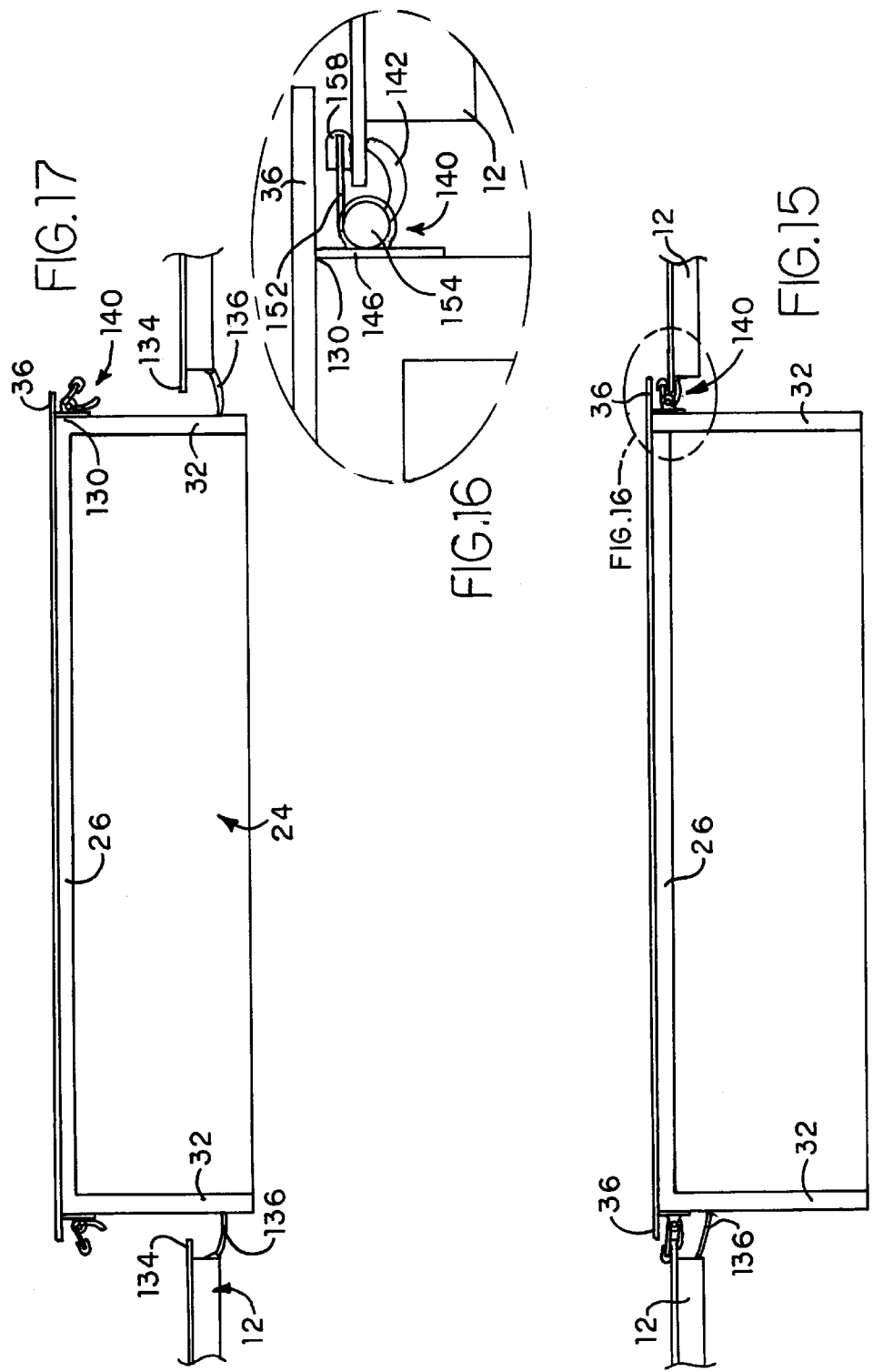

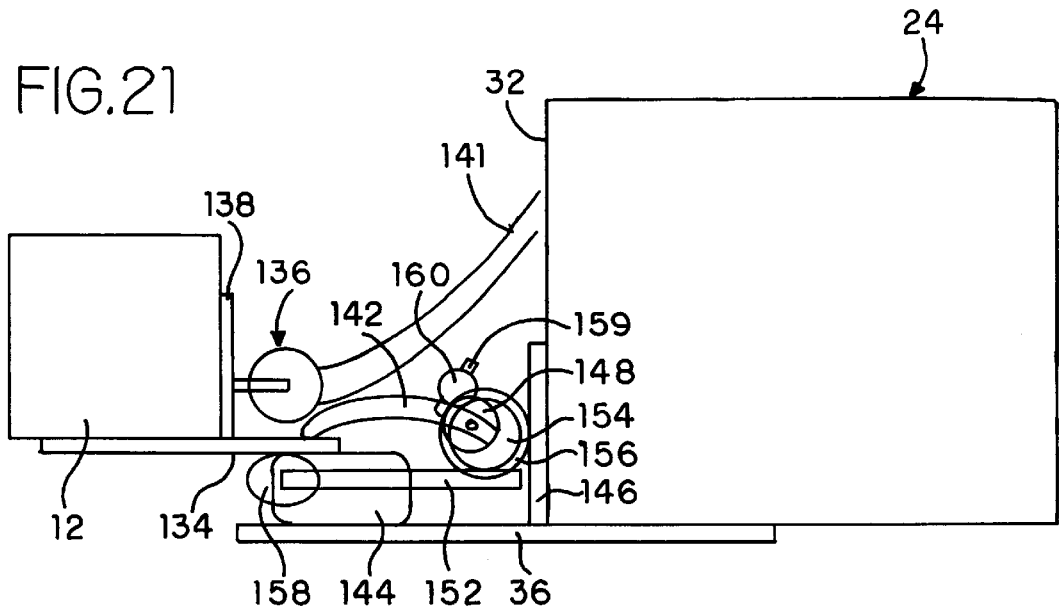
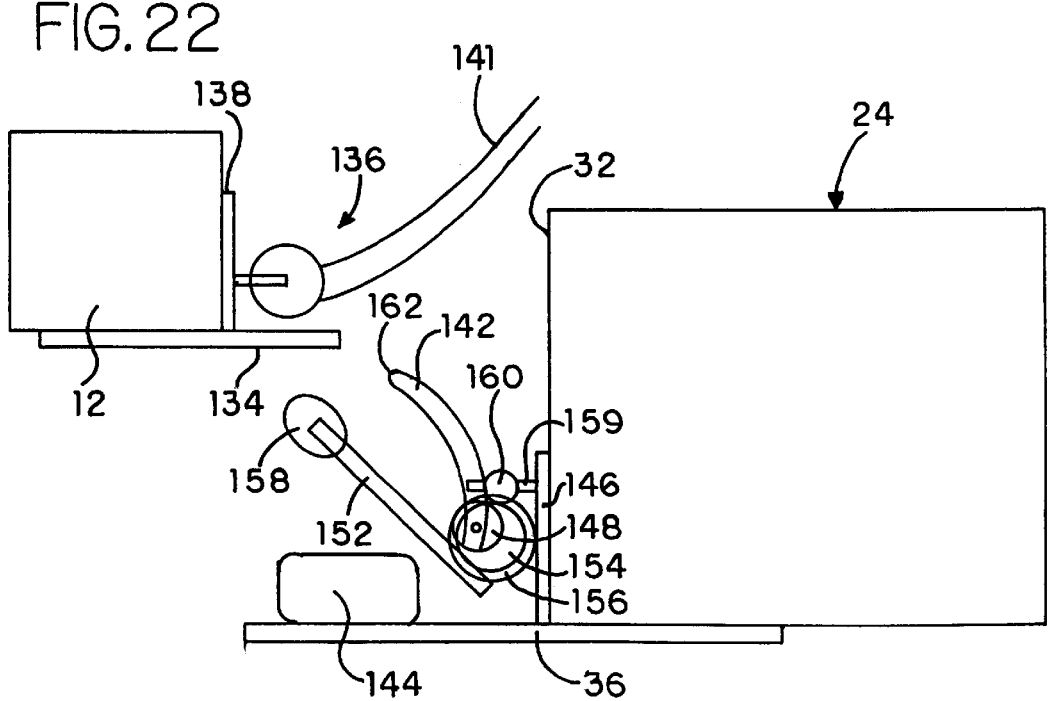

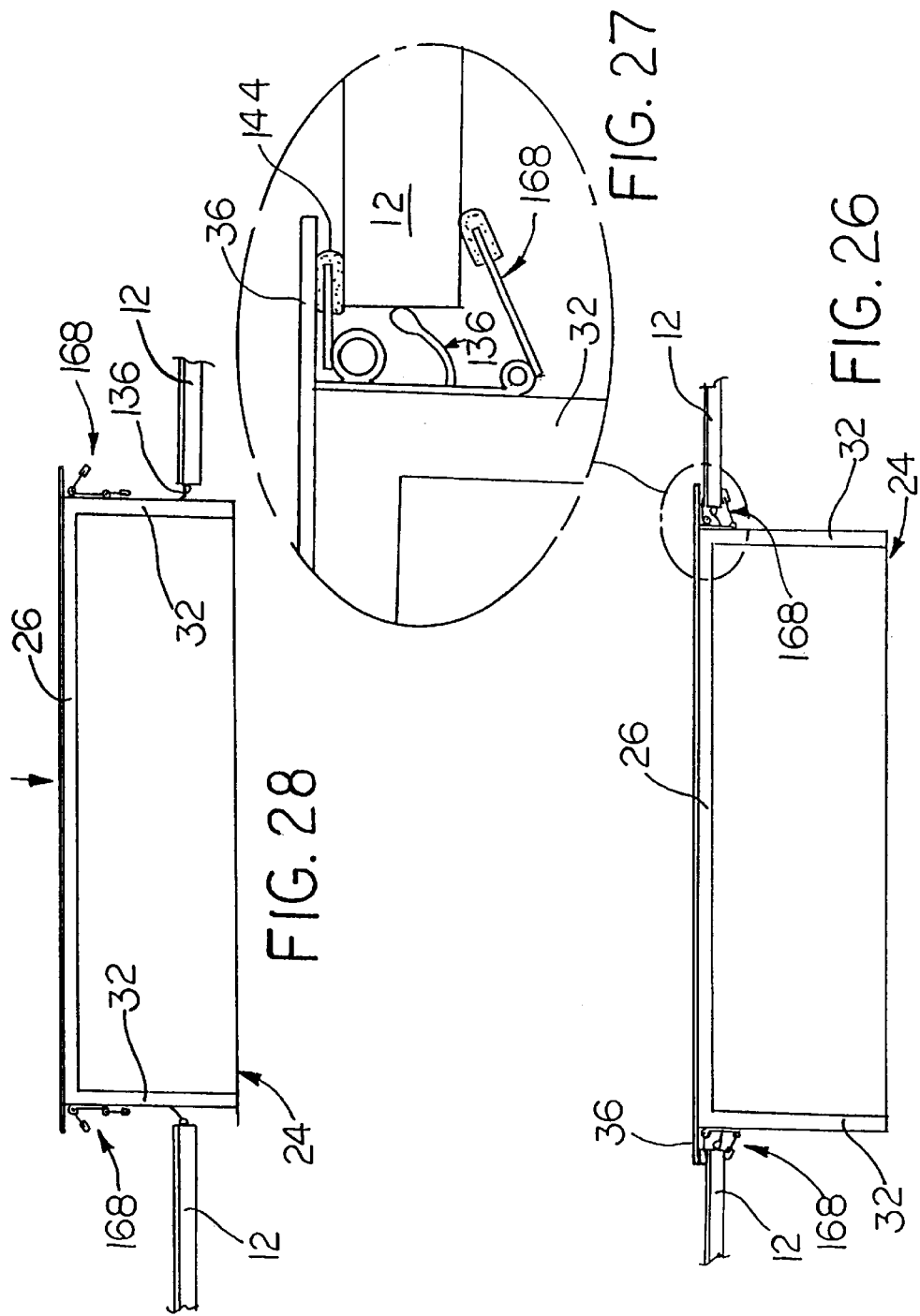

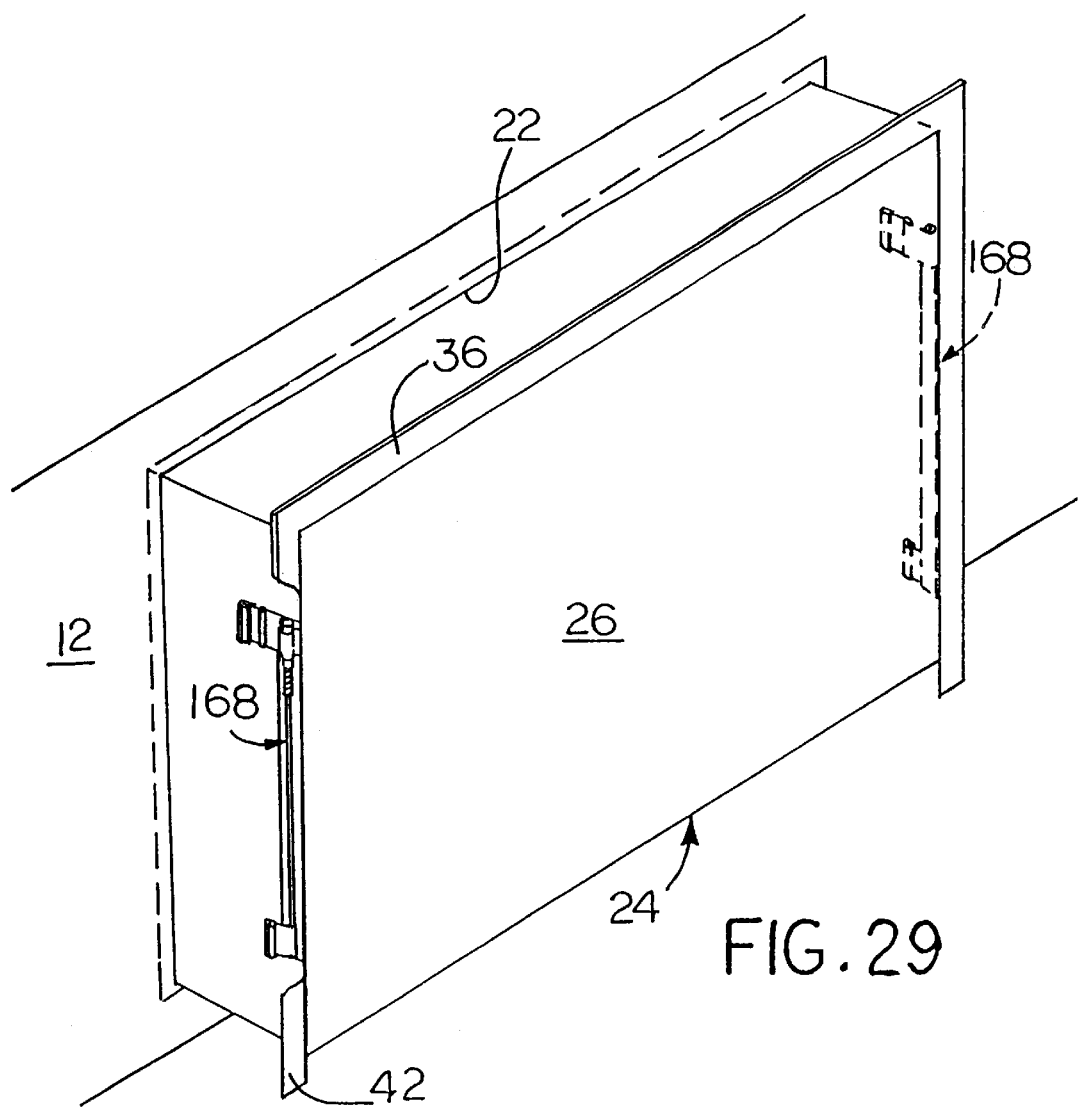

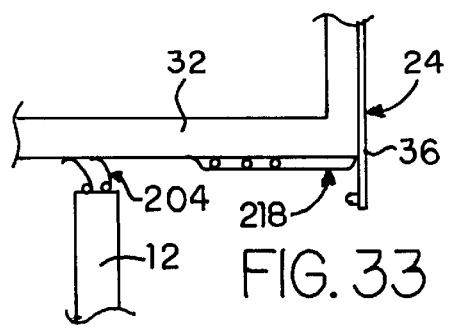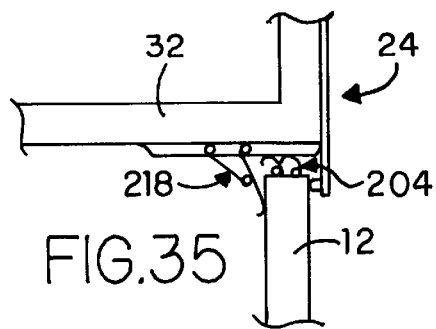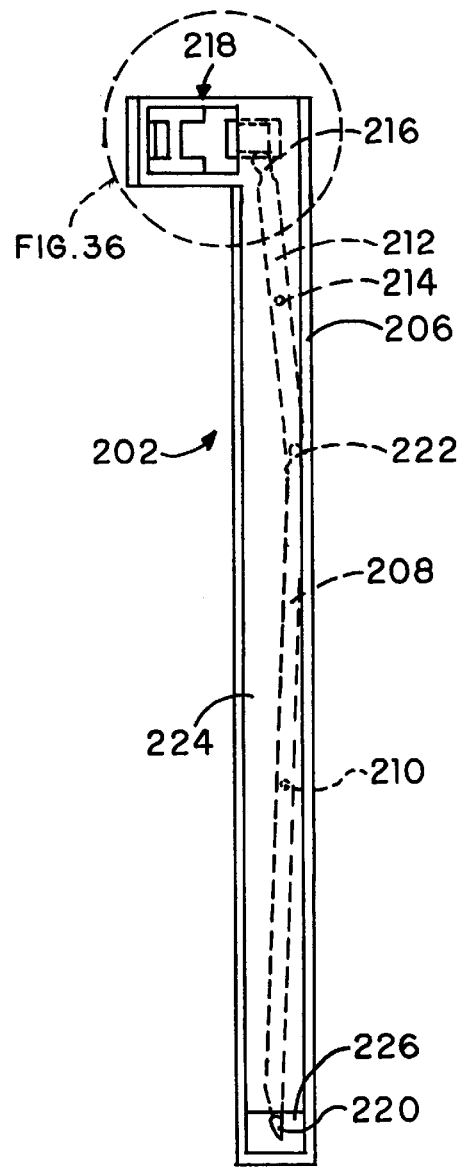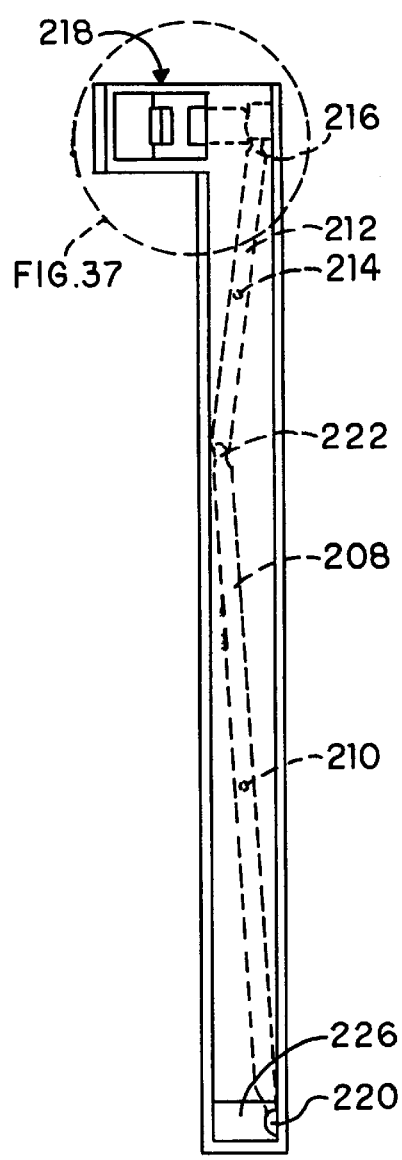

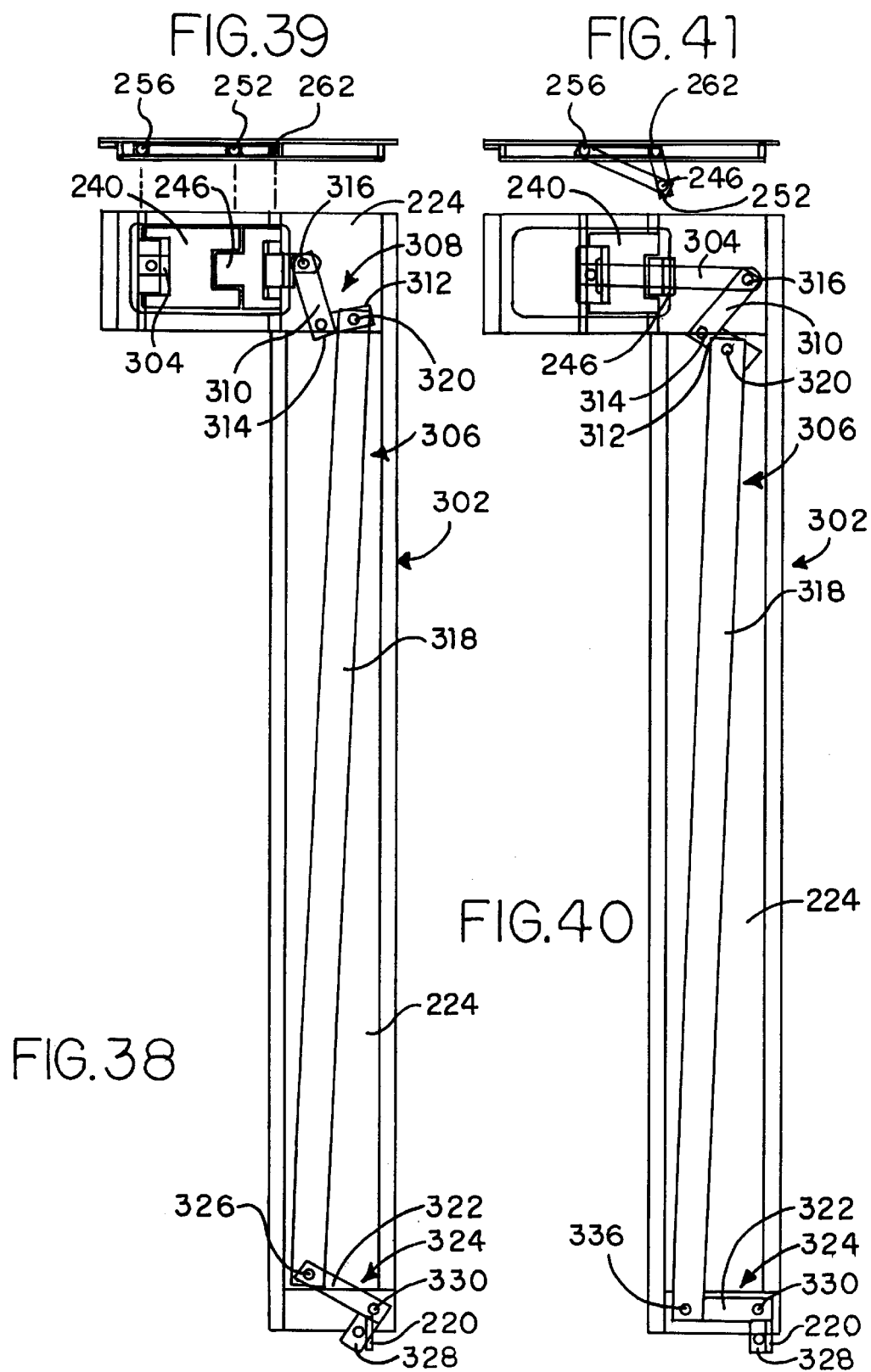

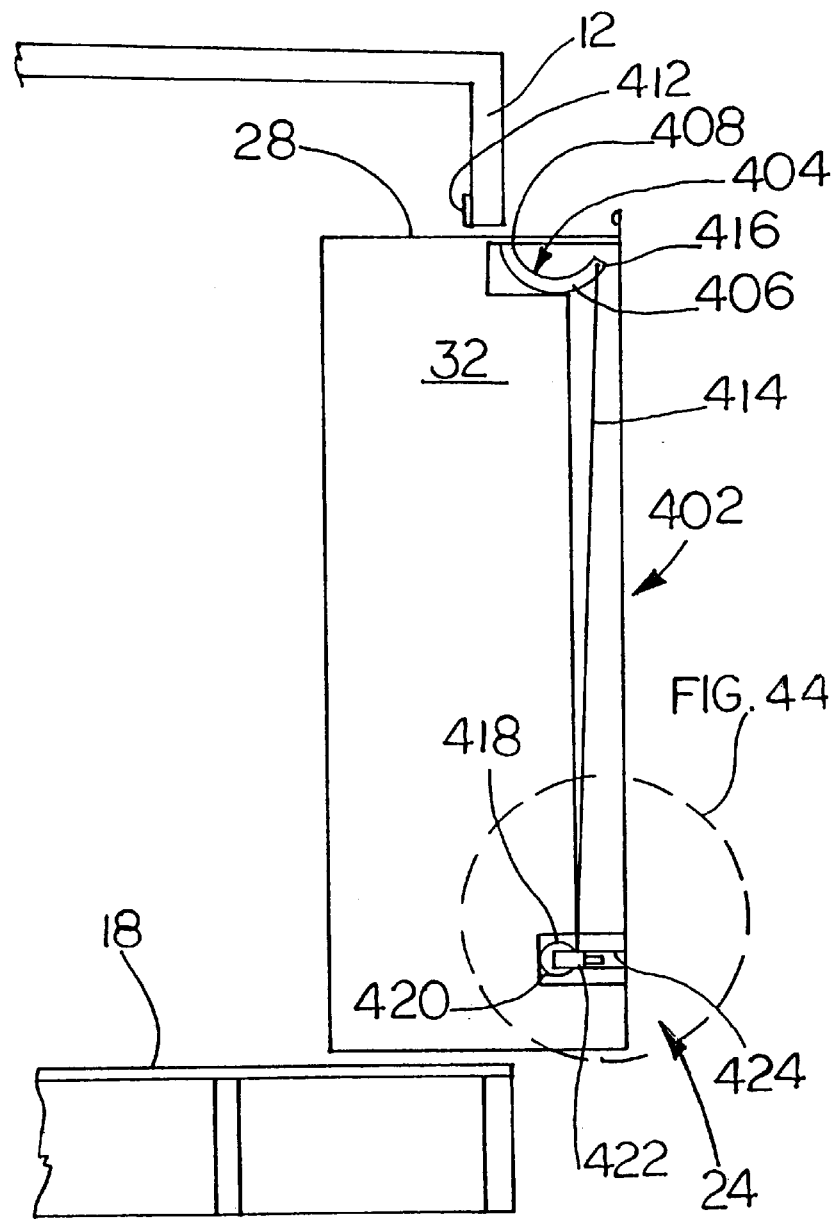
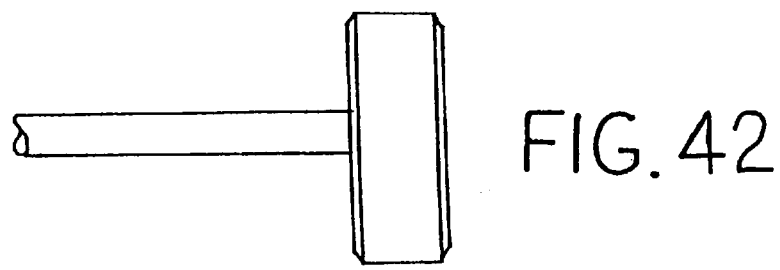
FIG. 42

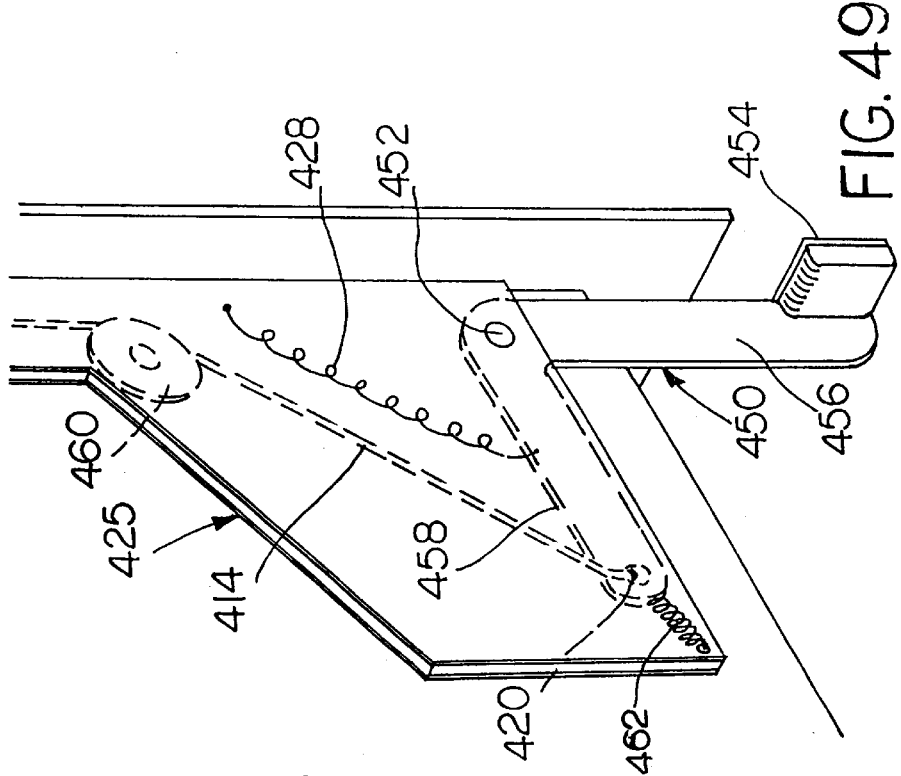
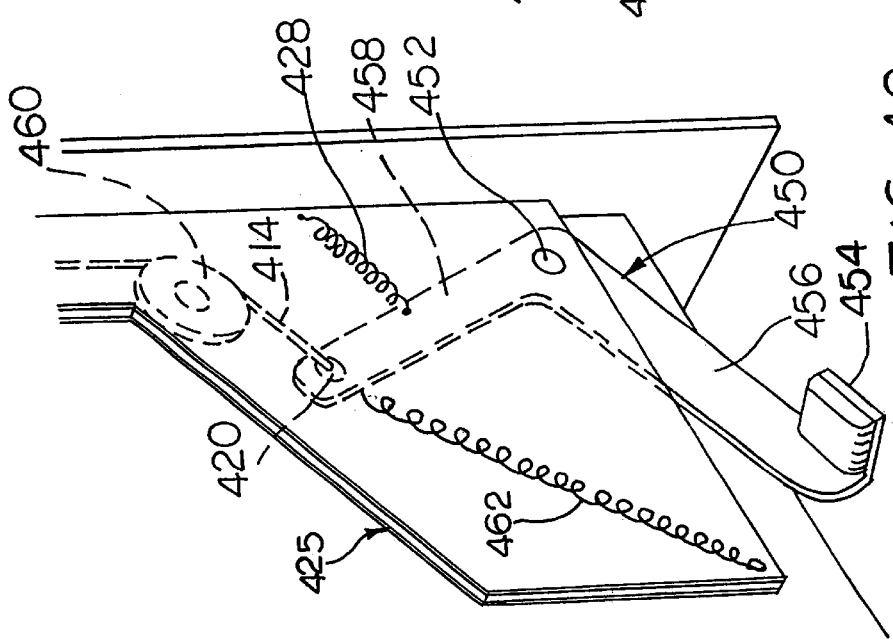

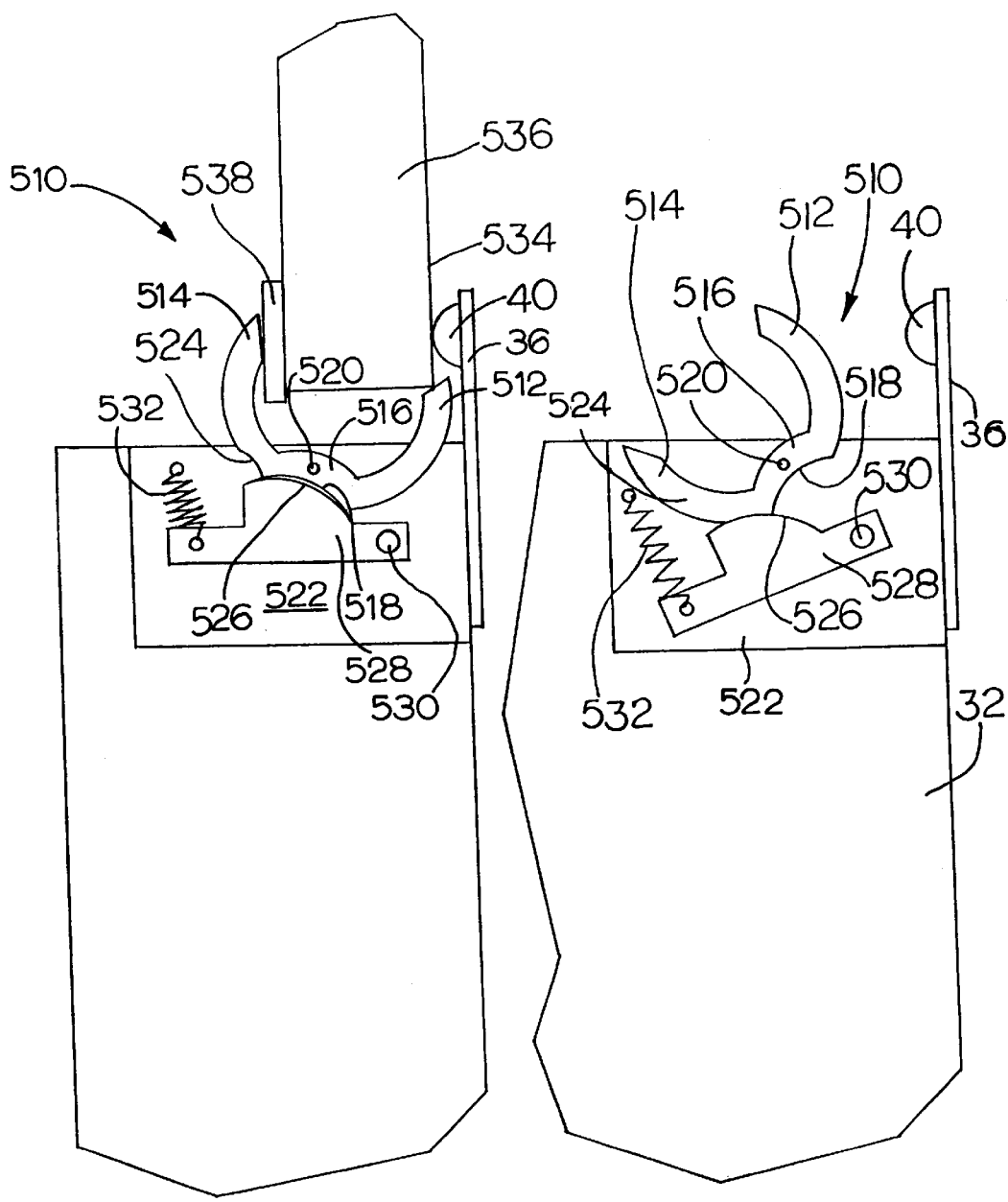

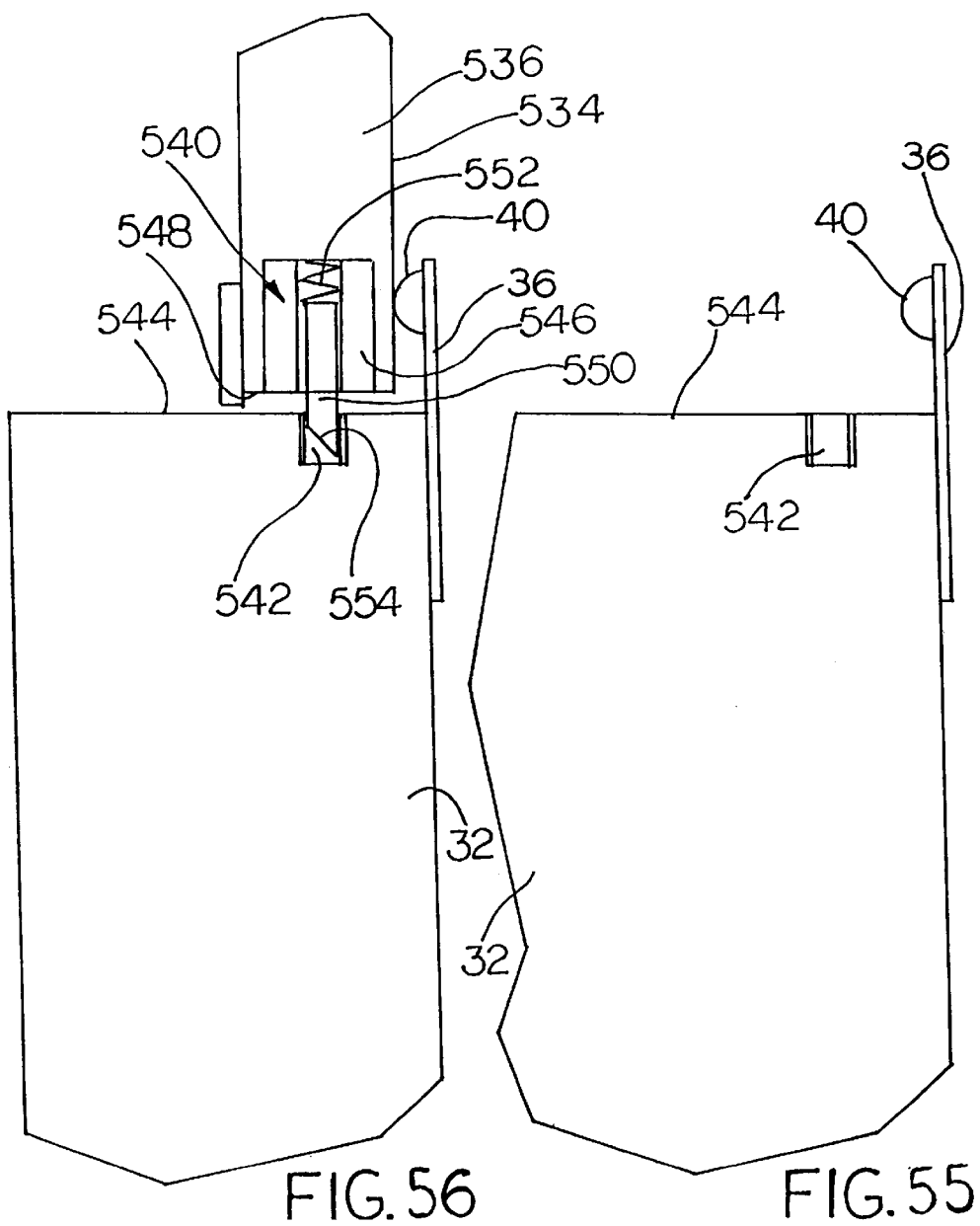

LATCHING MECHANISM FOR LATCHING A SLIDE OUT ROOM TO MAIN LIVING AREA

CROSS REFERENCE TO RELATED APPLICATIONS

FIELD OF THE INVENTION

This application claims domestic priority based upon U.S. Provisional Patent Applications 60/074,325, filed Feb. 11, 1998; 60/068,783, filed Dec. 24, 1997, and 60/062,137 filed Oct. 15, 1997.

BACKGROUND OF THE INVENTION

This invention relates to a latching mechanism for latching a slide out room of mobile living quarters (such as a recreational vehicle) to the main living area when the slide out room is retracted into the main living area.

The width of mobile living quarters, such as recreational vehicles, manufactured housing and the like, is limited to that which may be accommodated for travel on the public highways. Accordingly, when the mobile living quarters is parked for use, it is desirable to be able to expand the living quarters to increase the available living area. Accordingly, so called slide out rooms have become popular. These slide out rooms are retracted into the main living area when the mobile living quarters are transported on the public highways, but are extended from the main living area to provide additional living space when the mobile living quarters is parked for use. Slide out rooms are normally supported on telescoping tubes which are mounted on the frame supporting the main living area and are operated by hydraulic rams. Necessary sealing is provided to seal the slide out room in both the retracted and extended positions. However, the slide out room is only semi-rigid, and portions of the room furthest from the hydraulic rams are not sufficiently rigid that engagement with the seals can be assured. Hydraulic rams and the support mechanisms of slide out rooms can be adjusted so that the portions of the room closest to the hydraulic rams, which is the portion of the room closest to the frame and floor, are maintained against the seals when the room is retracted, but the portion of the room furthest away from the rams, such as that portion of the room adjacent the ceiling, may deflect sufficiently that the seals are not engaged. Accordingly, it has become customary to use so called "travel locks" to latch and maintain the top of the slide out room in a position in which the slide out room is engaged with and sealed against the main living area all around the slide out room. Unfortunately, these travel locks are difficult to install and remove and, must be installed and removed manually.

SUMMARY OF THE INVENTION

The present invention provides a latching mechanism for a slide out room that includes a latch which latches the slide out room to the main living area so that the ceiling is engaged with the slide out room, thereby preventing entry of moisture or other environmental elements. The latch is operated by an actuator which is responsive to relative movement between the slide out room and the main living area to engage the latch as the slide out room reaches the fully retracted position and to disengage the latch as the slide out room begins to move away from the fully retracted position. In this way, the slide out room is automatically latched to the main living area when the slide out room is retracted for travel and is automatically unlatched as the room is extended for use.

BRIEF DESCRIPTION OF THE DRAWINGS

These and other advantages of the present invention will become apparent from the following description, with reference to the accompanying drawings, in which:

FIG. 2 is a cross-sectional view taken through mobile living quarters illustrating the slide out room retracted into the main living area and further including the latching mechanism made pursuant to one embodiment of the present invention;

FIG. 3 is an enlarged view of the lower circumscribed portion of FIG. 2, but illustrating the actuator forming a component of the latching mechanism in the released position permitting extension of the retractable room;

FIG. 4 is a view similar to FIG. 3, but illustrating the latching mechanism in the actuated or latched position;

FIG. 7 is a fragmentary, transverse cross-sectional view taken through mobile living quarters incorporating a slide room and illustrating a latching mechanism made pursuant to another embodiment of the present invention, the latching mechanism being illustrated in the released position permitting movement of the slide out room relative to the main living quarters;

FIG. 8 is a view similar to FIG. 7 but illustrating the latching mechanism in the latched or locked position;

FIG. 11 is a fragmentary transverse cross-sectional view taken through mobile living quarters incorporating a slide out room and including a latching mechanism made pursuant to another embodiment of the present invention, the latching mechanism being shown in the released condition allowing movement of the slide out room;

FIG. 12 is a view similar to FIG. 11, but illustrating the latching mechanism in the latched condition;

FIG. 15 is a fragmentary cross-sectional view taken parallel to the floor of the mobile living quarters and illustrating a latching mechanism made pursuant to still another embodiment of the present invention, the latching mechanism being illustrated in the latched position;

FIG. 16 is an enlarged view of the circumscribed portion of FIG. 15;

FIG. 17 is a view similar to FIG. 15, but illustrating the mechanism in the unlatched position and the slide out room being extended from the main living quarters;

FIG. 21 is a top plan view of the latching mechanisms illustrated in FIGS. 15–20;

FIGS. 22–25 are views similar to FIG. 21 but illustrating the progression of the relative positions of the components of the latching members illustrated in FIGS. 15–21 as the slide out room is moved into the retracted position;

FIGS. 26–31 are views similar to FIGS. 15–20, respectively, but illustrating still another embodiment of the present invention;

FIG. 32 is a side elevational view of a latching mechanism used to secure the slide out room to the main living area of the mobile living quarters according to still another embodiment of the invention;

FIG. 33 is a top plan view of the latching mechanism illustrated in FIG. 32, illustrated installed on a slide out room;

FIG. 34 is a view similar to FIG. 32, but illustrating the latching mechanism in the latched or actuated position;

FIG. 35 is a view similar to FIG. 33, but illustrating the latching mechanism in the actuated or latched condition;

FIG. 38 is a side elevational view of a latching mechanism used to secure the slide out room to the main living area of the mobile living quarters according to still another embodiment of the invention;

FIG. 39 is a top plan view of the latching mechanism illustrated in FIG. 38;

FIG. 40 is a view similar to FIG. 38, but illustrating the latching mechanism in the latched or actuated position;

FIG. 41 is a top plan view of the latching mechanism in its actuated or latched condition as illustrated in FIG. 40;

FIG. 42 is a fragmentary, transverse cross sectional view taken through mobile living quarters incorporating a slide out room and illustrating a latching mechanism made pursuant to still another embodiment of the present invention, the latching mechanism being illustrated in the release position permitting movement of the slide out room relative to the main living quarters;

FIGS. 48 and 49 are views similar to FIGS. 44 and 45 respectively, but illustrating still another embodiment of the actuation mechanism illustrated in FIGS. 44 and 45.

FIG. 53 is a fragmentary cross sectional view taken substantially along lines 53—53 of FIG. 52;

FIG. 54 is a view similar to FIG. 53, but illustrating the various components of the latching mechanisms and their positions when the retractable room is fully retracted into the mobile living quarter and the upper portion of the room is latched to the main living quarters;

FIGS. 55 and 56 are views similar to FIGS. 47 and 48, but illustrating still another alternate embodiment of the invention;

DESCRIPTION OF EMBODIMENTS OF THE INVENTION

Figure 1:
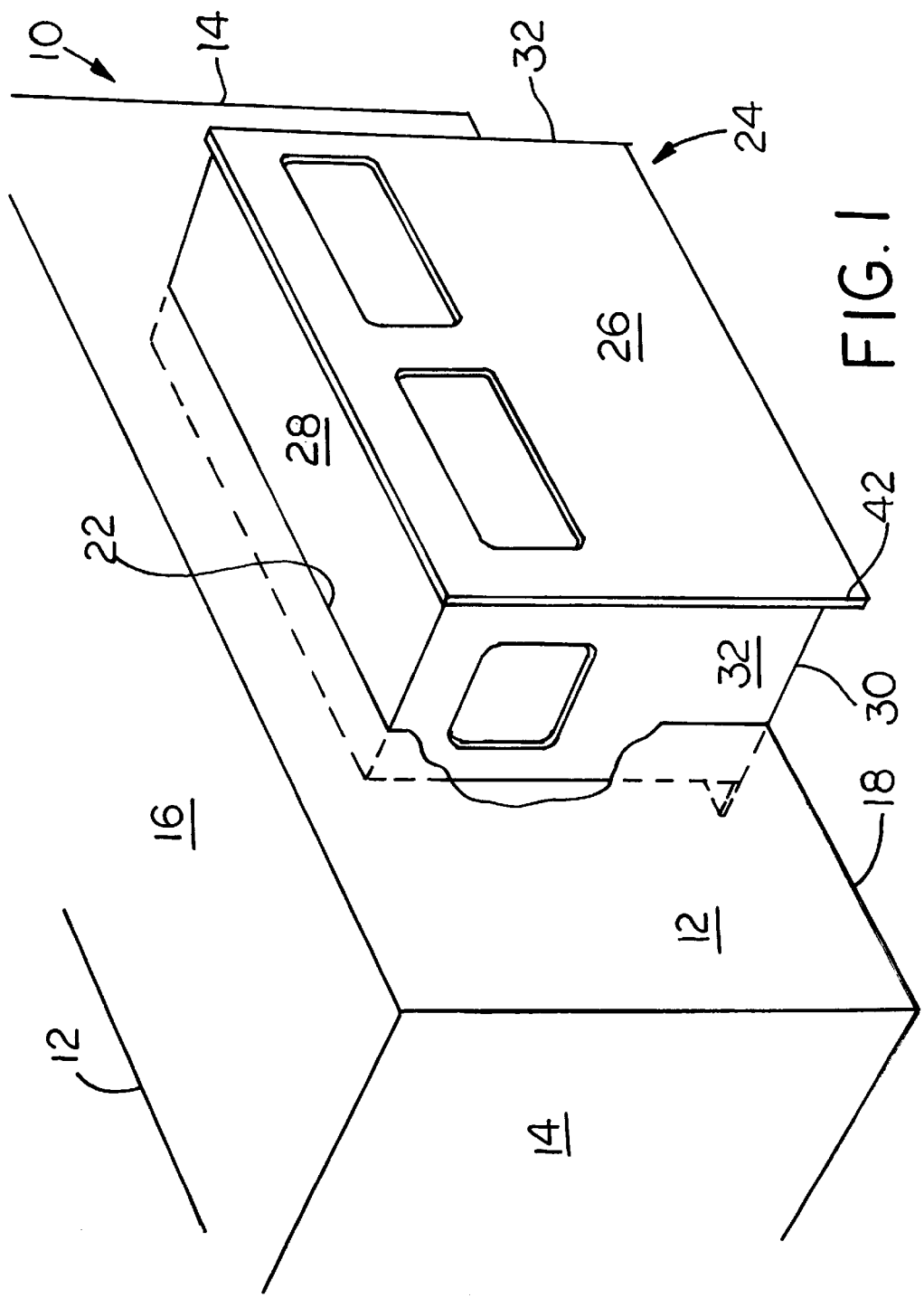
FIG. 1 is a view in perspective of a mobile living quarters with a slide out room partially extended from the main living area.
Figure 5:
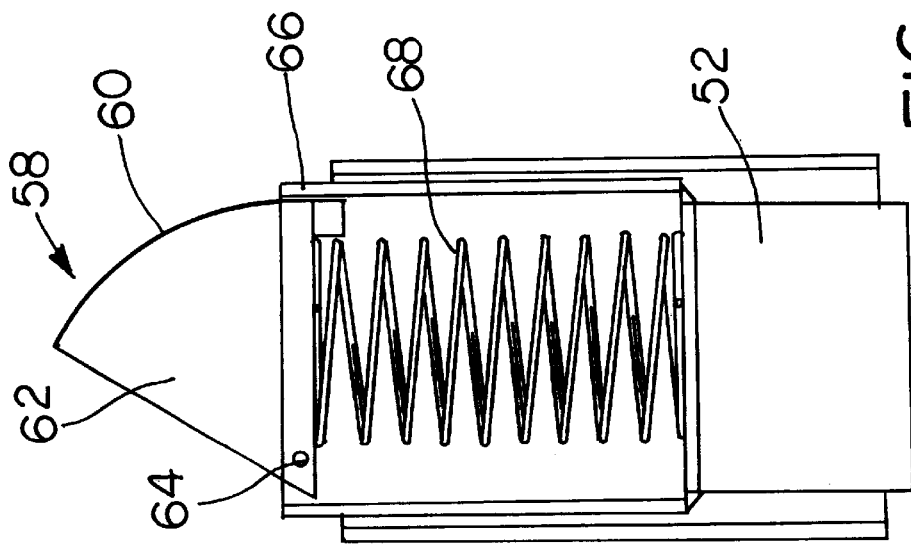
FIGS. 5 and 6 are detailed views of the upper circumscribed portion of FIG. 3 illustrating components of the latching mechanism which allows deflection of the latch to accommodate travel by the retractable room from the fully retracted position.

This application discloses multiple embodiments. Elements the same or similar to elements in each of the embodiments retain the same reference character.

Referring now to the drawings, mobile living quarters generally indicated by the numeral 10 is defined a side wall 12, end walls 14, and a ceiling or upper wall 16, and a floor 18. Mobile living quarters 10 is supported on longitudinally extending, transversely spaced frame members 20. One of the walls 12 is provided with an aperture 22 for receiving the slide out room generally indicated by the numeral 24 which can be extended from the main living quarters 10 to provide auxiliary living space when the unit is parked for use, but which may be retracted into the main living quarters 10 through the aperture 22 when the unit is to be moved. The wall 12 includes a header 23 extending across the aperture 22.

The slide out room 24 includes front wall 26, ceiling 28, floor 30 and opposite side walls 32. The slide out room 24 is supported for movement between the extended and retracted positions by telescoping support tubes generally indicated by the numeral 34. Hydraulic rams (not shown) of conventional design, are provided to move the slide out room between the extended and retracted positions. The front wall 26 includes a projection portion or fascia 36 that projects beyond the ceiling 28 and the side walls 32. A conventional seal 38 is compressed between the fascia 36 and a corresponding sealing surface 40 on the wall 12 to effect a seal between the side out room 24 and the main living quarters 10 when the slide out room is moved into the retracted position.

The support tubes 34 may be equipped with a tilting mechanism of the same general type shown in our prior U.S. patent application Ser. No. 08/789,162, filed Jan. 24, 1997. This tilting mechanism pivots the slide out room 24 relative to the main living area a very small amount as the slide out room is moved into the fully retracted position. This pivoting is just sufficient to assure that the seal 38 is compressed between the fascia 36 and that portion of the wall 12 adjacent the aperture 22. The aforementioned hydraulic rams (not shown) and the support tubes 34 are secured to the portion 42 of the front wall 26 that projects below the floor 30 of the slide out room 24. The floor 30 of the slide out room is partially supported on a wear bar 44 that extends across the lower side of opening 22 as the slide out room is extended and retracted.

Since the support tubes 34 and the hydraulic rams (not shown) which support and operate the slide out room 24 are attached to the lower portion 42 of the wall 26, complete retraction of the lower portion of the slide out room 24 can be assured. However, since the slide out room cannot be made totally rigid, and because of inherent deflection of the room, portions of the room that are further away from the actuators may not fully close against the seal 38 and the sealing portion 40 of the wall 22 thereby permitting rain, snow, and other environmental elements to enter the living areas of the unit. Accordingly, it has become common to provide a manually installed travel lock adjacent the ceiling 28 of the slide out room to clamp the upper portion of the fascia 36 against the seal 38 and the sealing surface 40. This conventional travel lock must be installed and removed each time that the unit is transported and since installation and removal must be done manually, it often is difficult and inconvenient for the user to install a conventional travel lock. According to the present invention, an automatic travel lock is provided which automatically engages to assure proper positioning of the slide out room 24 whenever the slide out room is moved from the extended position to the retracted position in preparation for transporting. The travel lock is automatically released when the room is moved from the retracted position to the extended position.

Figure 6:
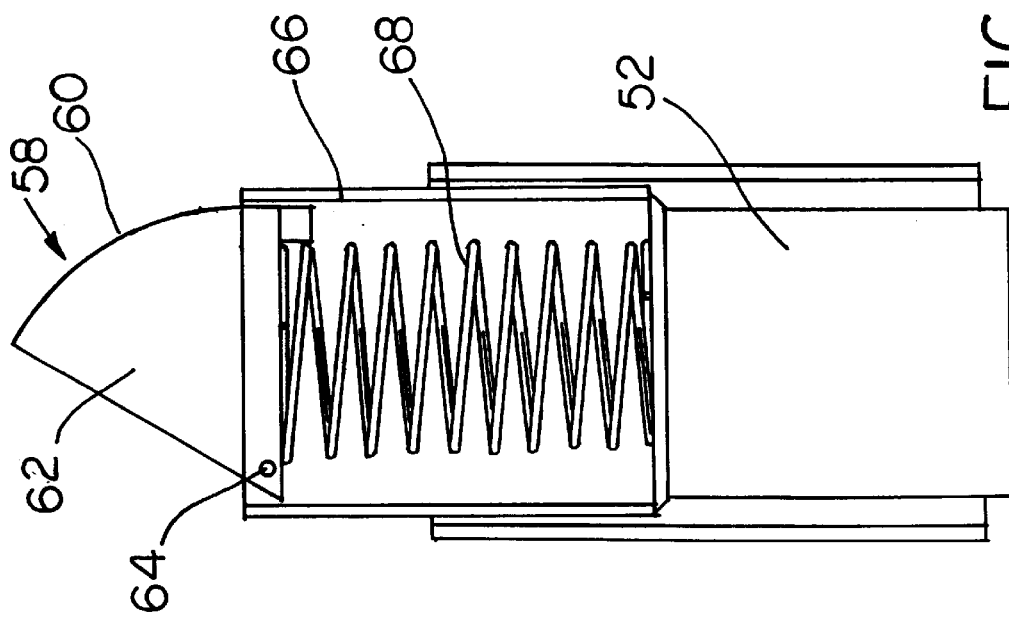
Figure 9:
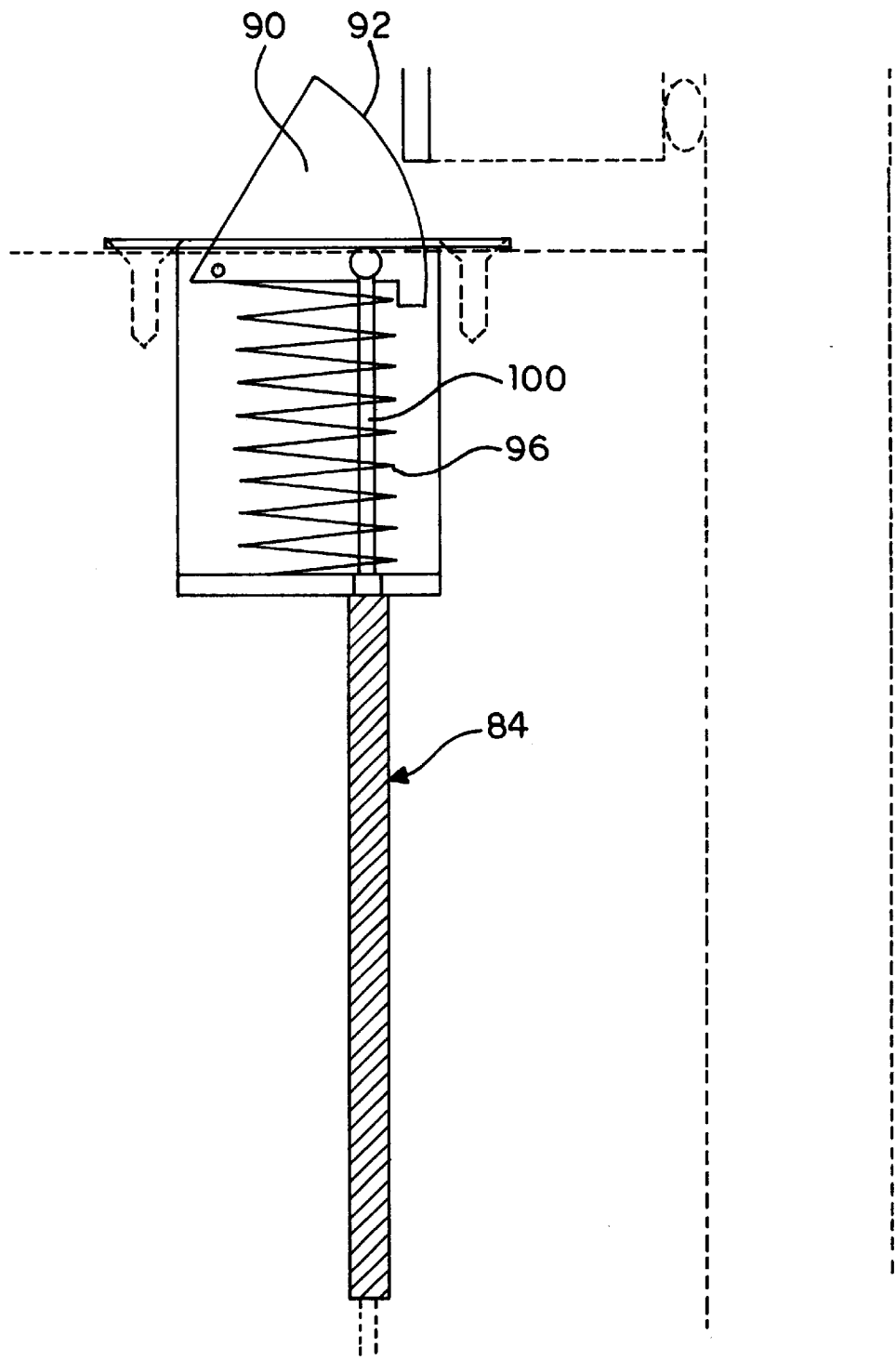
FIG. 9 is a enlarged detailed view of the circumscribed portion of FIG. 8 but illustrating a modified latch mechanism.

Referring now to FIGS. 2–6, one embodiment of the invention includes a lever 46 which is received within a compartment 48 defined within side wall 32 of the slide out room 24. Lever 46 is pivotally connected to the side wall 32 by a pivot 50 extending through one end of the lever 46, and an actuating link 52 is pivotally connected by pivot pin 54 in slotted aperture 56 of the lever 46. The link 52 extends upwardly, preferably within the corresponding side wall 32 and terminates in a latch generally indicated by the numeral 58 at the end of the link 52 opposite the end attached to the lever 46. The link extends through the wall 32 offset from the fascia 36 a distance substantially equal to the thickness of the wall 12 and the seal 38. Latching member 58 includes a curved surface 60 defined on a member 62 which is pivotally mounted by pivot 64 on a caging member 66 slidably mounted on the link 52 and urged upwardly relative to the link 52 toward a stop (not shown) extending from the link 52 by a spring 68. The latch 58 is illustrated in a position in which it is fully extended from the link. The cage 66 is biased into engagement with the aforementioned stop (not shown). In FIG. 6, the cage 66 is illustrated in a lowered position. Accordingly, it will be noted that as the slide out room 24 is withdrawn from the extended position to the retracted position, the latch member 62 will be flexed about the pivot 64 and the spring 68 will compress to allow the latching 58 to move past the wall 12, whereupon the spring 68 will bias the member 62 such that a point on the curved surface 60 will engage the inner surface of the wall 12, thus locking the upper portion of the slide out room 24 in place.

The end of the link 52 attached to the lever 46 extends through a caging member 70 which is mounted in the lower portion of the wall 32 and extends through the cavity 48. A spring 72 is disposed between the end of the caging member 70 and a shoulder 74 on the link 52, thereby biasing the link 52 downwardly viewing the Figures. As the link 52 is biased downwardly, it will be seen that (viewing FIGS. 2–4), when the slide out room 24 is in the fully retracted position, the end of the lever 46 adjacent the pivot 54 will engage the wear bar 44 or other surface on the main living area thus maintaining the link 52 in its upward most position, allowing the latch 62 to engage the wall 12 and lock the slide out room 24 in the retracted position.

As discussed above, the actuators which move the slide out room 24 between the extended and retracted positions are engaged with the lower portion 42 of the outer wall 26, the slide out room 24 is only semi-rigid, and the portions of the room adjacent the upper portion of the walls 32, 26 can deflect relative to the lower portion as the slide out room is moved. When the slide out room is extended from the retracted position, the upper portion of the room remains locked in place by latching mechanism 58 while the lower portion is moved by the aforementioned actuators in an amount sufficient to allow the lever 46 to pass beyond the wear bar 44. When this occurs, the lever 46 drops from the FIG. 4 position to the FIG. 3 position, thereby also moving the link 52 downwardly viewing the Figures an amount sufficient to withdraw the latching mechanism 58 sufficiently that the latch can pass beneath the lower edge of the wall 12 defining the upper edge of the aperture 22. It will be noted that, when the room is retracted, even though the lower portion of the room will reach the fully retracted position first causing the lever 46 to be moved in its upward position illustrated in FIG. 4, that the latching mechanism 58 will still pass below the wall 12 due to the pivot connection between the member 62, 64, and because the spring 68 allows the entire latching assembly 58 to deflect.

Figure 10:
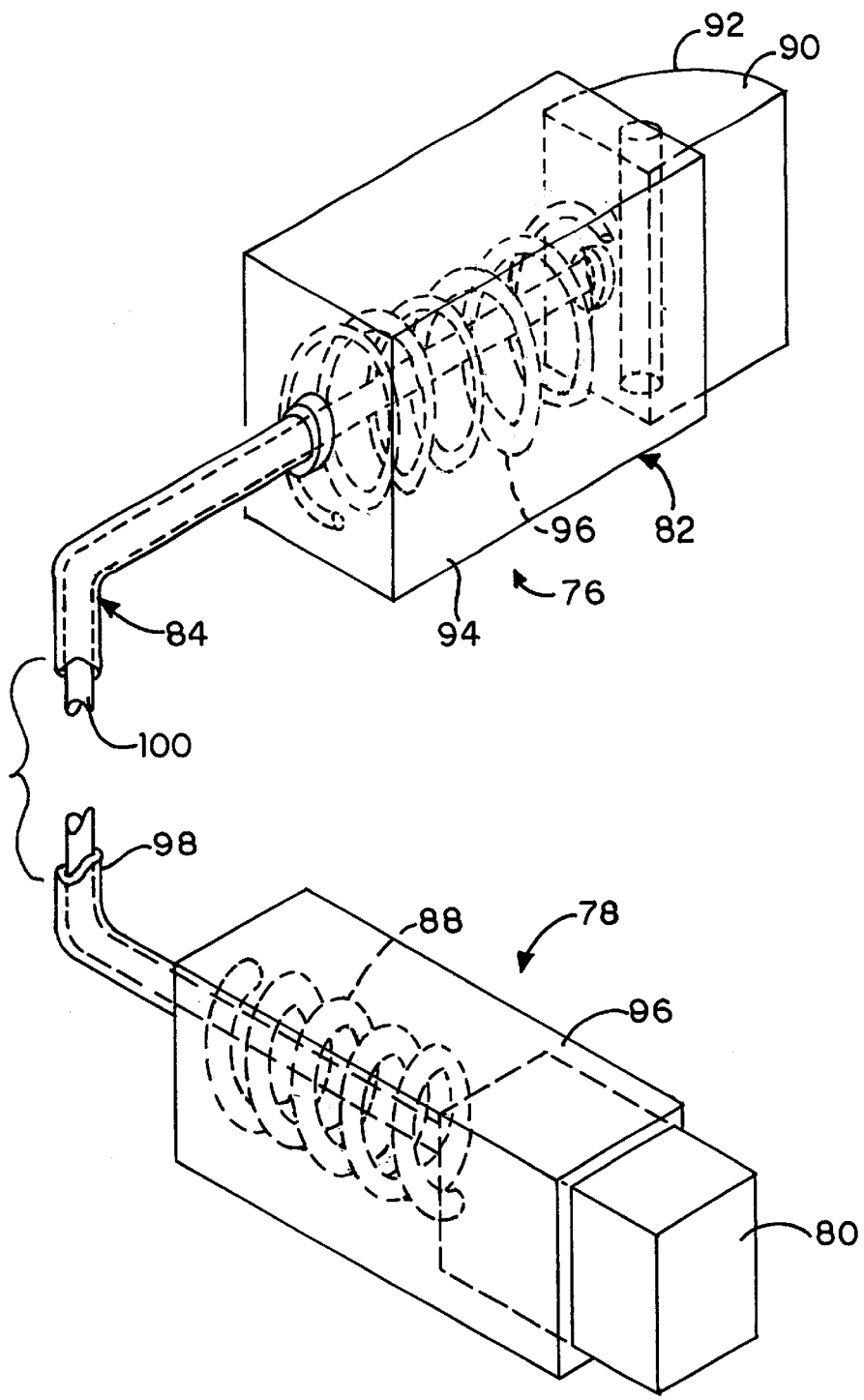
FIG. 10 is a view in perspective of the latching mechanism illustrated in FIGS. 7-9 separated from the mobile living quarters.

Referring now to the embodiment of FIGS. 7–10, the slide out room 24 is latched to the main living area 10 as the slide out room is moved into the retracted position illustrated in FIG. 8 and disengaged for movement as illustrated in FIG. 7 by a latching mechanism generally indicated by the numeral 76. Latching mechanism 76 includes an actuator 78 that is operated upon engagement of link 80 of actuator 78 with the floor 18 of main living quarters 10. A latch assembly generally indicated by the numeral 82 is mounted within the wall 26 at the ceiling 28 thereof such that the latch 82 engages a recess 84 in the wall 12 of main living quarters defining the upper edge of the aperture 22, and a Bowden cable 84 extends along or through one of the walls 26–32 to interconnect the actuator 78 with the latch assembly 82. Referring now to FIG. 10, the actuator 78 includes a housing 86 which encloses a coiled spring 88 that yieldably urges the link 80 out of one end of the housing 86. Instead of the simple link disclosed in FIGS. 7–8, the latch assembly 82 may include a latch member 90 having a curved outer surface 92 for engagement with the wall 12. The latching assembly 82 includes a housing 94 which encloses a spring 96 which biases the latch member 90 toward the actuated position engaging corresponding portions of the wall 12. The Bowden cable 84 includes an outer sheath 98, one end of which is attached to the housing 86 and the other end of which is attached to the housing 94. An inner cable 100 is slidable within the sheath 98, and one end of cable 100 is attached to link 80, and the other end of cable 100 is attached to the latch member 90. The spring 88 generates substantially more force than does the spring 96, so that when the room 24 moves away from the floor 18, the spring 88 urges the link 80 outwardly from the housing 86, thereby pulling the inner cable 100 to depress the latch member 90 in opposition to the spring 96. The wall portion of the slide out room 24 may be moved a few inches (sufficient so that the link 80 may be urged to the position illustrated in FIGS. 7 and 10) while the upper portion of the slide out room remains latched thereby releasing latch 82. When the slide out room 24 is retracted into the main living area the link 80 engages the edge of the floor 18, thereby compressing the spring 88 and thereby allowing the spring 96 to urge the latch member 90 into the actuated condition engaging the corresponding portion of the wall 12.

Figure 13:
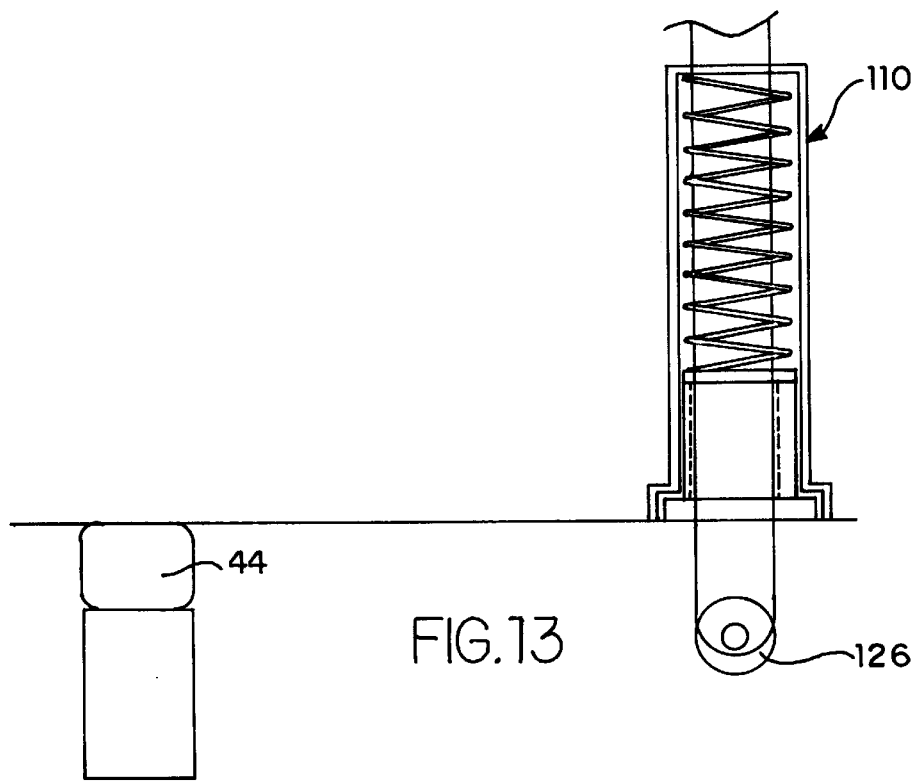
FIG. 13 is a detailed view of the circumscribed portion of FIG. 11.
Figure 14:
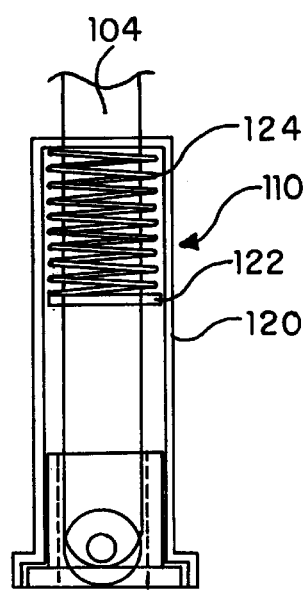
FIG. 14 is a detailed view of the circumscribed portion of FIG. 12.
Figure 18:
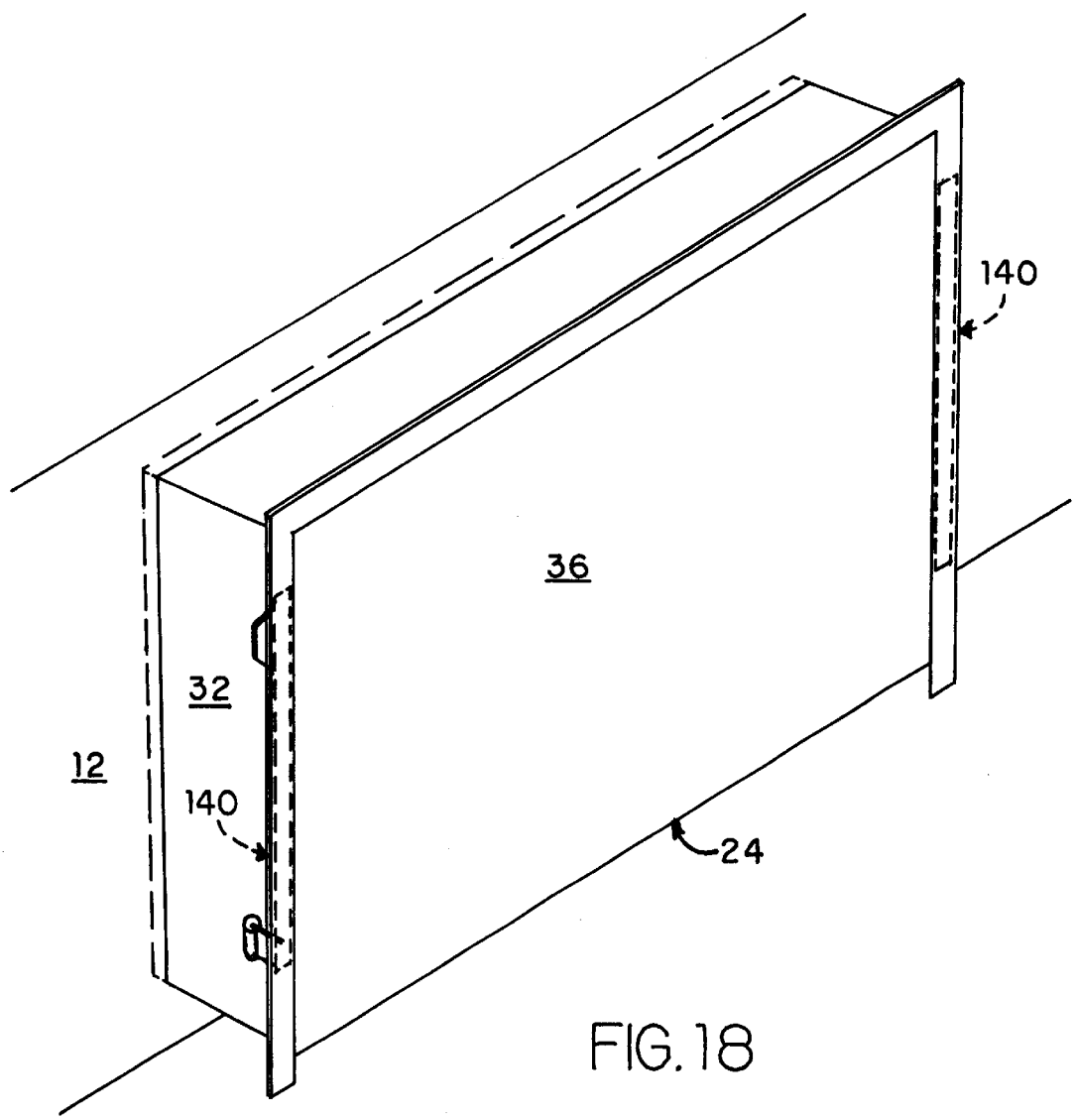
FIG. 18 is a view in perspective of a slide out room extended from main living quarters and incorporating the latching mechanism of FIGS. 15-17.

Referring now to the embodiment of FIGS. 11–14, a slide out room latching mechanism generally indicated by the numeral 102 includes a link 104 extending vertically within the wall 32, one end of which is connected to an actuating lever 106 via a pivot 108 and the opposite end of which is connected to an actuating mechanism 110 (FIGS. 13 and 14). The lever 106 and pivot 108 are part of a latching mechanism generally indicated by the numeral 112, which also includes another lever 114, one end of which is pivotally connected to the ceiling 28 by pivot 116. The other end of the lever 114 carries an adjustable pressure pad 118 for engagement with an interior surface of the portion of the wall 12 adjacent the upper edge of aperture 22. The end of the lever 106 opposite the end connected to the link 104 is connected to the lever 114 by a pivot connection 119.

The actuating mechanism 110 includes a spring retainer 120 which is mounted in side wall 32 adjacent to the floor 30 and through which the link 104 extends. Link 104 is provided with a shoulder 122 through which a spring 124 extending between the end of the retainer and the shoulder 122 fairs. The spring 124 urges the link 104 downwardly viewing the Figures. The end of the link 104 is provided with a roller 126. The end of the floor 18 is provided with a ramp 128. When the slide out room 24 is in the fully retracted position illustrated in FIG. 12, the roller 126 rests at the top of the ramp 128, and, because of the lever 106, the lever 114 is rotated about the pivot 116 so that the pad 118 engages the portion of the wall 12 adjacent the aperture 22, thereby locking the slide out room 24 in the retracted position. When the slide out room 24 is moved to the extended position, as discussed above, the lower portion of the room is moved a few inches outwardly while the actuating mechanism 112 remains in the actuated position with the pad 118 in engagement with the wall 12. When the room has been moved sufficiently to permit the roller 126 to roll down the ramp 128 (which is only a few inches long), the spring 124 urges the link 104 downwardly, thereby rotating the lever 114 from the position illustrated in FIG. 12 to the position illustrated in FIG. 11, thereby permitting the room to move to the fully extended position. When the room is again retracted, roller 126 rolls back up the ramp 128 thereby causing the link 102 to operate the lever 106 to again rotate the lever 114 back into the position illustrated in FIG. 12.

Referring now to the embodiment of FIGS. 15–25, each sidewall 32 joins with the front wall 26 at a corner 130. The fascia 36 extends past the corner 30. The latching mechanism 140 is tucked behind the fascia 36 and mounted on the side wall 32 as close as possible to the fascia 36. Referring to FIG. 21, the wall 12 of the main living quarters include a relatively short portion 134 that projects into the aperture 22. A lip seal generally indicated by the numeral 136 extends from transversely extending portion 138 of wall 12 that defines the edge of the aperture 22. Seal 136 includes the active portion 141 that slides along side wall 32 as the slide out room 24 is extended and retracted. The slide out room 24 is latched to the portion 134 by a latching mechanism 140.

Figure 19:
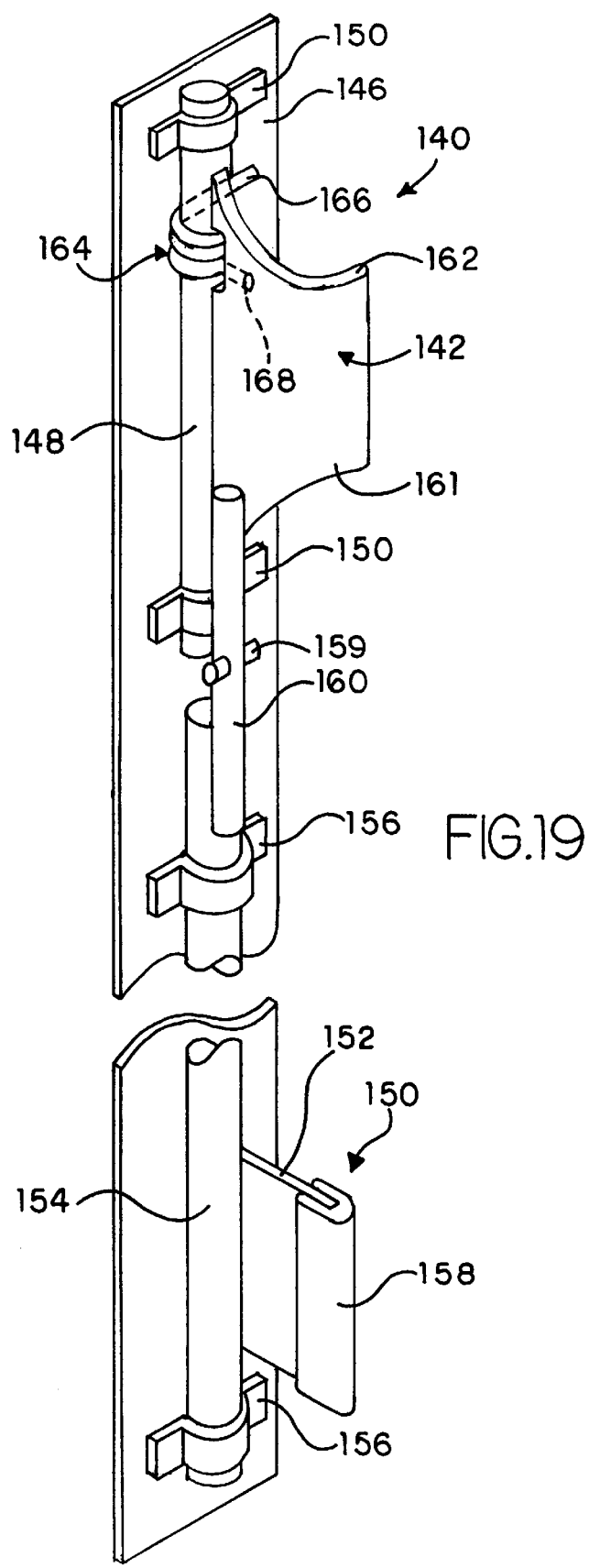
FIG. 19 is a view in perspective of the latching mechanism used in the slide out room illustrated in FIG. 18, the latching mechanism being illustrated in the latched condition.

Latching mechanism 140 includes a latch member 142 that is rotated around the edge of a portion of 134 to engage the side of the portion 134 adjacent the seal 136. However, it is desirable that the latch member 142 and its operation not interfere with the seal 136. A seal 144 is carried on the fascia 36 and extends around the side walls 32 and the front wall 26. The latching mechanism 140 is illustrated in FIGS. 19 and 21 in the fully closed position and in FIGS. 20 and 22 in their fully open position. FIGS. 22–25 illustrate the latching mechanism in a progression of steps as the latch 142 is moved around the portion 134 to latch the slide out room 24 in place.

Figure 20:
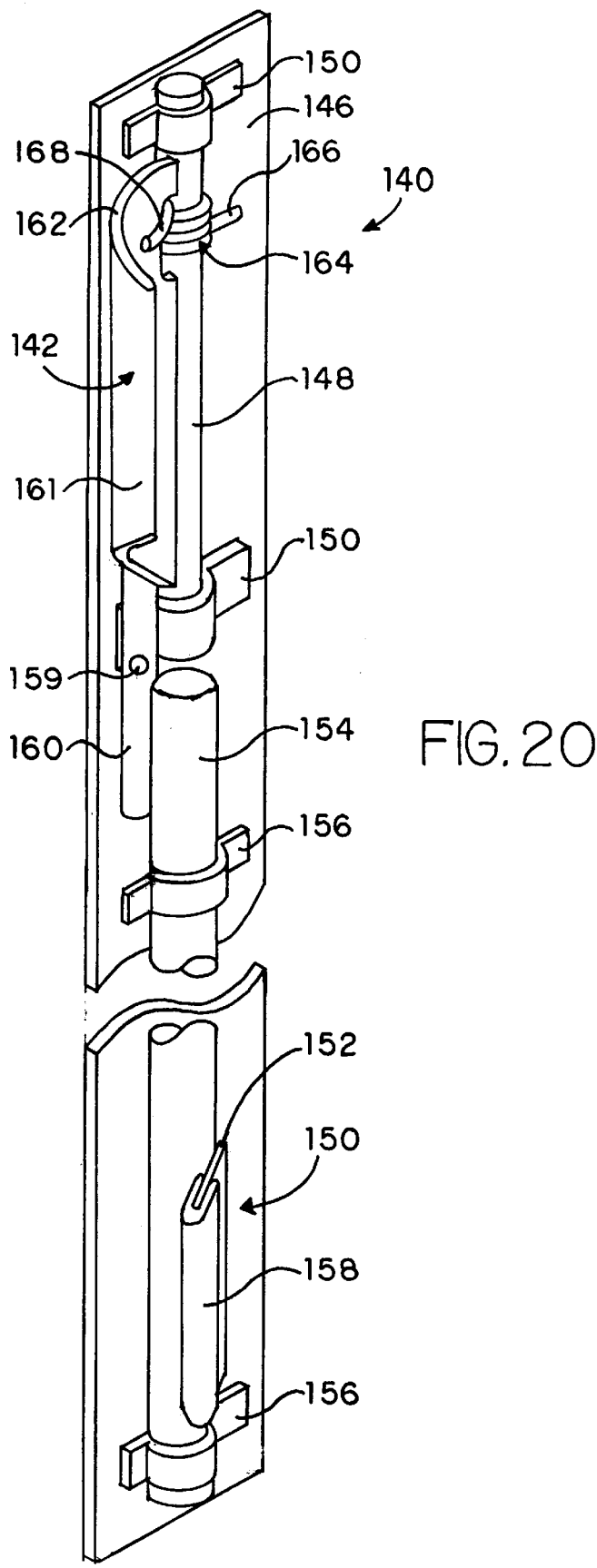
FIG. 20 is a view similar to FIG. 19 but illustrating in the latching mechanism in the released condition.

Referring now to FIGS. 19 and 20, the latching mechanism 140 includes a base plate 146 which is secured to the corresponding side wall 32 as close as possible to the corner 130 thereof and just behind the fascia 36. The latch 142 is mounted for rotation with a shaft 148 which is secured to the base plate 146 by attachment devices 150. The latch 142 is operated by an actuator generally indicated by the numeral 151, which includes a paddle 152 rigidly mounted on shaft 154, which is secured to base plate 146 by attachment fixtures 156. A resilient sleeve 158 is slipped over the end of the paddle 152. The paddle 152 is adapted to engage the wall 12 as the slide out room is retracted to actuate the latch 142 as will hereinafter be explained. It will be noted that the axis of the shaft 148 is offset from the axis of the shaft 154. An actuating member 160 is secured to shaft 154 for rotation therewith and engages the side 161 of latch 142 opposite tip 162 which is adapted to engage with the projecting portion 134. A coil spring 164 is wrapped around the shaft 148 and includes an arm 166 which bears against the base plate 146 and another arm 168 which bears against the latch 142 biasing the latter against the actuating member 160 and then biasing the shaft 154 in a counter clockwise direction to urge the paddle 152 into the position illustrated in the FIG. 20. The purpose of the off set between the shafts 148 and 154 is to permit an initial gap between the tip 162 of latch 142 and the resilient sleeve 158 sufficient to permit the latch to easily wrap around the outer edge of the projecting portion 134 as the slide out room advances toward the wall 12 while permitting this gap to close down to assure that latch 142 and the sleeve 158 are tightly engaged with projecting portion 134 when the slide out room 24 is fully retracted. The offset between the shafts 148 and 154 also permits latch 142 to rotate a proportionally greater distance than the paddle 152 rotates. The initial position of latch 142 can be adjusted by set screw 159.

Figure 23:
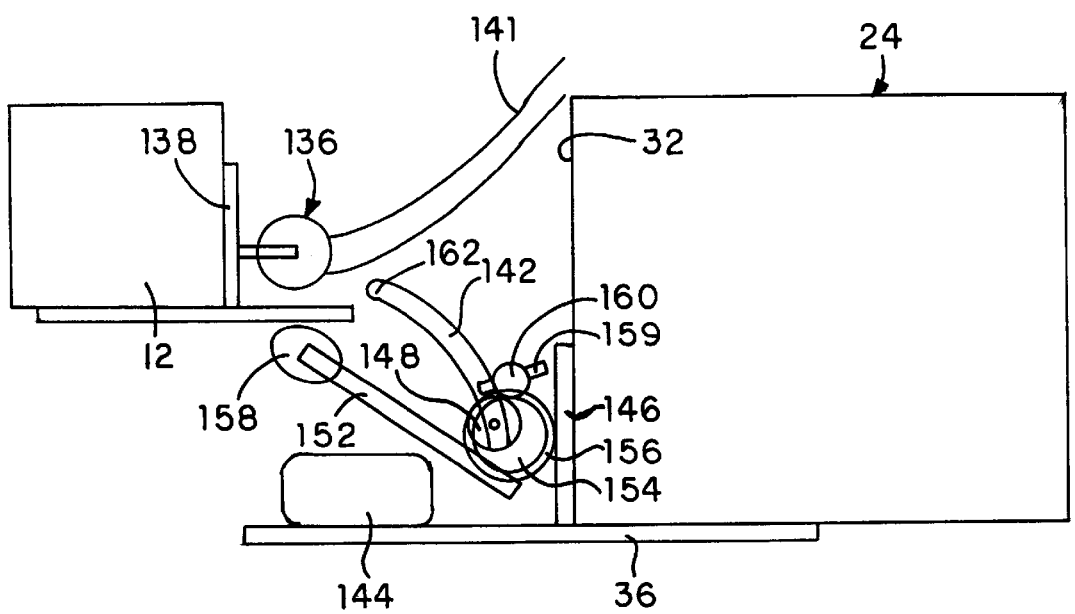
Figure 24:
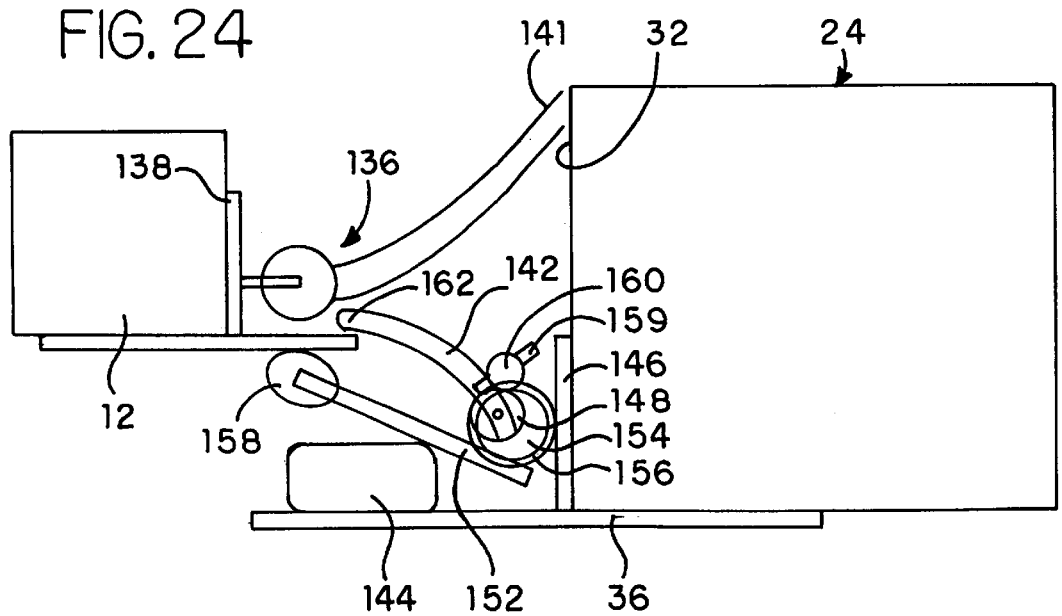
Figure 25:
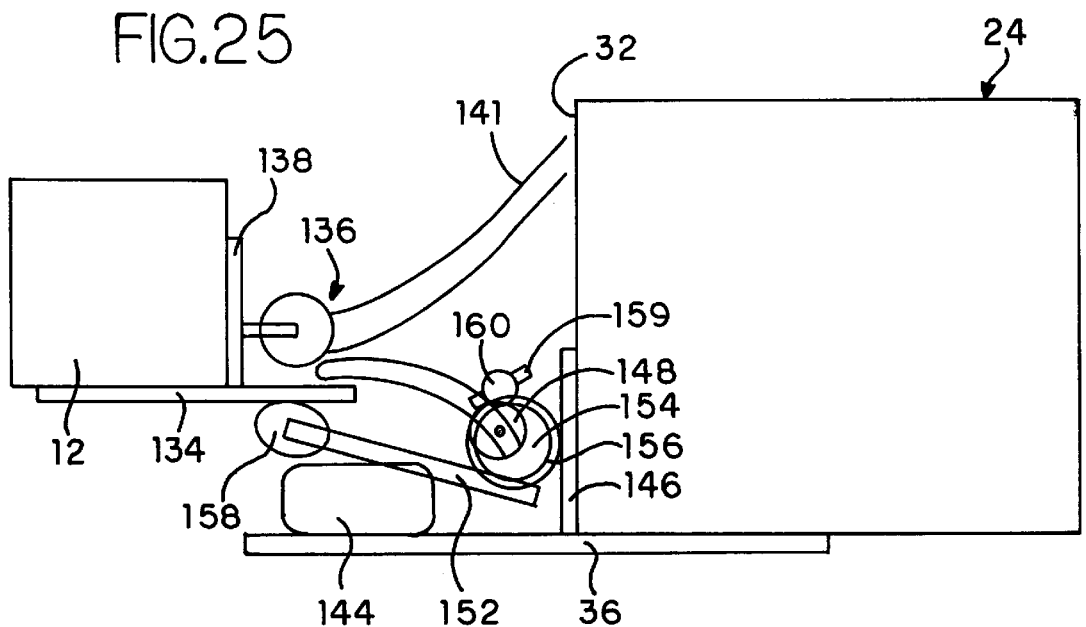

As seen in FIGS. 22 and 23, as the slide out room 24 is advanced toward the wall 12, the initial gap is maintained between the tip 162 and sleeve 158 until the sleeve 158 engages the wall 12 as illustrated in FIG. 23. Further retraction of the slide out room 24 causes the wall 12 to rotate the paddle 152 in a counterclockwise direction viewing FIGS. 21–25. As can be seen in FIG. 23, when the sleeve 158 initially contacts projecting portion 134, the latch 142 is just beginning to wrap around the projecting portion 134 and enter the gap G defined between the seal 136 and the projecting portion 134. As illustrated in FIGS. 24 and 25, as the slide out room 24 continues to advance towards the wall 12, the paddle 152 continues to be rotated, thus causing the actuating member 160 to rotate the latch 142 in opposition to the spring 164, causing the tip of 162 of latch 142 to enter the gap G without substantial interference with the seal 136. As illustrated in FIGS. 25 and 21, as the slide out room 24 closes against the wall 12 towards its fully retracted position, the distance between the tip 162 the sleeve 158 continues to close, again due to the offset between the axis of the shafts 154 and 148. In the fully closed position illustrated in FIG. 21, when the room is fully retracted, the sleeve 158 is compressed against one side of the projecting portion 134, and the tip 162 is engaged with the opposite side of the projecting portion, thereby locking the slide out room 24 in the fully retracted position. As the slide out room is advanced away from the fully retracted position to the extended position, the spring 164 maintains the latch 142 in engagement with the actuating member 160, so that the paddle 152 is rotated with the latch 142 back to the open position illustrated in FIG. 22 after the slide out room moves away from the fully retracted position a sufficient distance.

Referring now to the embodiment of FIGS. 26–31, the latching mechanism 168 includes a base plate 170 which is secured to a corresponding side wall 32, and is tucked behind the fascia 36 similar to the manner of base plate 146 in the previous embodiment. Since the latching members 168 mounted on the side walls 32 on opposite sides of the slide out room 24 (FIG. 26) are substantially identical, only one of the latching mechanisms 168 will be described in detail. Latching mechanism 168 includes a vertically extending shaft 172 which is mounted for rotation relative to the base plate 170 by appropriate fasteners (not shown) similar to the fasteners 150 in FIG. 20. An actuator or paddle 174 is secured for rotation with the shaft 172, and paddle 174 carries a resilient sleeve 176 on the lower end thereof, viewing FIGS. 30 and 31. The opposite end of the shaft 172 is received in an axially extending recess (not shown) of a larger diameter stub shaft 178. A coiled clutch spring 180 interconnects the shafts 172 and 178 such that at relative torques below a predetermined level the stub shaft 178 turns with the shaft 172, but when the relative torques between stub shaft 178 and shaft 172 exceed the predetermined level, the shaft 172 is allowed to rotate relative to the shaft 178.

Latching mechanism 168 further includes a latch member generally indicated by the numeral 182, which includes a pair of arms 184, 186. The arm 186 is pivotally connected to the arm 184 by a hinge 187 which pivots about pivot hinge pin 188. It will be noted that the diameter of the pin 188 is substantially less than the diameter of the stub shaft 178. A resilient sleeve 190 is received on the end of the arm 186. A reinforced fibrous web or similarly flexible material generally indicated by the numeral 192 is attached at one end to the stub shaft 178 by fasteners 194 and is threaded through a slot 196 defined between the arm 184 and a cover member 198 attached thereto. The web may be cotton or nylon reinforced webbing of the same general type used for seat belts or cargo tie-downs. The web 192 extends around the hinge 187 and is attached to the arm 186 by fasteners 200.

Figure 30:
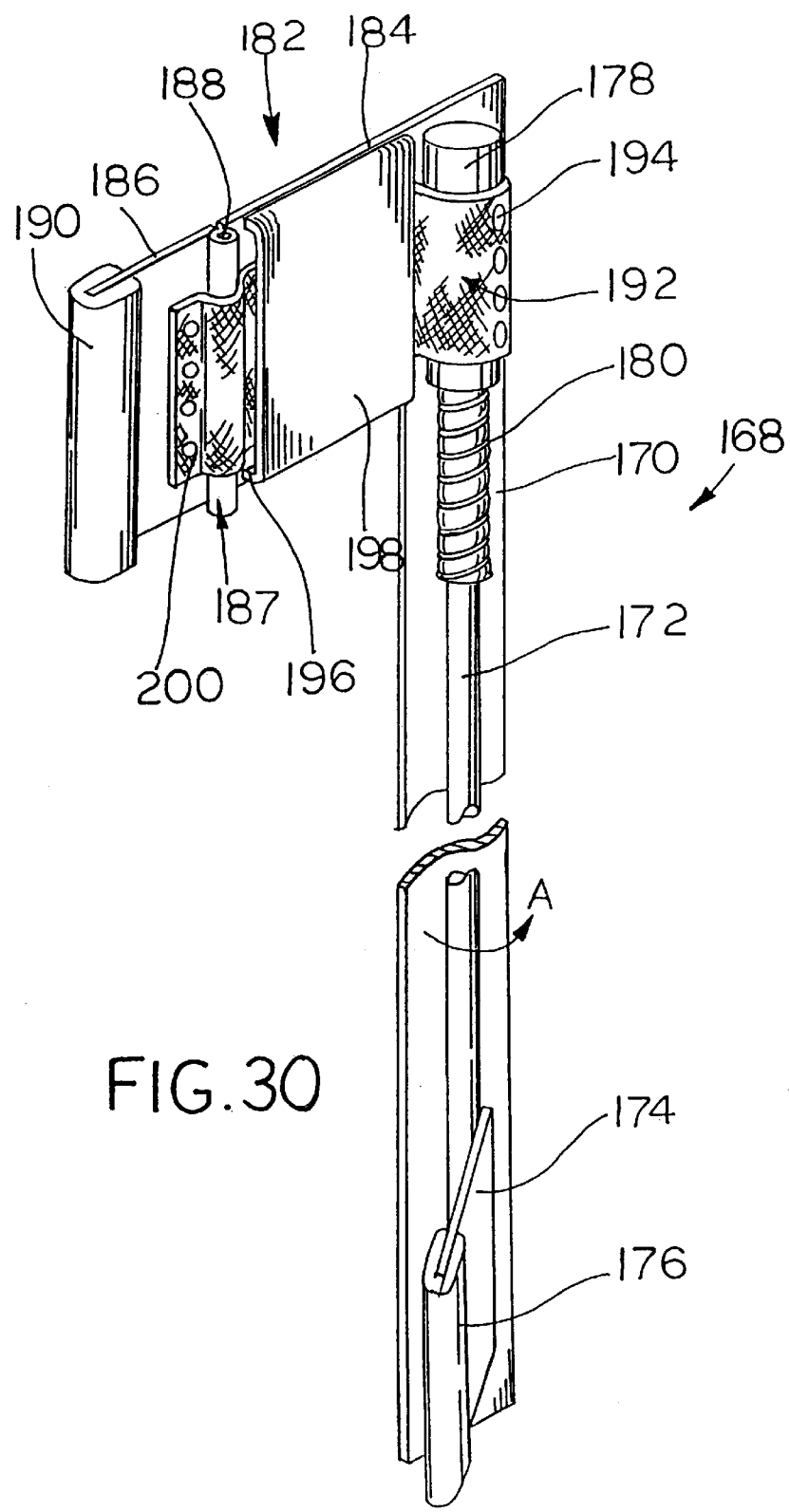
Figure 31:
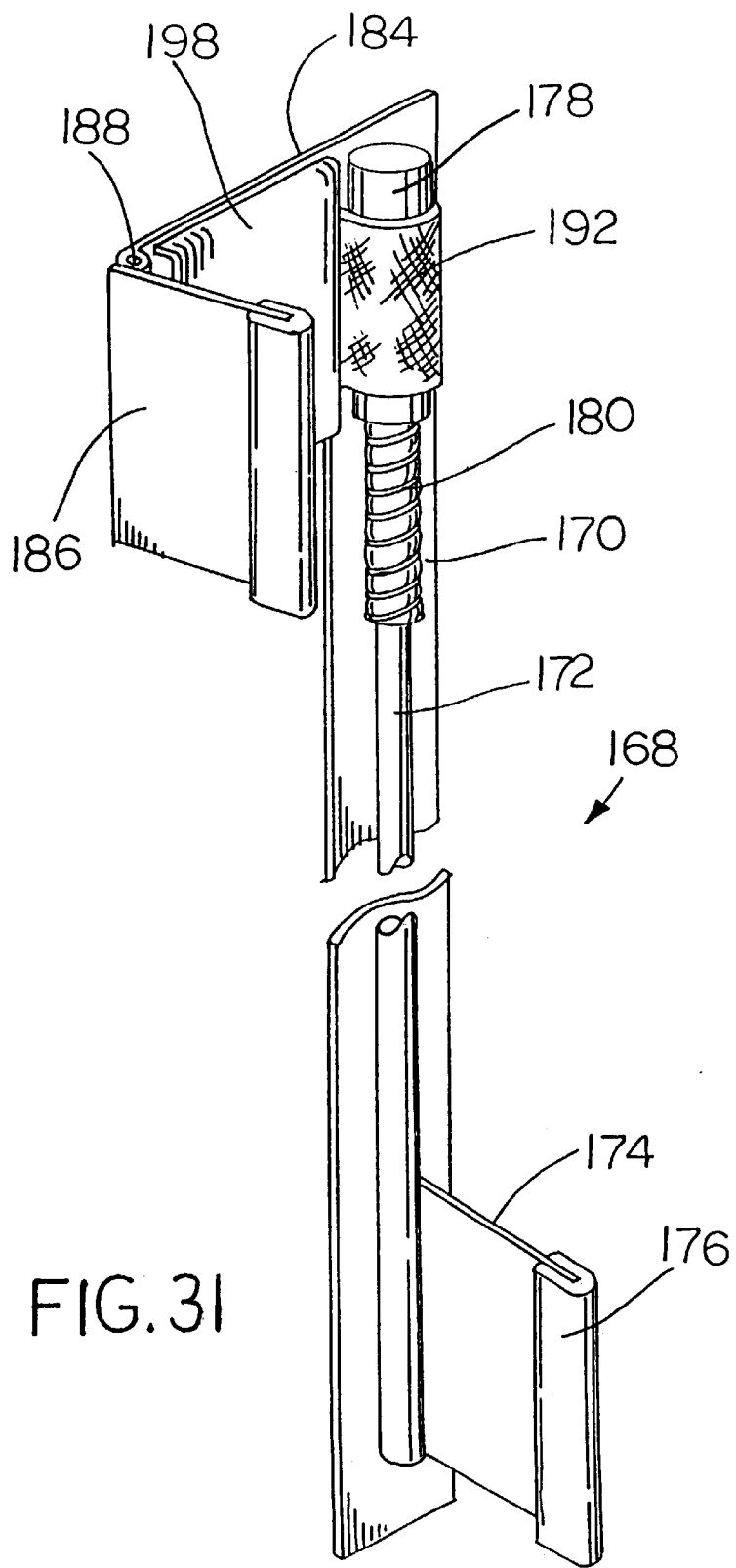

In operation, the various components of the latching mechanisms 168 are illustrated in FIG. 30 in the positions which they assume when the slide out room 24 is in the extended position and are illustrated in FIG. 31 in the positions which they assume when the slide out room is retracted into the main living area, as illustrated in FIG. 28. Referring to FIGS. 27 and 30, as the slide out room 24 is retracted into the main living area, the seal 136 wipes across the wall 132 and, when the room has been retracted sufficiently, wipes across the sleeve 190, the hinge 187 and onto the cover plate 198. As the slide out room 24 moves toward the retracted position, the actuator or paddle 174 engages the wall 12. Further movement of the slide out room toward the retracted position causes the actuator 174 to rotate the shaft 172 in the direction indicated by the arrow A on the FIG. 30. As this occurs, because of the driving connection between the shaft 172 and the shaft 178 provided by clutch spring 180, the stub shaft 178 will also rotate in the direction of arrow A, thereby winding the webbing 192 around the stub shaft 178. As the webbing is being wound, the arm 186 will pivot relative to the arm 184 about the hinge 187. Accordingly, the arm 186 will be pivoted from its substantially flat orientation illustrated in FIGS. 27 and 30 to its articulated orientation, illustrated in FIGS. 28, 29 and 31. In the articulated orientation, the sleeve 190 is engaged with the wall 12. It will be noted that, because of the difference in diameters between stub shaft 178 and hinge pin 188, the arm 186 will be rotated at a proportionately greater angle compared with the actuator 174. Accordingly, the sleeve 190 will be forced into engagement with the inner side of the wall 12 regardless of the thickness of the wall 12 (within limits). The latching mechanism 168 can be used on mobile living quarters made by different manufacturers, which may use walls of different thicknesses. It will also be noted that, after the sleeve 190 has engaged the wall 12 and is applying pressure thereto, and when the torque from the shaft 172 to the shaft 178 exceeds a predetermined torque level, the shaft 172 will slip relative to stub shaft 178. When the slide out room is moved away from the retracted position toward the extended position, as the actuator 174 is moved away from the outside of the wall 12 the clutch spring 180 rotates the shaft to a position returning the actuator 174 from the position illustration in FIG. 31 to the position illustrated in FIG. 30, and also causing the stub shaft 178 to unwind the webbing 192, thereby permitting the arm 186 to move back into the position illustrated in FIG. 30.

Referring now to the embodiment of FIGS. 32–37, latching mechanism 202 is tucked in behind the fascia 36 in the same position as the latching mechanism 140 in the embodiment of FIGS. 15–25. As in this earlier embodiment, one of the latching mechanisms 202 is installed on each of the side walls 32. Lip seals generally indicated by the numeral 204 extend transversely from the end of the wall 12 that defines the edge of the aperture 22. The seals 204 in the present embodiment are similar to the seal 136 in the embodiment of FIGS. 15–25.

The latching mechanism 202 includes a base plate 206 which is secured to the side wall. A lever 208 is pivotally mounted on the base plate 206 by a pivot 210, and a lever 212 is pivotally mounted on the base plate 206 by a pivot 214. The upper end of the lever 212 operates a latch generally indicated by the numeral 218, as will hereinafter be described. An extension 220 projecting outwardly from the side wall 32 at the lowermost end of the lever 208 is adapted to engage the wall 12 of the slide out room 24 as the slide out room is retracted within the main living quarters. As the slide out room is retracted further after initial engagement between the extension 220 and the wall 12, the lever 208 is rotated around the pivot 210 from the FIG. 32 position to the FIG. 34 position. This rotation of the lever 208 is transmitted to the lever 212 through a tongue and socket joint generally indicated by the numeral 222.

Accordingly, as the slide out room 24 is advanced toward the mobile living quarters, the extension 220 will initially contact the wall 12 as the outer wall 26 of the slide out room approaches the wall 12. As the slide out room 24 is further moved toward the fully retracted position, the levers 208, 212 are progressively moved from the positions illustrated in FIG. 33 toward the positions illustrated in FIG. 35. A cover 224 is mounted on the base plate 206 and covers the levers, and the extension 220 projects outwardly below the lower edge 226 of the cover 224.

Latch 218 includes a base plate 228 which extends transversely from the upper edge of base plate 206 and projects toward the main living quarters. A cover 230 includes edge portions 232 which are secured to the base plate 228 such that the cover 230 cooperates with the base plate 228 to define an elongated cavity 234 therebetween. An aperture 236 is defined in the cover 230 and receives latch members 238 and 240, contiguous ends of which are pivotally interconnected by a pivot pin 242. An aperture 244 is provided in the latch member 240 which receives a tongue 246 which projects from and is integral with the latch member 238. Pivot pin 242 is secured to the tongue 246 near its juncture with latch member 238 and is secured to the side 248 of the tongue 246 facing into the cavity 244. The length of the pin 242 is such that the pin will move through the aperture 236.

Latch member 240 defines a recess 250 adjacent the end thereof opposite the end connected to the latch member 238 by the pivot pin 242. A pin 252 is secured to arms 254 on latch member 240 defined on opposite sides of the recess 250. End portions 256 of the pin 252 extend into the recess 234 on opposite sides of the aperture 236. Similarly, another aperture 258 is defined in the latch member 238 on the edge thereof opposite the edge from which the edge 246 extends. The aperture 258 is defined between arms 260 of the latch member 238. A pin 262 extends upwardly from the upper arm 260, and an identical pin 264 extends downwardly from the lower arm 260. Pin 262 is received within a portion of cavity 234 defined by partitions 266 to prevent the pin 262 from moving laterally within the cavity 234. Similarly, the pin 264 is received between similar partitions (not shown) in the portion of the cavity 234 below the lower edge of the aperture 236. A spring 268 extends between one of the partitions 266 and the upper portion of pin 252 to yieldably bias the pin 252 to the left viewing FIG. 36 and 37. A similar spring (not shown) engages the portion 256 extending below the aperture 236.

The aperture 258 is sufficiently wide that the upper end 270 of the lever 212 is received therein. A loop 272 of a reinforced fibrous web 274 of substantially the same material or similar material as the web 192 in the embodiment of FIGS. 15–25 fits over the end 270. The web 274 extends between the pin 242 and the base plate 228 and into the aperture 250 and is secured to the pin 256. The web 274 is sufficiently strong that forces exerted by the lever 212 are transmitted to the pin 256, but is sufficiently elastic for purposes to be hereinafter explained.

Figure 36:
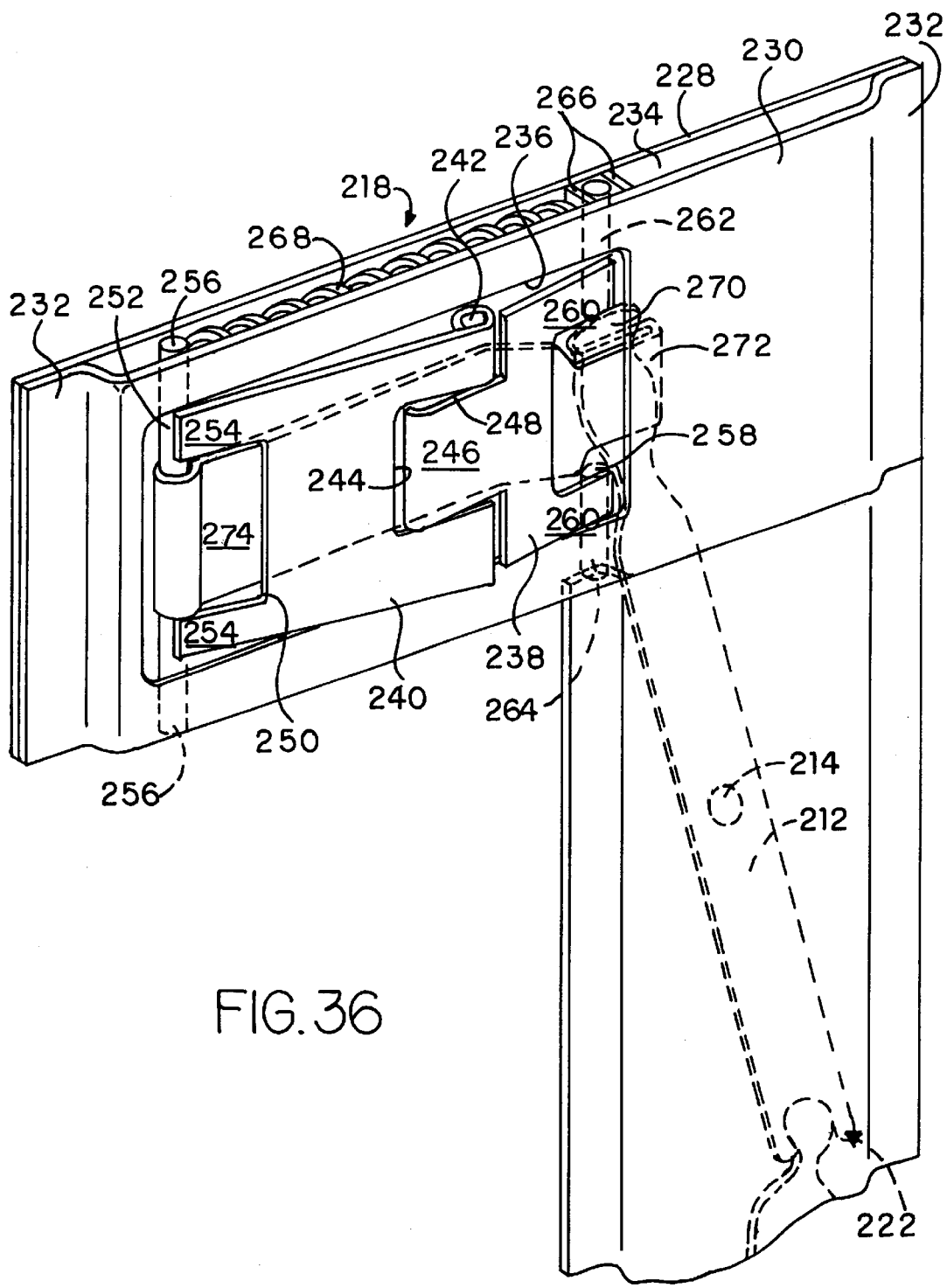
FIG. 36 is an enlarged view of the circumscribed portion of FIG. 33.
Figure 37:
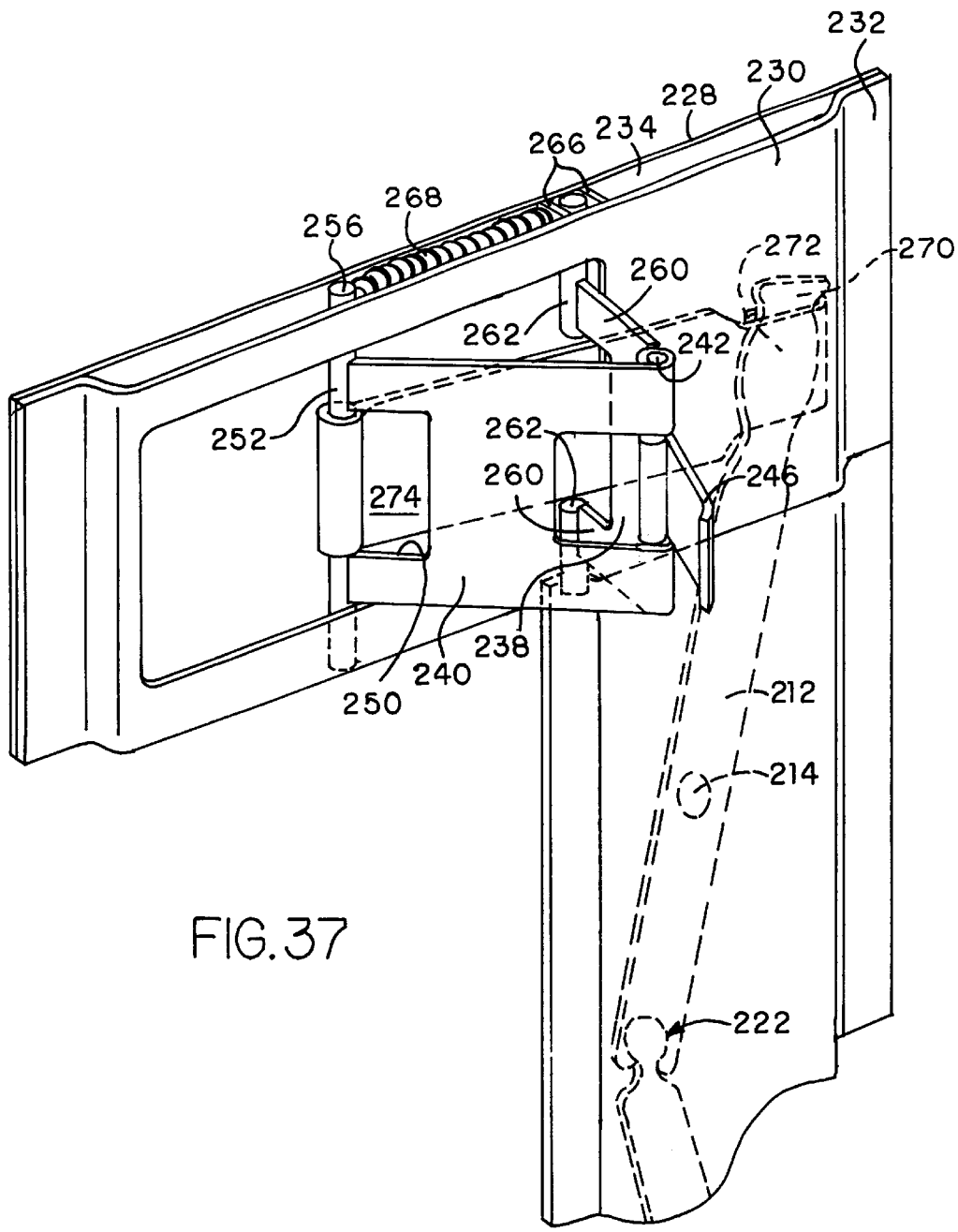
FIG. 37 is an enlarged view of the circumscribed portion of FIG. 35.
Figure 43:
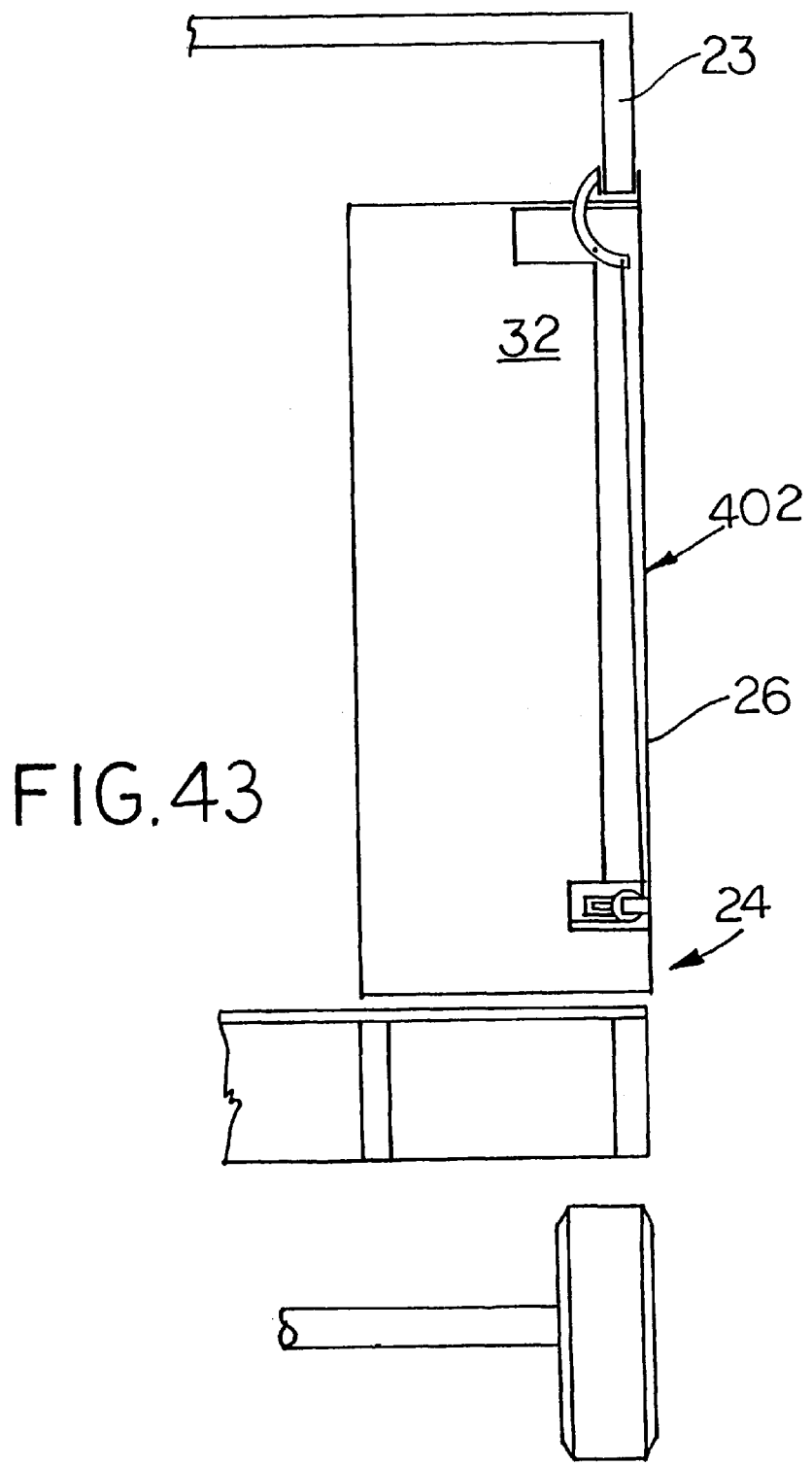
FIG. 43 is a view similar to FIG. 42 but illustrating the latch mechanism in the latched or locked position.

In operation, the latching mechanism 202 is illustrated in FIGS. 32, 33, and 36 in the position in which the various components assume when the slide out room is fully extended. In this condition, the latch members 240 and 238 lie flat and are substantially flush with the cover 230, so that the overall profile of the latch 218 is relatively flat. Accordingly, the seals 204 may easily wipe over the latch 218 without interference or damage as the slide out room is extended and retracted. As the slide out room approaches the wall 12, the extension 220 of the latching mechanism 202 engages the wall 12, which begins forcing the levers 208, 212 toward the position illustrated in FIG. 34 from the position illustrated in FIG. 33. As this occurs, the end 270 of the lever 212 moves in a clockwise direction about the pivot 214, thereby pulling on the web 274 thereby pulling the pin 252 toward the pins 262, 264. Since the webbing 274 is wrapped in back of the pin 242, pressure is exerted on the pin 242 urging it outwardly away from the base plate 228. Accordingly, as the slide out room closes against the wall 12, the inner surface of the wall 12 will be engaged at some point along the surface of either the tongue 246 or the latch member 238, the exact area at which the engagement takes place depending upon the thickness of the wall.

In units in which the wall 12 is relatively thick, the latch member 238 or tongue 246 may engage and apply pressure to the wall 12 before the slide out room is fully retracted into the mail living area. When this occurs, the webbing 274 is sufficiently elastic and flexible to stretch slightly to permit the lower portion of the room to fully close after the latch 218 is engaged with the wall 12. Accordingly, the latch mechanism 202 may be used on units having wall widths over a substantial range, and may be easily retrofitted to existing units since all of the connections are made on the walls 32 in the area immediately behind the fascia 36 which is readily accessible when the slide out room 24 is extended.

Referring now to the embodiment of FIGS. 38–41, latching mechanism generally indicated by the numeral 302 is similar to the latching mechanism illustrated in the embodiment of FIGS. 32–37, except that the fibrous web 274 is replaced by a metal strap 304, and the actuation mechanism consisting of levers 208 and 212 is replaced by the actuation mechanism indicated by the numeral 306. Actuation mechanism 306 includes upper toggle 308 which consists of lever arms 310, 312 which are rigidly connected at pivot 314 and pivot with respect to the base place 228 about the pivot 314. Lever arm 310 is connected to strap 304 by a pivot 316. One end of a connecting member 318 is pivotally connected to lever arm 312 by a pivot 320, and the opposite end of connecting member 318 is connected to a lever arm 322 of a lower toggle 324 by a pivot connection 326. The lower toggle 324 consists of the lever arm 322 and another lever arm 328 rigidly secured to the lever arm 322 at a pivot 330. The lower toggle 324 is pivotally connected to the base plate 224 by the pivot 330. Extension 220 projects from the lever arm 328 to engage the wall 12 with the main living quarters when the slide out room is retracted into the main living quarters.

In operation, after the slide out room is retracted into the main living quarters sufficiently to enable the extension 220 to contact the wall 12, further inward movement of the slide out room pivots the toggle 324 counterclockwise (viewing FIG. 38) about the pivot 330. This movement of the lower toggle 324 is transmitted through the lower member 318 to the upper toggle 308, thereby causing the latter to pivot in a clockwise direction about the pivot 314. Accordingly, the strap 304 is moved from the position illustrated in FIGS. 38 and 39 to the actuated condition illustrated in FIGS. 40 and 41, in which the tongue 246 engages the wall of the main living quarters (not shown in FIGS. 38–41) in exactly the same manner as the tongue 246 in the embodiment of FIGS. 32–37 engages the wall 12 (see FIGS. 33 and 35). The tongue 246 is preferably made of a resilient material to permit the mechanism to accommodate walls 12 of varying thickness. When the slide out room is extended, movement of the extension 220 away from the wall 12 allows a return spring, such as a return spring 268 acting between pins 256 and 262, to bias the mechanism back into the FIG. 38.

However, since the strap 304 is a rigid member, a return spring can act on any of the members of the actuation mechanisms 302 as well as the strap 304 to return the mechanism to the released condition illustrated in FIGS. 38 and 39.

Referring now to the embodiments of FIGS. 42–51, a latching mechanism generally indicated by the numeral 402 is mounted on the side walls 32 of the slide out room 24. The latching mechanisms 402 include a latch lever 404 which is mounted on the side of the corresponding wall 32 adjacent the end thereof which joins with the ceiling 28. The lever 404 is mounted for movement relative to a fixed pivot 406 which mounts the lever 404 onto the side wall 32. The lever 404 is adapted to rotate about pivot 406 to move end 408 of the lever 404 to permit the end 408 to engage a header plate 412 mounted on the wall 12 of main living quarters 10 to thereby latch the slide out room 24 in place when the slide out room 24 is moved into the retracted position, a gap 410 (FIG. 51) is defined between the walls 32 of slide out room 24 and the edges of the aperture 22 to accommodate the latching mechanism 402. The gap 410 is covered by facia (not shown in FIGS. 42–45) when the room is fully retracted as will hereinafter be described.

A link or cable 414 is attached by pivot 416 adjacent the end of lever 404 opposite the end 408. The cable 414 extends downwardly from lever 404 and wraps around a cable engaging member or pulley 418 and is joined to the wall 32 as at 420. Pulley 418 is mounted on a carriage 422 which is guided for movement in a substantially horizontal direction by a slot 424 in bracket 425. An actuator or tab 426 projects outwardly from the carriage and outwardly from the wall 32 so that the tab 426 can engage an area 428 on the wall 12 adjacent the aperture 22. Of course, the latching mechanism 402 mounted on the opposite wall 32 is symmetrical. A spring 428 yieldably urges carriage toward the FIG. 44 position.

Figure 50:
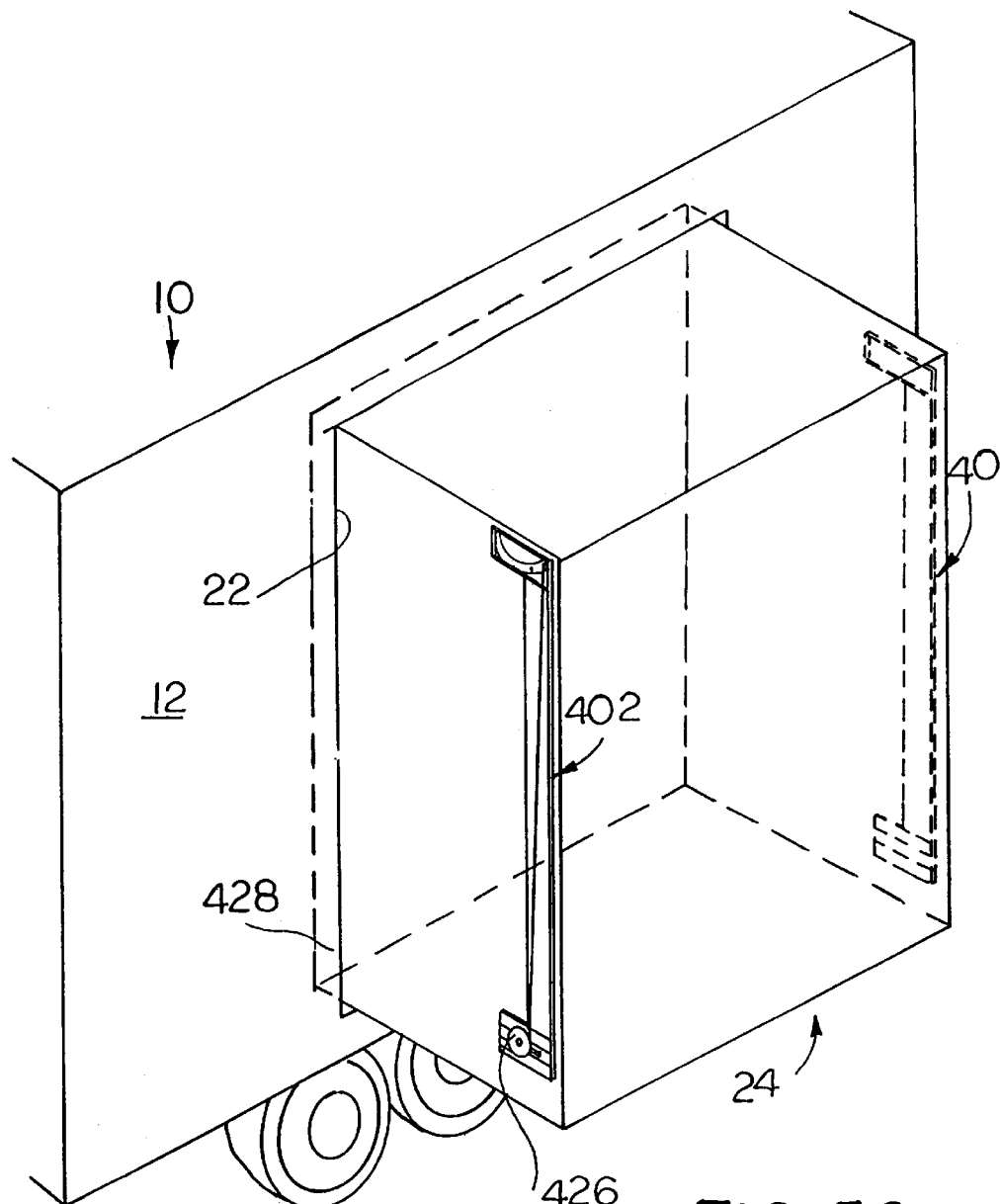
FIG. 50 is a fragmentary view in perspective of a mobile living quarters incorporating the latching mechanism illustrated in FIGS. 42 and 43 with the slide out room extended from the main living area.
Figure 51:
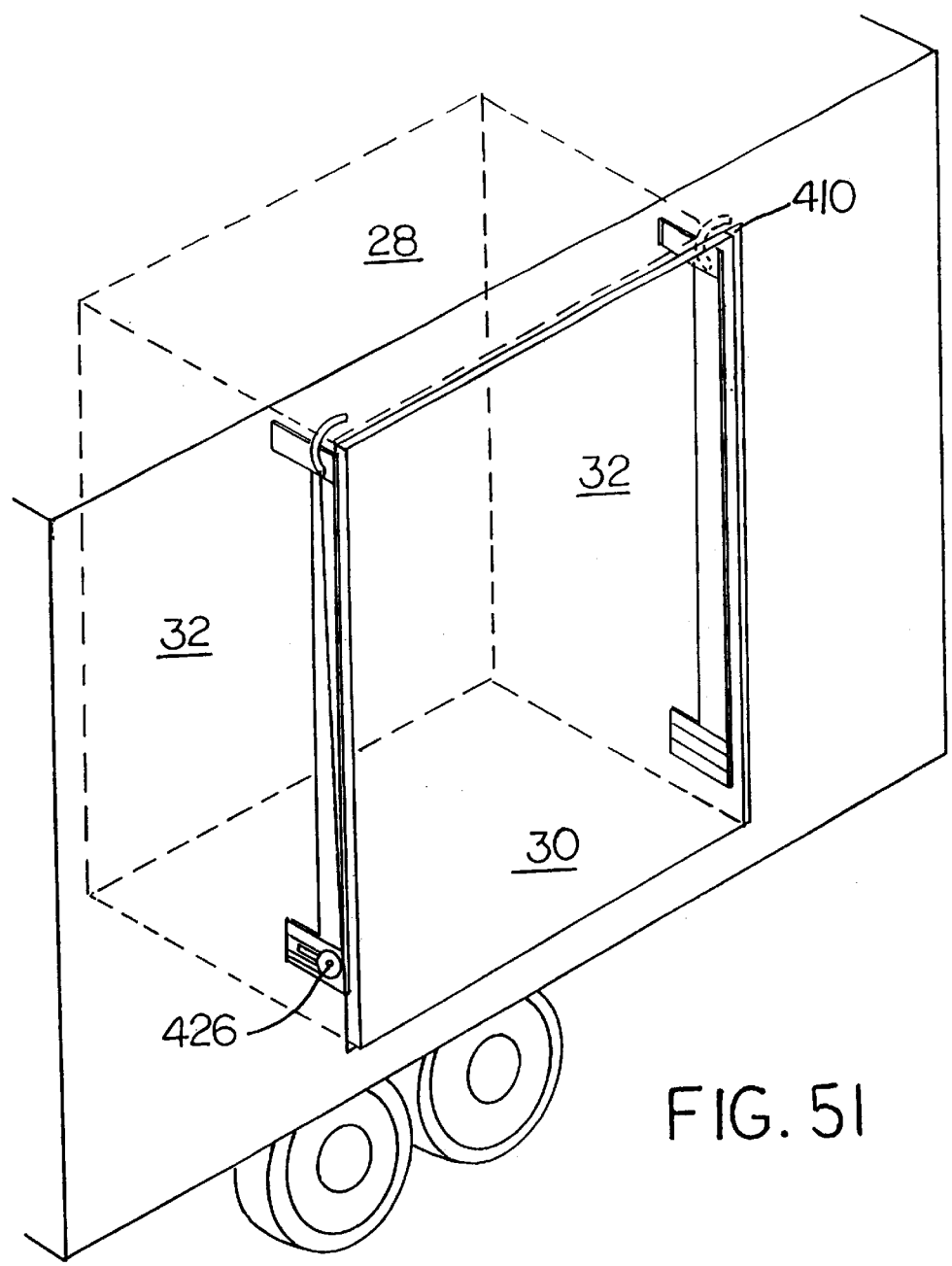
FIG. 51 is a view similar to FIG. 44 but illustrating the slide out room retracted into the main living quarters and illustrating the latching mechanism engaged to latch the slide out room in place.

In operation, as the slide out room 24 is moved from the fully extended position illustrated in FIG. 50 to the fully retracted position illustrated in FIG. 51, the tab 426 engages the area 428 on the wall 12 of main living quarters 10. Further inward movement of the slide out room 24 causes the tab 426 to move the carriage 422, and therefore the pulley 418, from the FIG. 44 position to the FIG. 45 position. As the pulley moves toward the FIG. 45 position, the cable 414 is pulled downwardly by the pulley, thereby rotating the lever 404 about the pivot 406 so that, as the room 24 is moved into the fully retracted position, the end 408 of the lever 404 extends to engage the header plate 412, thereby locking the slide out room in the fully retracted position. When the room is to be extended after the vehicle is parked, as described above, the hydraulic rams (not shown in FIGS. 42–45), which are secured to the slide out room adjacent the floor 30 thereof are operated. Accordingly, as the room is extended, movement of the room relative to the wall 12 forces the lever 404 to pivot downwardly about the pivot 406, this being allowed by slackening of the cable 414 as the tab 426 moves away from area 428 by action of spring 428. Accordingly, initial movement of the slide out room 24 away from the fully retracted position causes the crescent shaped lever 404 to pivot downwardly into the position illustrated in FIG. 42, allowing it to pass beneath that portion of the wall 12 extending across the ceiling 28 of the slide out room 24.

Figure 44:
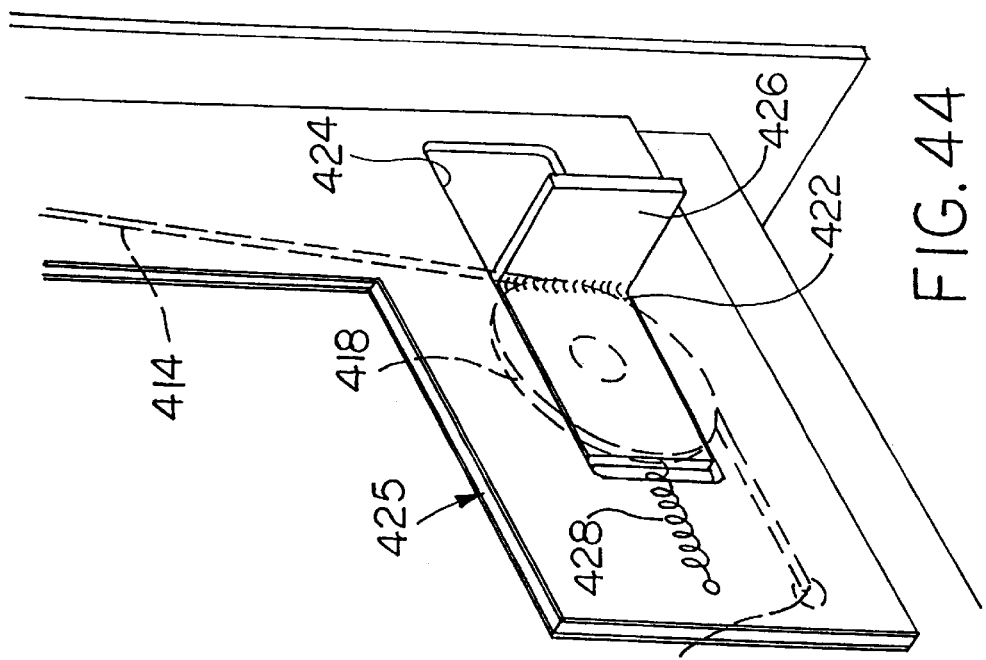
FIG. 44 is a detailed view and perspective of the circumscribed portion of FIG. 42.
Figure 45:
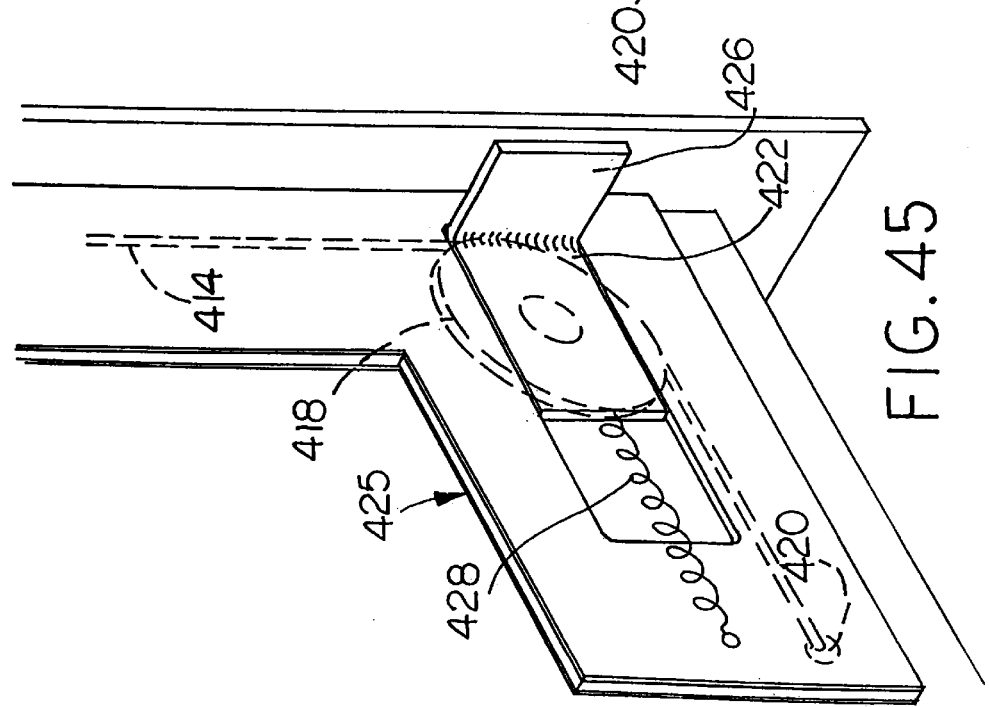
FIG. 45 is a view similar to view 44, but illustrating the components thereof in their actuated position when the slide out room is in the fully retracted position.
Figure 46:
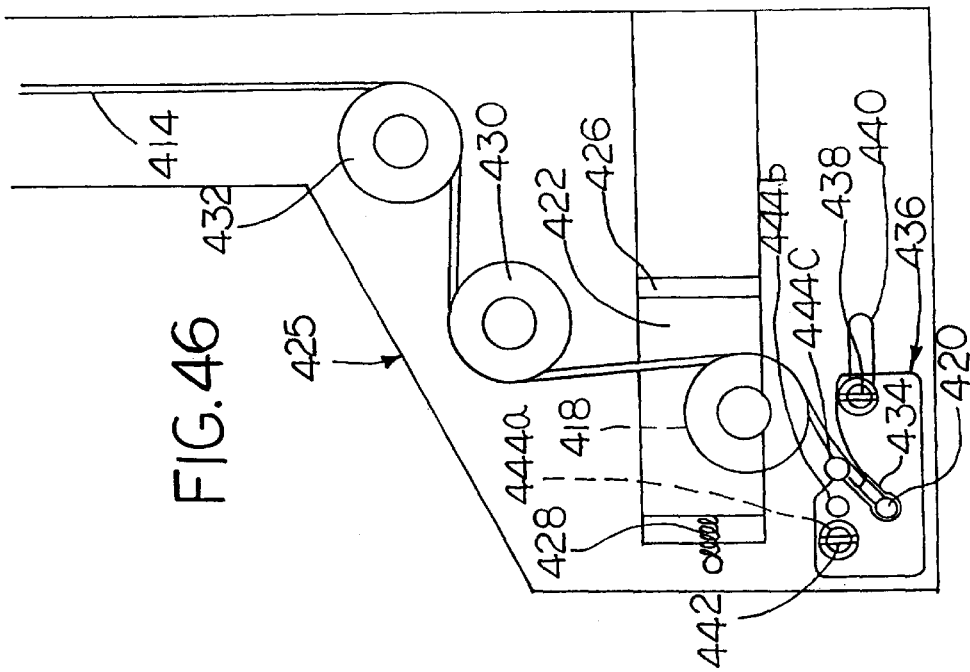
FIGS. 46 and 47 are views similar to FIGS. 44 and 45 respectively, but illustrating the different embodiment of the actuation mechanism illustrated in FIGS. 44 and 45.
Figure 47:
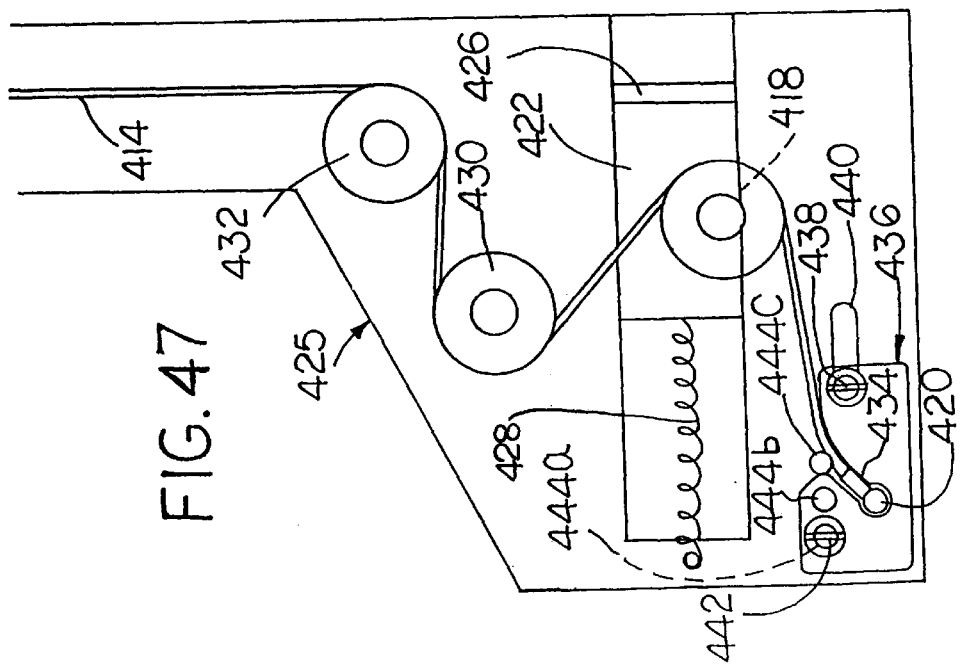

The embodiment of FIGS. 46 and 47 is similar to the embodiment of FIGS. 44 and 45 in that pulley 418 is mounted on carriage 422 which is moved from the FIG. 46 to the FIG. 47 position by engagement of the tab 426 with the wall 22 upon movement of the slide out room into the retracted position. Upon movement of the slide out room away from the retracted position, spring 428 returns the carriage 422 to the position illustrated in FIG. 46 upon slackening of the cable 414. In addition to pulley 418, the cable 414 is wrapped around pulleys 430 and 432 to provide a force multiplier effect. The enlarged end 420 of the cable 414 is received within a keyhole slot 434 in a fastening fixture 436 which is mounted on support 425 and is adjustable relative thereto due to a fastener 438 which is received in elongated slot 440 and another fastener 442 which may be secured in either of three collinear openings 444a, 444b or 444c. Accordingly, the effective length of the cable 414 may be adjusted as necessary by moving the bracket 436 to engage the fastener 442 a different one of the openings 444a, 444b, or 444c.

Referring now to the embodiment of FIGS. 48 and 49, a lever 450 is pivotably mounted on plate 425 by a pivot connection 452. Tab 454 projects from downwardly extending arm 456 of lever 450, and enlarged end 420 of the cable 414 is received in a slot in laterally extending arm 458 of lever 450. Cable 414 is wrapped around pulley 460. A spring 462 hinges the lever 450 in the counter clockwise direction about the pivot 452 by engagement of the tab 454 with the side wall 22. Rotation of the lever 450 in the counter clockwise direction from the FIG. 48 position toward the FIG. 49 position pulls on cable 414 to operate the lever 404 as described above. When the slide out room is moved away from the fully retracted position, the cable 414 slackens, thereby permitting the spring 428 to return the lever 450 into the FIG. 48 position.

Figure 52:
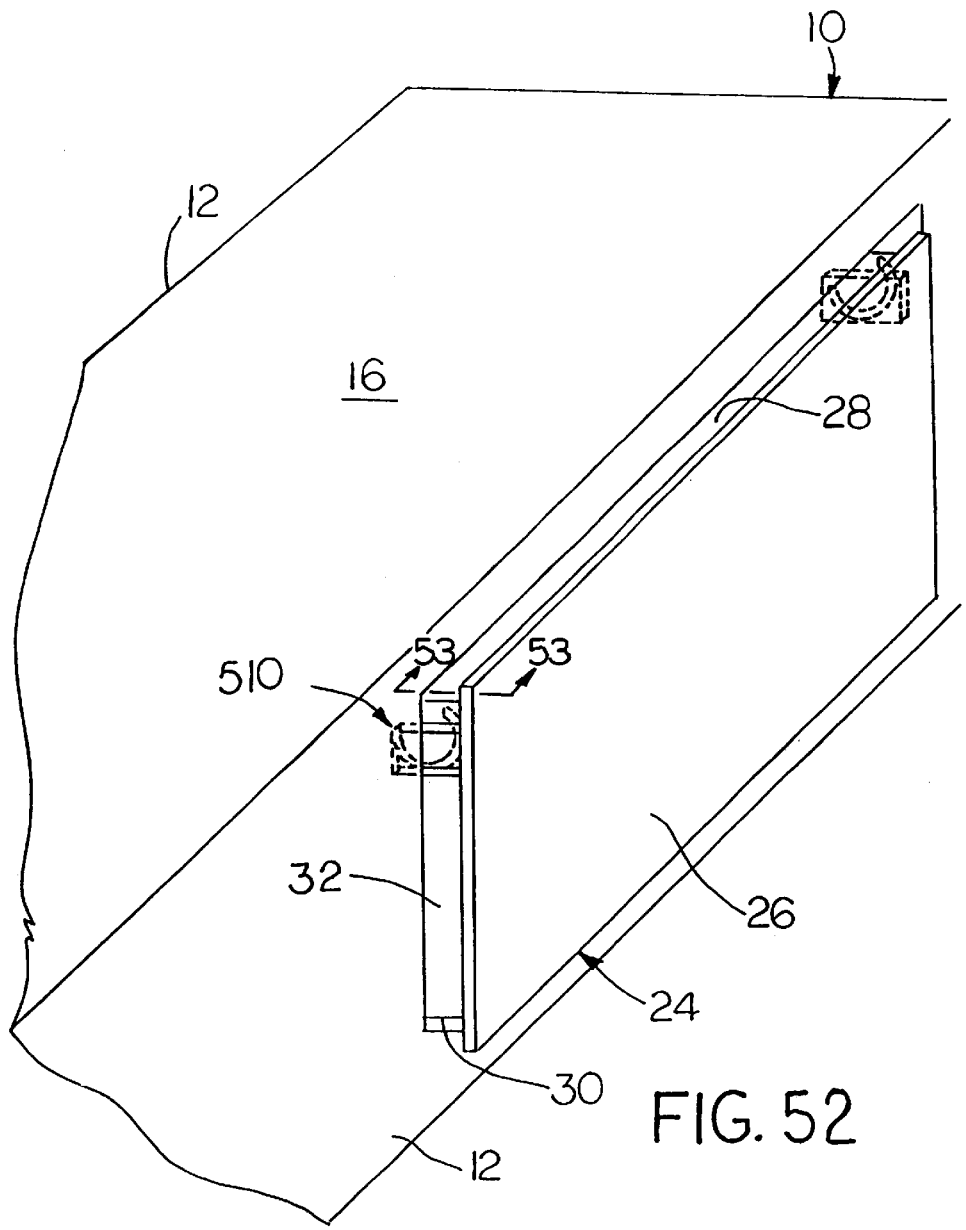
FIG. 52 is a fragmentary view in perspective of a mobile living quarter with a slide out room partially extended from the main living area illustrates another embodiment of the invention.

Referring now to the embodiment of FIGS. 52–54, a latching mechanism generally indicated by the numeral 510 is located in the uppermost portion of each of the side walls 32 of the retractable room 24 adjacent the ceiling 28. Latching mechanism 510 includes a pair of arcuate shaped arms 512, 514 interconnected by a bridge portion 516 having an arcuate surfaces 518, 524 on the outer surface thereof. A pivot 520 pivotally connects the latching mechanism 510 to wall 32 at the upper edge of the latter such that the arms 512, 514 are able to pivot to and from positions extending from the recess 522 and above the upper edge of the wall 32. A seal 40 extends from the fascia 36 of the outer wall 26 of the slide out room 24. The acuate surface 524 has a radius of curvature which is larger than the radius of curvature of the arcuate surface 518; accordingly, a shallower cavity is defined by the arcuate surface 524 and a deeper cavity is defined by the arcuate surface 518. Both the arcuate surface 518 and the arcuate surface 524 are adapted to engage an arcuate surface 526 defined on a detenting member 528 which is pivotally connected to the walls of the recess 522 by a pivot 530. A spring 532 urges the detenting member 528 in a clockwise direction about the pivot 530, urging the curved surface 526 of the detent member 528 into an engagement with either the arcuate surface 518 or the arcuate surface 524 as will hereinafter be explained.

In operation, and referring to FIGS. 53 and 54, as the slide out room 24 approaches the fully retracted position, the arm 512 engages outer surface 534 of header portion 536 of the wall 12 that extends across the ceiling 28 of the slide out room 24. As the slide out room 24 is further retracted, the forces urging the latching mechanism 510 in the clockwise direction about the pivot 520 eventually become greater than the force resisting rotation of the latching mechanism exerted by spring 532 through detent member 528 and arcuate surface 526. Accordingly, latching mechanism 510 "snaps" from the position illustrated in FIG. 53 in which the arcuate surface 524 is engaged with the arcuate surface 526, to the position illustrated in FIG. 54, in which the arcuate surface 518 is engaged with the surface 526, thereby engaging the arm of 514 with the pad 538 on the side of the header 536 opposite the surface 534. It will be noted that since the arcuate surface 524 defines a shallower cavity and the surface 518 defines a deeper cavity, the force required to snap the latching mechanism 510 from the FIG. 53 position to the FIG. 54 position is less than the force required to return the latching mechanism 510 to the FIG. 53 position. When the latching mechanism 510 is in the latched position illustrated in FIG. 54, the seal 40 is sealingly engaged with the surface of 534. When the unit is parked and the slide out room is to be extended, outward movement of the slide out room returns the latching mechanism 510 from the FIG. 54 position to the FIG. 53 position.

As discussed above, the force required to return the latching mechanism 510 to the FIG. 53 position is less than the force required to "snap" the locking mechanism 510 to the FIG. 54 position. Accordingly, a substantially greater force is exerted on the pad 538 to hold the upper portion of the slide out room in place when the unit is moved. The slide out room 24 deflects or tilts when the slide out room is operated, but the tilting of slide out room 24 is minimized when the room is in the fully retracted position, since the floor 30 of the slide out room is then fully supported on the floor of the main living quarters. Accordingly, upon initial outward movement of the slide out room 24 from the fully retracted position, the forces of the aforementioned rams used to operate the room is transferred to the upper portion of the walls 32 with very little deflection thereof, making available the greater force required to move the latching mechanism 510 from the FIG. 54 to the FIG. 53 position. However, as the room is retracted, the floor 30 of the slide out room is only partially supported on the floor of the main living quarters, thereby permitting the upper portion of the room 24 to tilt away from the main living quarters so that the rams below the floor 30 may not fully retract the upper portions of the room 24. Accordingly, it is desirable that a lower force be required to latch the slide out room in place as the latter is retracted. This lower force is provided by the shallower cavity defined by the arcuate surface 524 as opposed to the deeper cavity defined by the arcuate surface 518. Since the latching mechanism 510 "snaps" over center, the latching mechanism draws the upper portion of the room 24 against the main living quarters.

Referring now to the embodiment of FIGS. 55 and 56, a latching mechanism generally indicated by the numeral 540 includes a cylindrical recess 542 in the upper edge 544 of the side walls 32. The latching mechanism 540 further includes a solenoid coil 546 mounted in a recess in the lower edge 548 of the header 536. A plunger 550 is received within the coil 546 and is urged downwardly with respect thereto by spring 552. The end of the plunger 550 that is received within the aperture 542 has a tapered edge 554 so that the plunger 550 can "find" the aperture 542 if the plunger is not precisely aligned with the aperture. In operation, the plunger 550 is urged into sliding engagement with the upper surface 544 by the spring 552 as the slide out room 24 is retracted towards the fully retracted position in FIG. 56. When the slide out room reaches the fully retracted position, the cylindrical aperture 542 is brought into substantial registry with the plunger 550 so that the spring 552 urges the plunger 550 into the aperture 542. Slight misalignments will be accommodated by the tapered edge 554. The solenoid 546 is actuated automatically when power is suppled to the aforementioned rams when the room is to be extended, thus actuating the solenoid 546 to withdraw the plunger 550 against the force of the spring 552 out of the aperture 542 to permit outward movement of the slide out room 24.

Figure 57:
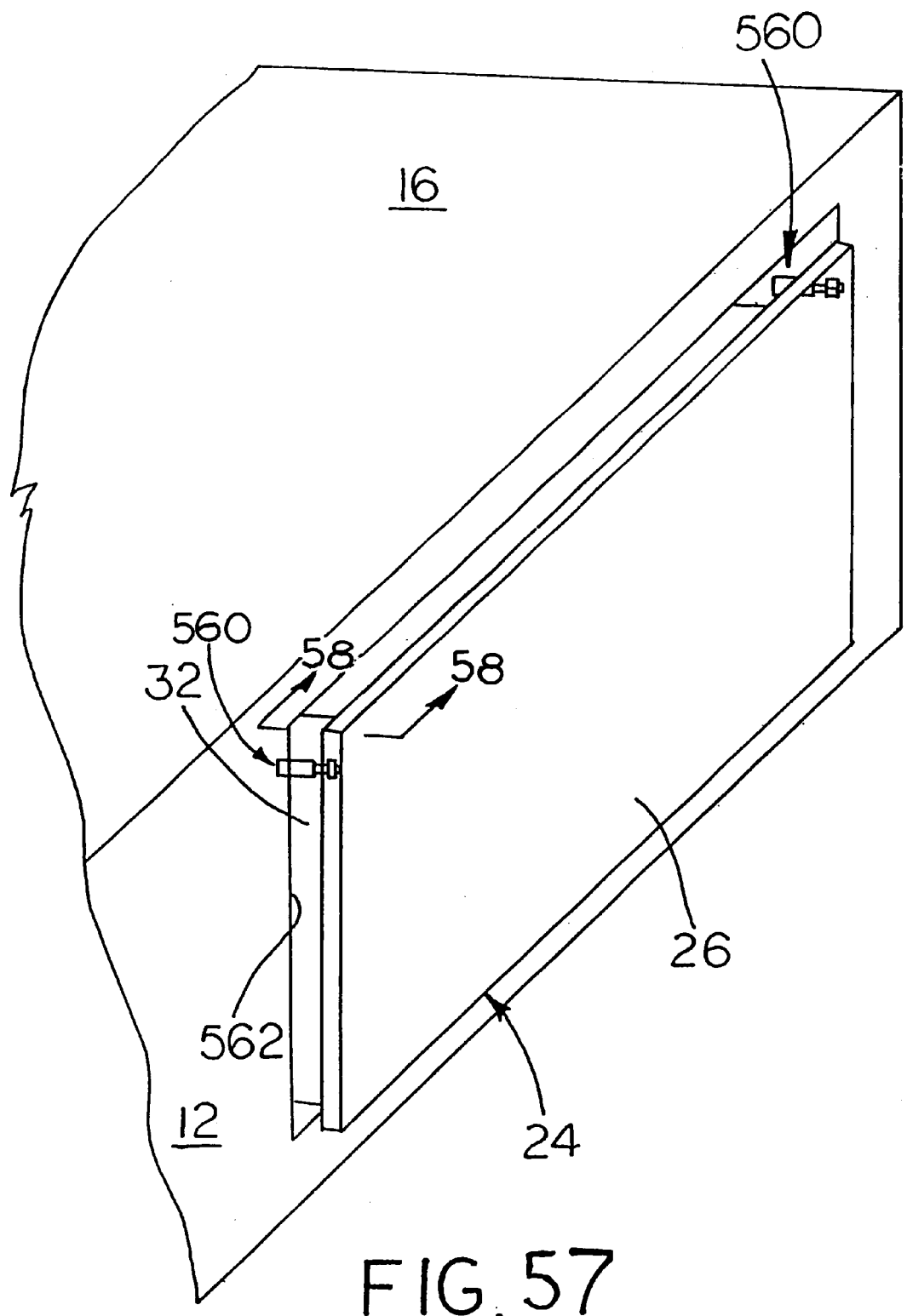
FIG. 57 is a view similar to FIG. 46, but illustrating still another embodiment of the invention.
Figure 58:
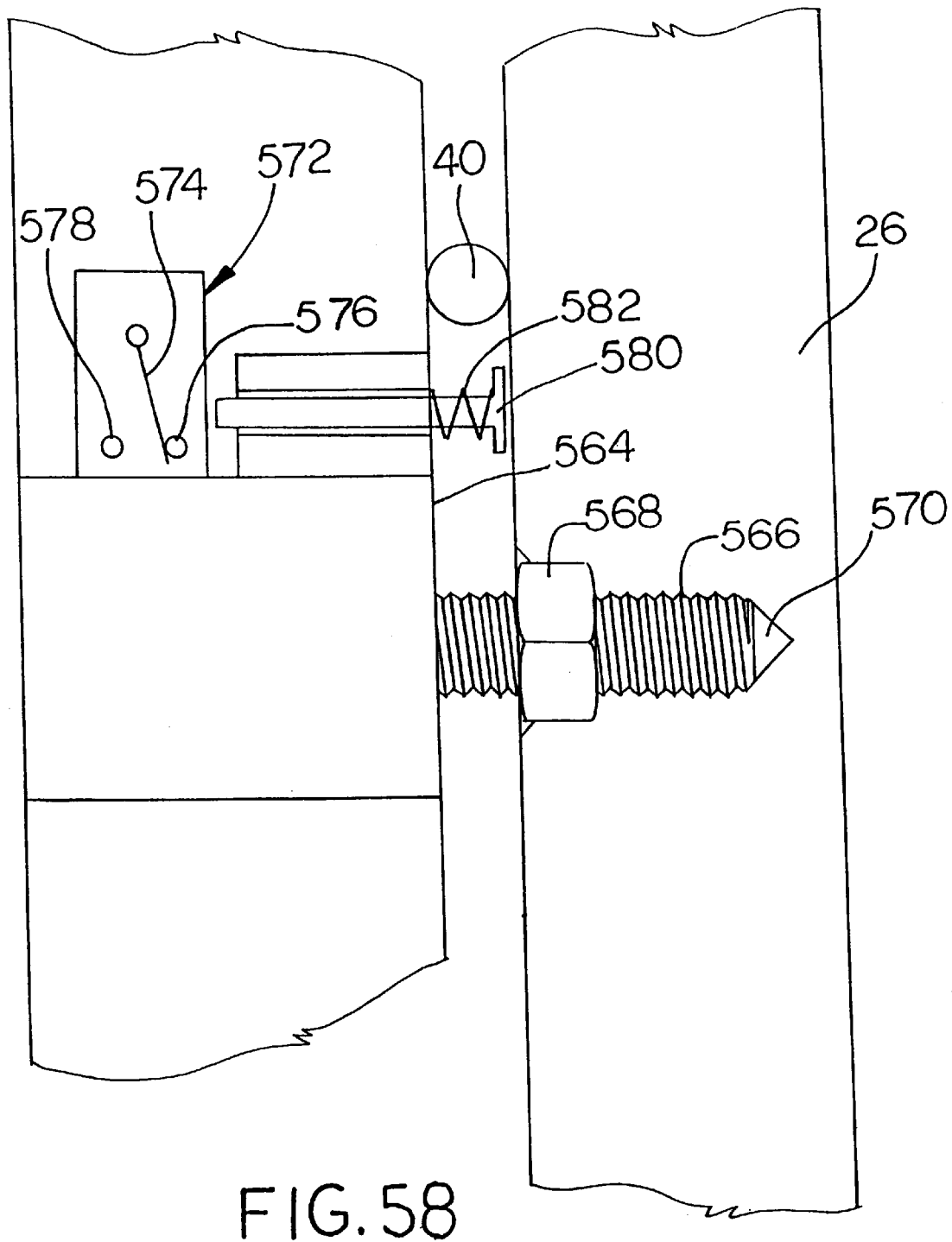
FIG. 58 is an enlarged, fragmentary, cross sectional view taken substantially along lines 58—58 of FIG. 57.
Figure 59:
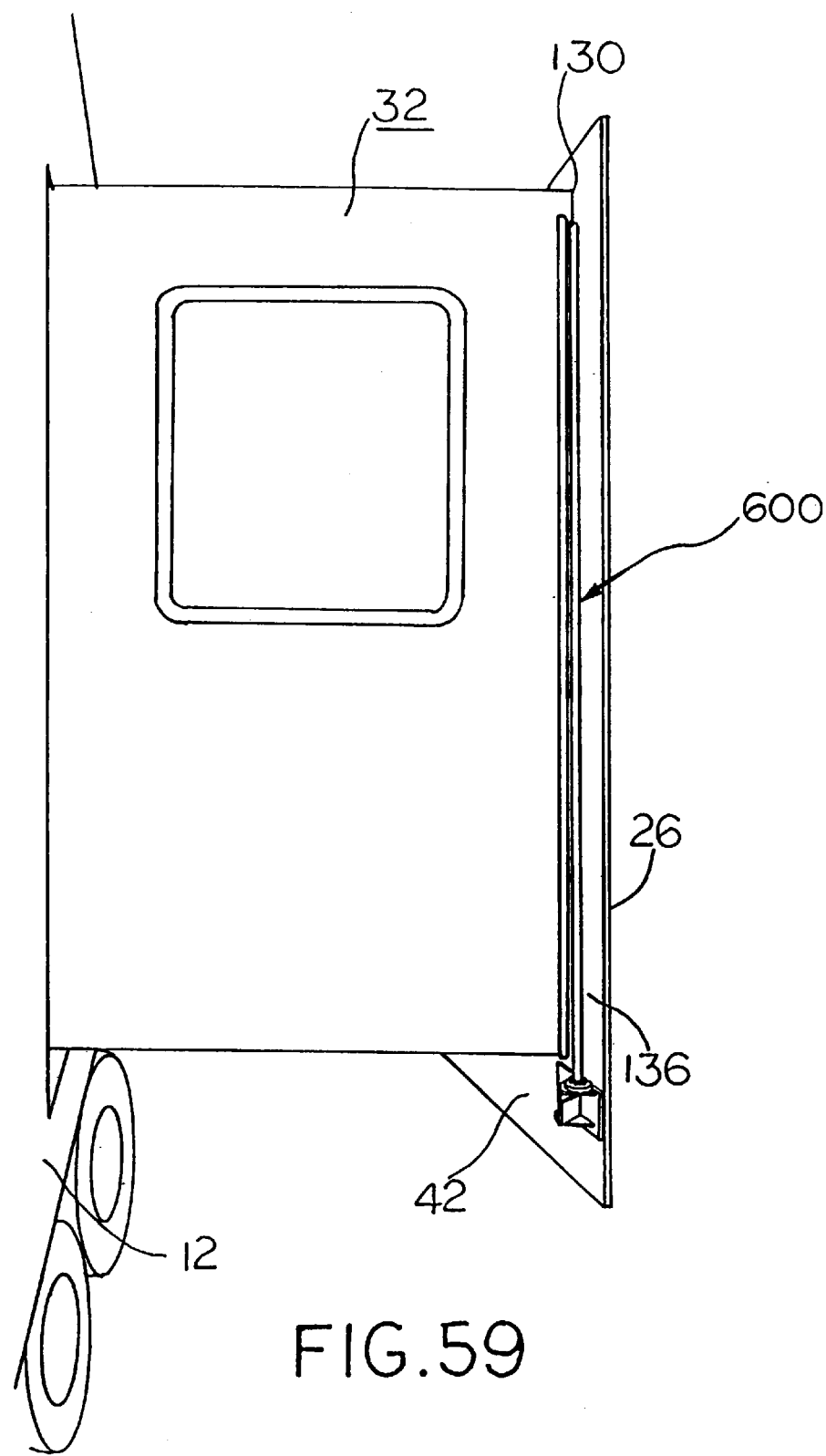
FIG. 59 is a view in perspective of a mobile living quarters with a slide out room fully extended from the main living area and incorporating a latching mechanism pursuant to still another embodiment of the present invention tucked in the corner between the side wall of the slide out room and the facia extending from the front wall of the slide out room.
Figure 60:
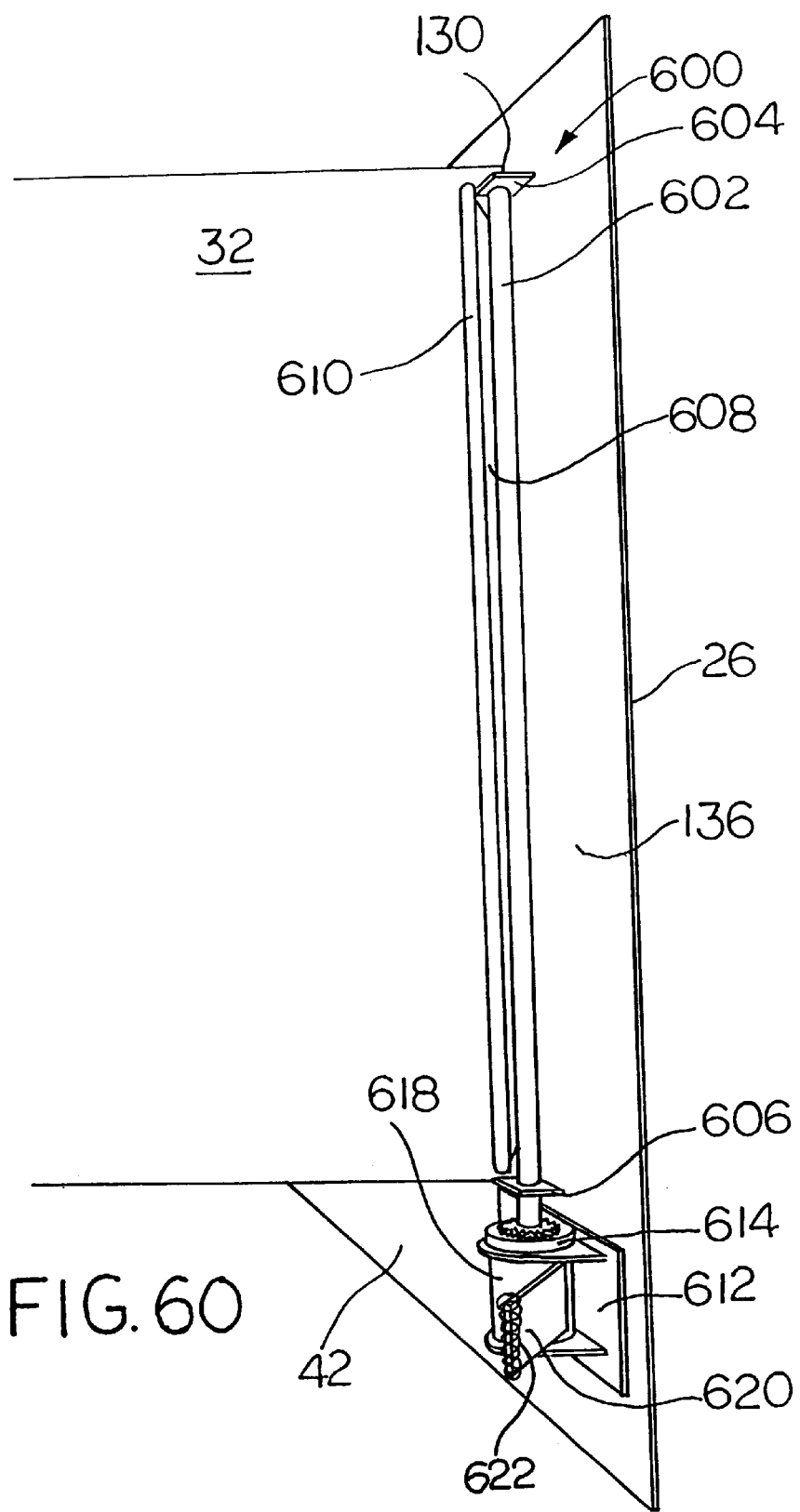
FIG. 60 is an enlarged view in perspective of the corner between the side wall of the slide out room and the front wall of the slide out room illustrated in FIG. 54 and illustrating details of the latching mechanisms.

Referring now to the embodiment of FIGS. 57 and 58, latching mechanisms 560 are installed in that portion of the wall 12 adjacent the opening 562 therein through which the slide out room 24 extends and retracts and which is engaged by the portion of the outer wall 26 of the slide out room 24 when the room is fully retracted. The latching mechanism 560 includes a bi-directional electric motor 564 from which a threaded member 566 extends. The motor 564 is capable of rotating the threaded member 566 in both clockwise and counterclockwise directions. The threaded member 566 is adapted to threadingly engage a nut 568 which is mounted on that portion of the wall 26 which registers with the latching mechanism 560. Although the nut 568 is shown in FIG. 52 as being rigidly attached to the wall 26, it may be desirable to "float" the nut to permit limited movement of the nut relative to the wall 26, in a manner well known to those skilled in the art. The threaded member 566 is provided with a pointed end 570 which assists in orienting the threaded member 566 with the nut 568 as the wall 26 is moved into initial engagement with the threaded member 566 as the slide out room is retracted. The motor 564 is controlled by a three way switch (not shown) that controls the rams that extend and retract the room 24. When this switch is operated to extend the room 24, motor 564 is operated in a direction withdrawing threaded member 566 from nut 568, and when the room is retracted, member 566 is rotated in a direction advancing into the nut 568. Motor 564 is also controlled by a stop which generally indicated by the numeral 572 which includes a switch arm 574 which is movable in response to a spring loaded plunger 580 to move the switch arm 574 to the off position, thereby interrupting power to motor 564 when the room is fully retracted. Until interrupted by the switch 572, the motor 564 operates continuously while the slide out room is extended and retracted even if the threaded member is disengaged from nut 568.

In operation, as the aforementioned rams urge the slide out room 24 toward the retracted position, the wall 26 of a slide out room will reach a position before it reaches the fully retracted position in which the threaded member 566 engages the nut 568 on the wall 26. The pointed end 570 assists in permitting the threaded member 566 to "find" the nut 568. As the slide out room 24 is further retracted after initial engagement of the threaded member 566 with nut 568, the threaded member 566 and nut 568 assists in maintaining alignment of the slide out room 24 with the opening to assure proper operation of the mechanism. Eventually, the wall 26 will engage the plunger 580 to compress spring 582 and thereby permit the plunger to operate the switch arm 574 to the off position. Ideally, the plunger 580 is set so that the seal 40 is compressed slightly.

When the room is to be extended, actuation of the mechanism which operates the hydraulic rams (not shown) causes the electric motor 564 to turn the threaded member 566 in a direction advancing the nut 568 toward the pointed end 570 of the threaded member 566. Of course, the nut 568 will eventually be advanced off of the threaded member 566 when the slide out room 24 moves a very short distance toward the extended position. The aforementioned rams then extend the slide out room 24 to the fully extended position, while the electric motor 564 may be left to rotate the threaded member 566 even after the nut 568 has passed off of the end of the threaded member, and is shut off automatically when the mechanism extending the room is shut off.

Referring now to the embodiment of FIGS. 59–62, latching mechanism generally indicated by the numeral 600 includes a rod 602 which is rotatably supported in the corner 130 by brackets 604, 606. A latching member 608 carries a tip of resilient material 610 and extends along the rod 602 for substantially the entire height of the wall 32. A bracket 612 is mounted on the wall 26 just below the corner 130 and rotatably supports a cylinder 614 having gear teeth 616 (FIGS. 61, 62) provided on its inner diameter. A tab 620 is integral with the outer circumferential surface 618 of the cylinder 614 and carries a pad 622 on its outer edge thereof for engagement with the wall 12 as will hereinafter be described.

The lower end of the rod 602 is received within the cylinder 614 and is provided with circumferentially spaced gear teeth 624 which mesh with the gear teeth 616 on the inner circumferential surface of the cylinder 614. It will be noted that the outer diameter of the cylinder defined by the gear teeth 624 is about one half of the inner diameter defined by the gear teeth 616. Accordingly, a 2:1 gear ratio exists, in which a given arc of rotation of the outer cylinder 614 rotates the rod 602 twice that arc.

Figure 62:
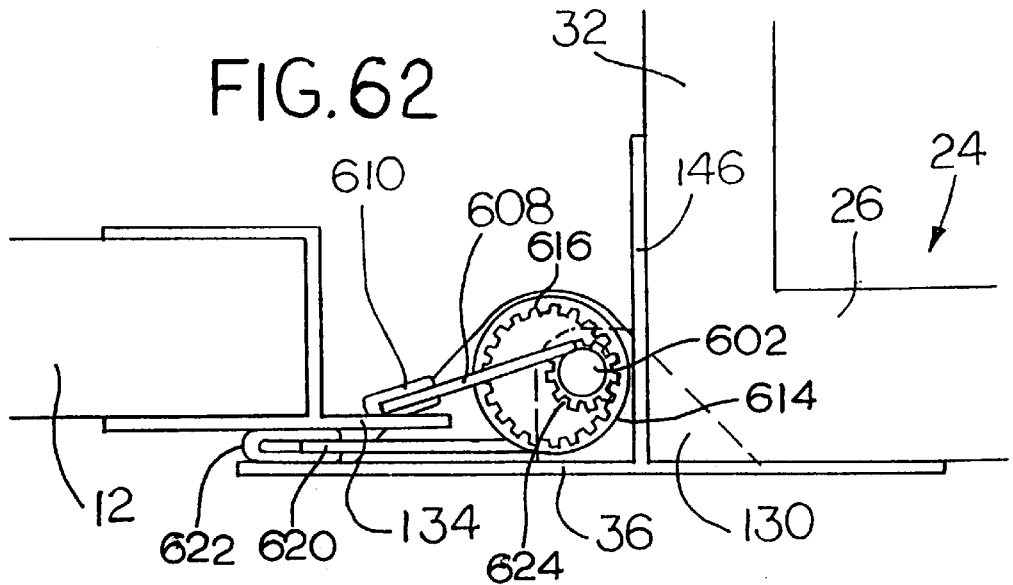
FIG. 62 is a view similar to FIG. 61, but illustrating the various components of the latching mechanism of FIGS. 54–56 when the slide out room is in the fully retracted position.
Figure 61:
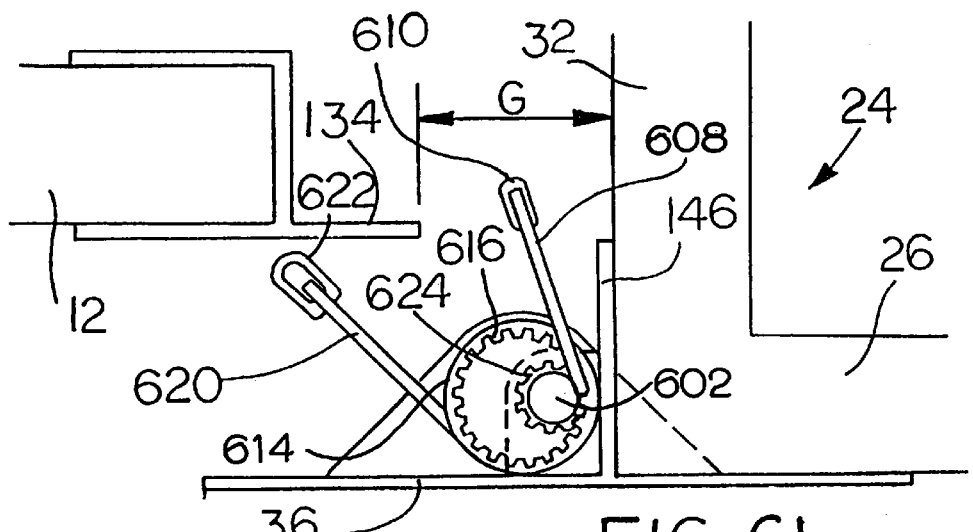
FIG. 61 is a fragmentary view taken from above with respect to FIGS. 54 and 55, but illustrating the positions of the various components of the latching mechanism just before the slide out room is retracted to the fully retracted position.

In operation, and referring to FIGS. 61 and 62, it will be noted that in FIG. 61 the latch member 608 is oriented to pass through the gap G between the extension 134 of wall 12 and the wall 32 of the slide out room 24. As the room 24 is further retracted, the pad 622 of tab 620 contacts the wall 12, thereby pivoting the cylinder 614 in a counter clockwise direction. Pivoting of the tab 620 is transmitted to pivot latch member 608, but because of the drive ratio between the gear teeth 616 and the gear teeth 624, the latch member 608 will move through an arc twice the arc through which the tab 620 moves. Accordingly, when the room is fully retracted, the latch member 608 will be in the position illustrated in FIG. 62, thereby compressing the resilient tip 610 against the portion 134 of wall 12, thereby effecting a seal therebetween. When the room is extended, outward movement of the room pivots the latch 608, which is pivots the tab 620, but through an arc only half that of the member 608, such that when the room has been extended sufficiently to cause the tip 622 of tab 620 to move away from the wall 12, the latch member 608 will be rotated to the position illustrated in 61, permitting the latter to move through the gap G without interference. Since the member 608 extends continuously from the top to the bottom of the unit, resilient seal 610 seals the sides of the slide out room against entry of moisture.

What is claimed is:

1. Mobile living quarters comprising a frame, a main living quarters mounted on said frame and an auxiliary living quarters mounted for movement relative to said main living quarters between a retracted position retracted within the main living quarters when the mobile living quarters is moved and an extended position when the mobile living quarters is parked for use, said auxiliary living quarters having a floor, a ceiling opposite said floor, a front wall and a pair of opposite side walls extending between said floor and said ceiling to define said auxiliary living quarters, drive means engaging a portion of said auxiliary living quarters displaced from said ceiling for moving the auxiliary living quarters between the extended and retracted positions, and a latching mechanism which secures the auxiliary living quarters to the main living quarters in response to movement of the auxiliary living quarters into the retracted position and releases the auxiliary living quarters from the main living quarters in response to movement of the auxiliary living quarters out of the retracted position, said latching mechanism including a lever mounted on one of said living quarters for engaging the other living quarters.

2. Mobile living quarters as claimed in claim 1, wherein said latching mechanism includes an actuator mounted on said one living quarters displaced from said lever toward said portion of said auxiliary living quarters engaged by said drive means, said actuator being responsive to movement of said auxiliary living quarters to operate said lever and a link extending between the actuator and the lever.

3. Mobile living quarters as claimed in claim 2, wherein each of said side walls and said front wall define a corner where the side wall meets the front wall, said front wall including a fascia projecting outwardly from said corner to define a recess, said lever and said link being mounted in said recess.

4. Mobile living quarters as claimed in claim 2, wherein said lever is responsive to operation of said actuator to move from an engaged position engaging said main living quarters when the auxiliary living quarters is in the retracted position to a disengaged position disengaged from the main living quarters when the auxiliary living quarters is to be moved form the retracted position.

5. Mobile living quarters as claimed in claim 4, wherein said portion of said auxiliary living quarters moves relative to said lever in response to actuation of said drive means, said actuator being responsive to said relative movement to pivot said lever to the disengaged position.

6. Mobile living quarters as claimed in claim 4, wherein said lever is pivotally mounted on said auxiliary living quarters.

7. Mobile living quarters as claimed in claim 4, wherein said actuator is movably mounted on said auxiliary living quarters and engages said main living quarters as the auxiliary living quarters is moved into said retracted position.

8. Mobile living quarters as claimed in claim 4, wherein said link is a cable, and said actuator includes a cable engaging member slidably mounted on the auxiliary living quarters and responsive to relative movement between the main and auxiliary living quarters for sliding relative to the auxiliary living quarters.

9. Mobile living quarters as claimed in claim 4, wherein said actuator includes a tab pivotally mounted on said one living quarters, said tab being pivoted by engagement with the other living quarters as said auxiliary living quarters is moved into the retracted position, said lever being pivotally mounted on the one living quarters, and a gear drive drivingly interconnecting the tab with the lever for differential movement of the lever and the tab relative to one another.

10. Mobile living quarters as claimed in claim 1, wherein said latch includes an electrical actuator engaging said lever with the other living quarters when the auxiliary living quarters is moved into the retracted position and releasing said lever when the auxiliary living quarters is moved from the retracted position.

11. Mobile living quarters as claimed in claim 10, wherein said main living quarters defines an opening through which said auxiliary living quarters is extended and retracted, said lever including means for aligning said auxiliary living quarters with the opening.

12. Mobile living quarters as claimed in claim 10, wherein said electrical actuator includes a reversible electric motor mounted on one of said living quarters having a threaded member engaging a mating threaded aperture in the other living quarters.

13. Mobile living quarters as claimed in claim 10, wherein said electrical actuator is a solenoid actuator having a plunger urged into a corresponding aperture in said auxiliary living quarters when the auxiliary living quarters is retracted into the main living quarters, said solenoid actuator being actuated to withdraw said plunger from the actuator when the auxiliary living quarters is extended from the main living quarters.

14. Mobile living quarters as claimed in claim 1, wherein said lever includes an actuator engaging said main living quarters as said auxiliary living quarters is moved into the retracted position and a detent mechanism for releasably locking said latching mechanism in both engaged and disengaged positions.

15. Mobile living quarters as claimed in claim 14, wherein said detent mechanism includes means responsive to a smaller force to move the lever into the engaged position and a larger force to move the lever from the engaged to the disengaged position.

16. Mobile living quarters as claimed in claim 15, wherein said detent mechanism includes a spring loaded member yieldably urging a detent member into engagement with the lever.

17. Mobile living quarters as claimed in claim 14, wherein said lever includes a member engaging said main living quarters to assist in pulling said auxiliary living quarters into the main living quarters as said auxiliary living quarters is moved into the retracted position.

18. Latching mechanism for latching a slide out room to a main living quarters of a mobile living quarters when the slide out room is retracted into the main living quarters comprising a lever which secures the slide out room to the main living quarters in response to the retraction of the slide out room into a retracted position within the main living quarters and releases the slide out room in response to movement of the slide out room away from the retracted position.

19. Latching mechanism as claimed in claim 18, wherein an actuator is responsive to movement of the slide out room relative to the main living quarters, and a link interconnecting the actuator and the lever so that said actuator causes said lever to latch the slide out room to the main living quarters when the slide out room is retracted into the main living quarters and to disengage said lever when the slide out room is extended from the main living quarters.

20. Mobile living quarters as claimed in claim 19, wherein said lever is moved by said actuator through an amplifying link such that the lever moves a greater amount than the actuator moves.

21. Mobile living quarters as claimed in claim 19, wherein a tilting mechanism connects the slide out room to the main living quarters, said tilting mechanism pivoting the slide out room relative to the main living quarters as the slide out room is moved into a fully retracted position.

22. Mobile living quarters as claimed in claim 18, wherein said lever is operated by an electrical actuator.

23. Mobile living quarters as claimed in claim 18, wherein said latch includes a detent mechanism for releasably locking said latching mechanism in both engaged and disengaged positions, said detent mechanism including means responsive to a smaller force to move the latch into the engaged position and a larger force to move the latch from the engaged to the disengaged position.

24. Mobile living quarters as claimed in claim 23, wherein said detent mechanism carries said latching mechanism to pull said slide out room to the fully retracted position.

25. Mobile living quarters comprising a frame, a main living quarters mounted on said frame and an auxiliary living quarters mounted for movement relative to said main living quarters between a retracted position retracted within the main living quarters when the mobile living quarters is moved and an extended position when the mobile living quarters is parked for use, said auxiliary living quarters having a floor, a ceiling opposite said floor, a front wall and a pair of opposite side walls extending between said floor and said ceiling to define said auxiliary living quarters, drive means engaging a portion of said auxiliary living quarters displaced from said ceiling for moving the auxiliary living quarters between the extended and retracted positions, and a latching mechanism responsive to movement of the auxiliary living quarters relative to the main living quarters into the retracted position to secure the auxiliary living quarters to the main living quarters, said latching mechanism releasing in response to actuation of the drive means to move the auxiliary living quarters toward the extended position.

26. Mobile living quarters as claimed in claim 12, wherein said mating threaded aperture is a nut mounted on said other living quarters for movement relative thereto.

27. Mobile living quarters comprising a frame, a main living quarters mounted on said frame having a main living quarters wall defining an aperture, and a slide out room defining auxiliary living quarters mounted for movement relative to said main living quarters through said aperture between a retracted position retracted within the main living quarters when the mobile living quarters is moved and an extended position extended from said main living quarters through said aperture when the mobile living quarters is parked for use, said auxiliary living quarters having a floor, a ceiling opposite said floor, a front wall and a pair of opposite side walls extending between said floor and said ceiling to define said auxiliary living quarters, said ceiling and both of said side walls of the slide out room cooperating with said main living quarters wall to define a gap therebetween, and a latching mechanism mounted in said gap connected to one of said slide out room and said main living quarters wall for latching said slide out room to said main living quarters when the slide out room is in the retracted position.

28. Mobile living quarters as claimed in claim 27, wherein said latching mechanism is mounted in a portion of the gap defined between one of the side walls of the slide out room and the main living quarters wall.

29. Mobile living quarters as claimed in claim 28, wherein said one side wall has an exterior surface, said latching mechanism being mounted on said exterior surface of said one side wall and engages said main living quarters wall to latch the slide out room to the main living quarters.

30. Mobile living quarters as claimed in claim 29, wherein said main living quarters wall carries a deflectable seal yieldably engaging the slide out room to close said gap, said latching mechanism including a latch deflecting said seal as said slide out room is moved between the extended and retracted positions.

31. Mobile living quarters as claimed in claim 28, wherein said latching mechanism includes a latch, an actuator displaced from said latch and a link interconnecting the actuator and the latch.

32. Mobile living quarters as claimed in claim 31, wherein said latch includes a lever pivotally mounted on said exterior surface, said link including a cable.

33. Mobile living quarters as claimed in claim 28, wherein said latching mechanism includes a latch engaging said main living quarters as said auxiliary living quarters is moved into the retracted position, and a detent mechanism for releasably locking said latch in both an engaged position when the slide out room is in the retracted position and a disengaged position as said slide out room is moved away from the fully retracted position.

34. Mobile living quarters comprising a frame, a main living quarters mounted on said frame having a main living quarters wall defining an aperture, and a slide out room defining auxiliary living quarters mounted for movement relative to said main living quarters through said aperture between a retracted position retracted within the main living quarters when the mobile living quarters is moved and an extended position extended from said main living quarters through said aperture when the mobile living quarters is parked for use, said auxiliary living quarters having a floor, a ceiling opposite said floor, a front wall and a pair of opposite side walls extending between said floor and said ceiling to define said auxiliary living quarters, said ceiling and both of said side walls of the slide out room cooperating with said main living quarters wall to define a gap therebetween, and a latching mechanism mounted on one of said side walls of the slide out room, the latching mechanism latching the slide out room to said main living quarters in response to the slide out room being moved into the retracted position, the room having an upper edge and the aperture having an upper edge, the latching mechanism being positioned near one of the room upper edge and the aperture upper edge.

35. Mobile living quarters as claimed in claim 34, wherein said latching mechanism includes a lever, an actuator displaced from said lever, and a link interconnecting the actuator and the lever.

36. Mobile living quarters as claimed in claim 34, wherein said latching mechanism includes a latch engaging said main living quarters as said auxiliary living quarters is moved int the retracted position, and a detent mechanism for releasably locking said latch in both an engaged position when the slide out room is in the retracted position and a disengaged position as said slide out room is moved away from the fully retracted position.

37. Mobile living quarters as claimed in claim 34, wherein said main living quarters wall carries a deflectable seal yieldably engaging the slide out room to close said gap, said latching mechanism including a latch deflecting said seal as said slide out room is moved between the extended and retracted positions.

38. Mobile living quarters comprising a frame, a main living quarters mounted on said frame and an auxiliary living quarters mounted for movement relative to said main living quarters between a retracted position retracted within the main living quarters when the mobile living quarters is moved and an extended position when the mobile living quarters is parked for use, said auxiliary living quarters having a floor, a ceiling opposite said floor, a front wall and a pair of opposite side walls extending between said floor and said ceiling to define said auxiliary living quarters, drive means engaging a portion of said auxiliary living quarters displaced from said ceiling for moving the auxiliary living quarters between the extended and retracted positions, and a latching mechanism responsive to movement of the auxiliary living quarters relative to the main living quarters to secure the auxiliary living quarters to the main living quarters when the auxiliary living quarters is moved into the retracted position, said latching mechanism including a latch mounted on one of said living quarters for engaging the other living quarters, wherein said latching mechanism includes an actuator mounted on said one living quarters displaced from said latch toward said portion of said auxiliary living quarters engaged by said drive means, said actuator being responsive to movement of said auxiliary living quarters to operate said latch and a driving link extending between the actuator and the latch.

39. Mobile living quarters as claimed in claim 38, wherein each of said side walls and said front wall define a corner where the side wall meets the front wall, said front wall including a fascia projecting outwardly from said corner to define a recess, said latch and said driving link being mounted in said recess.

40. Mobile living quarters as claimed in claim 38, wherein said latch is responsive to operation of said actuator to move from an engaged position engaging said main living quarters when the auxiliary living quarters is in the retracted position to a disengaged position disengaged from the main living quarters when the auxiliary living quarters is to be moved form the retracted position.

41. Mobile living quarters as claimed in claim 40, wherein said portion of said auxiliary living quarters moves relative to said latch in response to actuation of said drive means, said actuator being responsive to said relative movement of said portion relative to said latch to pivot said latch to the disengaged position.

42. Mobile living quarters as claimed in claim 40, wherein said latch is a lever pivotally mounted on said auxiliary living quarters.

43. Mobile living quarters as claimed in claim 40, wherein said actuator is movably mounted on said auxiliary living quarters and engaged said main living quarters as the auxiliary living quarters is moved into said retracted position.

44. Mobile living quarters as claimed in claim 40, wherein said driving link is a cable and said actuator includes a cable engaging member slidably mounted on the auxiliary living quarters and responsive to relative movement between the main and auxiliary living quarters for sliding relative to the auxiliary living quarters.

45. Latching mechanism for latching a slide out room to a main living quarters of a mobile living quarters when the slide out room is retracted into the main living quarters comprising a latch responsive to relative movement of the slide out room relative to the main living quarters for securing the slide out room to the main living quarters when the slide out room is retracted into the main living quarters and for releasing the slide out room when the latter is moved away from the retracted position, an actuator responsive to relative movement of the slide out room relative to the main living quarters, and a driving link interconnecting the actuator and the latch whereby said actuator causes said latch to latch the slide out room to the main living quarters when the slide out room is retracted into the main living quarters and to disengage said latch when the slide out room is extended from the main living quarters, wherein said latch is moved by said actuator through an amplifying link such that the latch moves a greater amount than the actuator moves.

46. Latching mechanism for latching a slide out room to a main living quarters of a mobile living quarters when the slide out room is retracted into the main living quarters comprising a latch responsive to relative movement of the slide out room relative to the main living quarters for securing the slide out room to the main living quarters when the slide out room is retracted into the main living quarters and for releasing the slide out room when the latter is moved away from the retracted position, wherein said latch is operated by an electrical actuator.

47. Latching mechanism for latching a slide out room to a main living quarters of a mobile living quarters when the slide out room is retracted into the main living quarters comprising a latch responsive to relative movement of the slide out room relative to the main living quarters for securing the slide out room to the main living quarters when the slide out room is retracted into the main living quarters and for releasing the slide out room when the latter is moved away from the retracted position, wherein said latch includes a detent mechanism for releasably locking said latching mechanism in both engaged and disengaged positions, said detent mechanism including means responsive to a smaller force to move the latch into the engaged position and a larger force to move the latch from the engaged to the disengaged position.

48. Mobile living quarters as claimed in claim 47, wherein said detent mechanism carries said latching mechanism to pull said slide out room to the fully retracted position.

49. Mobile living quarters comprising a frame, a main living quarters mounted on said frame having a main living quarters wall defining an aperture, and a slide out room defining auxiliary living quarters mounted for movement relative to said main living quarters through said aperture between a retracted position retracted within the main living quarters when the mobile living quarters is moved and an extended position extended from said main living quarters through said aperture when the mobile living quarters is parked for use, said auxiliary living quarters having a floor, a ceiling opposite said floor, a front wall and a pair of opposite side walls extending between said floor and said ceiling to define said auxiliary living quarters, said ceiling and both of said side walls of the slide out room cooperating with said main living quarters wall to define a gap therebetween, and a latch mechanism mounted in said gap for latching said slide out room to said main living quarters when the slide out room is in the retracted position, said latching mechanism being mounted in a portion of the gap defined between one of the side walls of the slide out room and the main living quarters wall, wherein said one side wall has an exterior surface, said latching mechanism being mounted on said exterior surface of said one side wall and engages said main living quarters wall to latch the slide out room to the main living quarters.

50. Movable living quarters as claimed in claim 49, wherein said main living quarters wall carries a deflectable seal yieldably engaging the slide out room to close said gap, said latching mechanism including a latch deflecting said seal as said slide out room is moved between the extended and retracted positions.

51. Mobile living quarters comprising a frame, a main living quarters mounted on said frame having a main living quarters wall defining an aperture, and a slide out room defining auxiliary living quarters mounted for movement relative to said main living quarters through said aperture between a retracted position retracted within the main living quarters when the mobile living quarters is moved and an extended position extended from said main living quarters through said aperture when the mobile living quarters is parked for use, said auxiliary living quarters having a floor, a ceiling opposite said floor, a front wall and a pair of opposite side walls extending between said floor and said ceiling to define said auxiliary living quarters, said ceiling and both of said side walls of the slide out room cooperating with said main living quarters wall to define a gap therebetween, and a latch mechanism mounted in said gap for latching said slide out room to said main living quarters when the slide out room is in the retracted position, said latching mechanism being mounted in a portion of the gap defined between one of the side walls of the slide out room and the main living quarters wall, said latching mechanism includes a latch, an actuator displaced from said latch, and a driving link drivingly interconnecting the actuator and the latch, wherein said latch includes a lever pivotally mounted on said exterior surface, said driving link including a cable.

52. Mobile living quarters including a main living quarters and an auxiliary living quarters mounted for movement relative to the main living quarters between a retracted position retracted within the main living quarters and an extended position extended from the main living quarters, the auxiliary living quarters being movable transversely through an opening in the main living quarters between the extended and retracted positions, and a latching mechanism including a latch for securing the auxiliary living quarters to the main living quarters when the auxiliary living quarters is in the retracted position, the latch being responsive to movement of the auxiliary living quarters.

53. Mobile living quarters as claimed in claim 52, wherein the auxiliary living quarters has a top edge and the opening has a top edge, the latch being positioned near one of the top edge of the auxiliary living quarters and the top edge of the opening.

54. Mobile living quarters as claimed in claim 52, wherein the latch compresses an upper edge of the auxiliary living quarters and a wall of the main living quarters defining the opening.

55. Mobile living quarters as claimed in claim 52, wherein the auxiliary living quarters has a lower edge and the opening has a lower edge, the latching mechanism further including an actuator mounted near one of the lower edge of the auxiliary living quarters and the lower edge of the opening.

56. Mobile living quarters as claimed in claim 55, wherein the auxiliary living quarters has an upper edge and the opening has an upper edge, the actuator transferring force to the latch which is mounted near one of the upper edge of the auxiliary living quarters and the upper edge of the opening.

57. Mobile living quarters as claimed in claim 55, wherein the latching mechanism includes an amplifying link connected between the actuator and the latch such that movement of the actuator of a first distance causes movement of the latch of a second distance which is greater than the first distance.

58. Mobile living quarters as claimed in claim 52, wherein the latching mechanism includes a detent member for retaining the latch in an engaged position when the auxiliary living quarters is in the retracted position and a disengaged position when the auxiliary living quarters is moved from the retracted position.

59. Mobile living quarters as claimed in claim 58, wherein the latching mechanism includes a spring for urging the detent member into engagement with the latch.

60. Mobile living quarters as claimed in claim 52, wherein the latching mechanism includes a tab pivotally mounted on the auxiliary living quarters, the tab being pivoted by engagement with the main living quarters wall defining the opening as the auxiliary living quarters is moved into the retracted position, and a gear drive connecting the tab and the latch for differential movement of the latch relative to the tab.

61. Mobile living quarters as claimed in claim 52, wherein movement of the auxiliary living quarters into the retracted position causes the latching mechanism to draw the auxiliary living quarters into engagement with a peripheral seal around the opening.

62. Mobile living quarters as claimed in claim 61, wherein the latch is sized to pass through the opening without interfering with the seal and is actuated after passing through the opening to draw an upper edge of the auxiliary living quarters into engagement with the seal.

63. Mobile living quarters as claimed in claim 52, wherein the latch is mounted on the auxiliary living quarters such that a portion of the latch passes through the opening before responding to movement of the auxiliary living quarters to secure the auxiliary living quarters in the retracted position.

64. Mobile living quarters as claimed in claim 55, wherein the latch is mounted on the auxiliary living quarters such that a portion of the latch passes through the opening before the actuator operates the latch as the auxiliary living quarters is moved into the retracted position.

65. Mobile living quarters as claimed in claim 52 wherein a tilting mechanism connects the auxiliary living quarters to the main living quarters, the tilting mechanism pivoting the auxiliary living quarters relative to the main living quarters as the auxiliary living quarters is moved into the retracted position.

66. Mobile living quarters including auxiliary living quarters movable through an opening formed in a wall of the mobile living quarters between a retracted position within a main living area of the mobile living quarters and an extended position laterally spaced apart from the main living area, the auxiliary living quarters having an upper edge and the opening having an upper edge, the mobile living quarters including a latching mechanism having a latch positioned near one of the upper edge of the auxiliary living quarters and the upper edge of the opening which secures the auxiliary living quarters to the main living area when the auxiliary living quarters is in a retracted position and releases the auxiliary living quarters from the main living area when the auxiliary living quarters is moved out of the retracted position.

* * * * *

UNITED STATES PATENT AND TRADEMARK OFFICE
CERTIFICATE OF CORRECTION

PATENT NO.   : 6,227,607 B1
DATED        : May 8, 2001
INVENTOR(S)  : James E. Dewald, Jr. et al.

It is certified that error appears in the above-identified patent and that said Letters Patent is hereby corrected as shown below:

Claim 4,
Line 22, delete "form" and add -- from --

Claim 36,
Line 33, delete "int" and add -- into --

Signed and Sealed this

Eighth Day of January, 2002

*Attest:*

*Attesting Officer*

JAMES E. ROGAN
*Director of the United States Patent and Trademark Office*